(12) United States Patent
Selo

(10) Patent No.: US 7,276,564 B2
(45) Date of Patent: Oct. 2, 2007

(54) PROCESS FOR THE (CO-)POLYMERIZATION OF ETHYLENE IN THE GAS PHASE

(75) Inventor: Jean-Loic Selo, Saint-Gingolph (FR)

(73) Assignee: Ineos Europe Limited, Lyndhurst, Hampshire (GB)

( * ) Notice: Subject to any disclaimer, the term of this patent is extended or adjusted under 35 U.S.C. 154(b) by 0 days.

(21) Appl. No.: 10/561,524

(22) PCT Filed: Jul. 8, 2004

(86) PCT No.: PCT/GB2004/002970

§ 371 (c)(1),
(2), (4) Date: May 9, 2006

(87) PCT Pub. No.: WO2005/007712

PCT Pub. Date: Jan. 27, 2005

(65) Prior Publication Data

US 2007/0043175 A1    Feb. 22, 2007

(30) Foreign Application Priority Data

Jul. 11, 2003    (EP) ................................ 03358009.3

(51) Int. Cl.
*C08F 2/34* (2006.01)
*C08F 10/02* (2006.01)

(52) U.S. Cl. ............................ 526/60; 526/59; 526/64; 526/68; 526/901

(58) Field of Classification Search .................. 526/59, 526/60, 64, 68, 901; 700/269
See application file for complete search history.

(56) References Cited

U.S. PATENT DOCUMENTS 4,532,311 A * 7/1985 Fulks et al. .................. 526/62
6,144,897 A    11/2000 Selliers

FOREIGN PATENT DOCUMENTS

| EP | 0 855 411 A1 | 7/1998 |
| EP | 1 359 168 A1 | 11/2003 |
| WO | WO93/24542 | 12/1993 |
| WO | WO96/10590 | 4/1996 |
| WO | WO 01/49751 A1 | 7/2001 |

* cited by examiner

*Primary Examiner*—Fred Teskin
(74) *Attorney, Agent, or Firm*—Nixon & Vanderhye

(57) ABSTRACT

The present invention relates to a process for improving the start up of polymerization or copolymerization of ethylene in a gas phase reactor, preferably a fluidised bed gas phase reactor.

7 Claims, 36 Drawing Sheets

Fig.1A

| MELT-INDEX | DENSITY | | | | | |
|---|---|---|---|---|---|---|
| | 945 | 946 | 947 | 948 | 949 | 950 |
| 11.0 | RTSE T°<br>4.4  98.7 | RTSE T°<br>4.4  99.5 | RTSE T°<br>4.4  100.3 | RTSE T°<br>4.4  101.1 | RTSE T°<br>4.4  101.8 | RTSE T°<br>4.4  102.5 |
| | RTSE T°<br>4.2  104.3 | RTSE T°<br>4.2  105.1 | RTSE T°<br>4.2  105.9 | RTSE T°<br>4.2  106.7 | RTSE T°<br>4.2  107.4 | RTSE T°<br>4.2  108.2 |
| 12.0 | RTSE T°<br>4.4  98.1 | RTSE T°<br>4.4  98.9 | RTSE T°<br>4.4  99.7 | RTSE T°<br>4.4  100.4 | RTSE T°<br>4.4  101.2 | RTSE T°<br>4.4  101.9 |
| | RTSE T°<br>4.2  103.7 | RTSE T°<br>4.2  104.5 | RTSE T°<br>4.2  105.3 | RTSE T°<br>4.2  106.1 | RTSE T°<br>4.2  106.8 | RTSE T°<br>4.2  107.5 |
| 13.0 | RTSE T°<br>4.4  97.5 | RTSE T°<br>4.4  98.3 | RTSE T°<br>4.4  99.1 | RTSE T°<br>4.4  99.9 | RTSE T°<br>4.4  100.6 | RTSE T°<br>4.4  101.3 |
| | RTSE T°<br>4.2  103.1 | RTSE T°<br>4.2  103.9 | RTSE T°<br>4.2  104.7 | RTSE T°<br>4.2  105.5 | RTSE T°<br>4.2  106.2 | RTSE T°<br>4.2  106.9 |
| 14.0 | RTSE T°<br>4.4  96.9 | RTSE T°<br>4.4  97.8 | RTSE T°<br>4.4  98.5 | RTSE T°<br>4.4  99.3 | RTSE T°<br>4.4  100.1 | RTSE T°<br>4.4  100.8 |
| | RTSE T°<br>4.2  102.6 | RTSE T°<br>4.2  103.4 | RTSE T°<br>4.2  104.2 | RTSE T°<br>4.2  104.9 | RTSE T°<br>4.2  105.7 | RTSE T°<br>4.2  106.4 |
| 16.0 | RTSE T°<br>4.4  96.0 | RTSE T°<br>4.4  96.8 | RTSE T°<br>4.4  97.6 | RTSE T°<br>4.4  98.4 | RTSE T°<br>4.4  99.1 | RTSE T°<br>4.4  99.8 |
| | RTSE T°<br>4.2  101.6 | RTSE T°<br>4.2  102.4 | RTSE T°<br>4.2  103.2 | RTSE T°<br>4.2  104.0 | RTSE T°<br>4.2  104.7 | RTSE T°<br>4.2  105.5 |
| 18.0 | RTSE T°<br>4.4  95.2 | RTSE T°<br>4.4  96.0 | RTSE T°<br>4.4  96.8 | RTSE T°<br>4.4  97.6 | RTSE T°<br>4.4  98.3 | RTSE T°<br>4.4  99.0 |
| | RTSE T°<br>4.2  100.8 | RTSE T°<br>4.2  101.6 | RTSE T°<br>4.2  102.4 | RTSE T°<br>4.2  103.2 | RTSE T°<br>4.2  103.9 | RTSE T°<br>4.2  104.6 |
| 20.0 | RTSE T°<br>4.4  94.5 | RTSE T°<br>4.4  95.3 | RTSE T°<br>4.4  96.1 | RTSE T°<br>4.4  96.8 | RTSE T°<br>4.4  97.6 | RTSE T°<br>4.4  98.3 |
| | RTSE T°<br>4.2  100.1 | RTSE T°<br>4.2  100.9 | RTSE T°<br>4.2  101.7 | RTSE T°<br>4.2  102.5 | RTSE T°<br>4.2  103.2 | RTSE T°<br>4.2  103.9 |
| 22.0 | RTSE T°<br>4.4  93.8 | RTSE T°<br>4.4  94.7 | RTSE T°<br>4.4  95.4 | RTSE T°<br>4.4  96.2 | RTSE T°<br>4.4  97.0 | RTSE T°<br>4.4  97.7 |
| | RTSE T°<br>4.2  99.5 | RTSE T°<br>4.2  100.3 | RTSE T°<br>4.2  101.1 | RTSE T°<br>4.2  101.8 | RTSE T°<br>4.2  102.6 | RTSE T°<br>4.2  103.3 |
| 24.0 | RTSE T°<br>4.4  93.3 | RTSE T°<br>4.4  94.1 | RTSE T°<br>4.4  94.9 | RTSE T°<br>4.4  95.7 | RTSE T°<br>4.4  96.4 | RTSE T°<br>4.4  97.1 |
| | RTSE T°<br>4.2  98.9 | RTSE T°<br>4.2  99.7 | RTSE T°<br>4.2  100.5 | RTSE T°<br>4.2  101.3 | RTSE T°<br>4.2  102.0 | RTSE T°<br>4.2  102.8 |
| 27.0 | RTSE T°<br>4.4  92.6 | RTSE T°<br>4.4  93.4 | RTSE T°<br>4.4  94.2 | RTSE T°<br>4.4  95.0 | RTSE T°<br>4.4  95.7 | RTSE T°<br>4.4  96.4 |
| | RTSE T°<br>4.2  98.2 | RTSE T°<br>4.2  99.0 | RTSE T°<br>4.2  99.8 | RTSE T°<br>4.2  100.6 | RTSE T°<br>4.2  101.3 | RTSE T°<br>4.2  102.1 |
| 30.0 | RTSE T°<br>4.4  92.0 | RTSE T°<br>4.4  92.6 | RTSE T°<br>4.4  93.6 | RTSE T°<br>4.4  94.4 | RTSE T°<br>4.4  95.1 | RTSE T°<br>4.4  95.9 |
| | RTSE T°<br>4.2  97.6 | RTSE T°<br>4.2  98.4 | RTSE T°<br>4.2  99.2 | RTSE T°<br>4.2  100.0 | RTSE T°<br>4.2  100.7 | RTSE T°<br>4.2  101.5 |

Fig.1B

| MELT-INDEX | DENSITY | | | | | |
|---|---|---|---|---|---|---|
| | 951 | 952 | 953 | 954 | 955 | 956 |
| 11.0 | RTSE T°<br>4.4  103.3 | RTSE T°<br>4.4  103.9 | RTSE T°<br>4.4  104.6 | RTSE T°<br>4.4  105.2 | RTSE T°<br>4.4  105.9 | RTSE T°<br>4.4  106.5 |
| | RTSE T°<br>4.2  108.9 | RTSE T°<br>4.2  109.6 | RTSE T°<br>4.2  110.2 | RTSE T°<br>4.2  110.9 | RTSE T°<br>4.2  111.5 | RTSE T°<br>4.2  112.1 |
| 12.0 | RTSE T°<br>4.4  102.6 | RTSE T°<br>4.4  103.3 | RTSE T°<br>4.4  104.0 | RTSE T°<br>4.4  104.6 | RTSE T°<br>4.4  105.2 | RTSE T°<br>4.4  105.8 |
| | RTSE T°<br>4.2  108.2 | RTSE T°<br>4.2  108.9 | RTSE T°<br>4.2  109.6 | RTSE T°<br>4.2  110.2 | RTSE T°<br>4.2  110.9 | RTSE T°<br>4.2  111.5 |
| 13.0 | RTSE T°<br>4.4  102.0 | RTSE T°<br>4.4  102.7 | RTSE T°<br>4.4  103.4 | RTSE T°<br>4.4  104.0 | RTSE T°<br>4.4  104.7 | RTSE T°<br>4.4  105.3 |
| | RTSE T°<br>4.2  107.7 | RTSE T°<br>4.2  108.3 | RTSE T°<br>4.2  109.0 | RTSE T°<br>4.2  109.7 | RTSE T°<br>4.2  110.3 | RTSE T°<br>4.2  110.9 |
| 14.0 | RTSE T°<br>4.4  101.5 | RTSE T°<br>4.4  102.2 | RTSE T°<br>4.4  102.9 | RTSE T°<br>4.4  103.5 | RTSE T°<br>4.4  104.1 | RTSE T°<br>4.4  104.7 |
| | RTSE T°<br>4.2  107.1 | RTSE T°<br>4.2  107.8 | RTSE T°<br>4.2  108.5 | RTSE T°<br>4.2  109.1 | RTSE T°<br>4.2  109.7 | RTSE T°<br>4.2  110.3 |
| 16.0 | RTSE T°<br>4.4  100.6 | RTSE T°<br>4.4  101.2 | RTSE T°<br>4.4  101.9 | RTSE T°<br>4.4  102.6 | RTSE T°<br>4.4  103.2 | RTSE T°<br>4.4  103.8 |
| | RTSE T°<br>4.2  106.2 | RTSE T°<br>4.2  106.9 | RTSE T°<br>4.2  107.5 | RTSE T°<br>4.2  108.2 | RTSE T°<br>4.2  108.8 | RTSE T°<br>4.2  109.4 |
| 18.0 | RTSE T°<br>4.4  99.7 | RTSE T°<br>4.4  100.4 | RTSE T°<br>4.4  101.1 | RTSE T°<br>4.4  101.7 | RTSE T°<br>4.4  102.4 | RTSE T°<br>4.4  103.0 |
| | RTSE T°<br>4.2  105.4 | RTSE T°<br>4.2  106.0 | RTSE T°<br>4.2  106.7 | RTSE T°<br>4.2  107.4 | RTSE T°<br>4.2  108.0 | RTSE T°<br>4.2  108.6 |
| 20.0 | RTSE T°<br>4.4  99.0 | RTSE T°<br>4.4  99.7 | RTSE T°<br>4.4  100.4 | RTSE T°<br>4.4  101.0 | RTSE T°<br>4.4  101.6 | RTSE T°<br>4.4  102.3 |
| | RTSE T°<br>4.2  104.6 | RTSE T°<br>4.2  105.3 | RTSE T°<br>4.2  106.0 | RTSE T°<br>4.2  106.6 | RTSE T°<br>4.2  107.3 | RTSE T°<br>4.2  107.9 |
| 22.0 | RTSE T°<br>4.4  98.4 | RTSE T°<br>4.4  99.1 | RTSE T°<br>4.4  99.8 | RTSE T°<br>4.4  100.4 | RTSE T°<br>4.4  101.0 | RTSE T°<br>4.4  101.6 |
| | RTSE T°<br>4.2  104.0 | RTSE T°<br>4.2  104.7 | RTSE T°<br>4.2  105.4 | RTSE T°<br>4.2  106.0 | RTSE T°<br>4.2  106.6 | RTSE T°<br>4.2  107.2 |
| 24.0 | RTSE T°<br>4.4  97.9 | RTSE T°<br>4.4  98.5 | RTSE T°<br>4.4  99.2 | RTSE T°<br>4.4  99.9 | RTSE T°<br>4.4  100.5 | RTSE T°<br>4.4  101.1 |
| | RTSE T°<br>4.2  103.5 | RTSE T°<br>4.2  104.2 | RTSE T°<br>4.2  104.8 | RTSE T°<br>4.2  105.5 | RTSE T°<br>4.2  106.1 | RTSE T°<br>4.2  106.7 |
| 27.0 | RTSE T°<br>4.4  97.1 | RTSE T°<br>4.4  97.8 | RTSE T°<br>4.4  98.5 | RTSE T°<br>4.4  99.1 | RTSE T°<br>4.4  99.8 | RTSE T°<br>4.4  100.4 |
| | RTSE T°<br>4.2  102.8 | RTSE T°<br>4.2  103.5 | RTSE T°<br>4.2  104.1 | RTSE T°<br>4.2  104.8 | RTSE T°<br>4.2  105.4 | RTSE T°<br>4.2  106.0 |
| 30.0 | RTSE T°<br>4.4  96.6 | RTSE T°<br>4.4  97.2 | RTSE T°<br>4.4  97.9 | RTSE T°<br>4.4  98.6 | RTSE T°<br>4.4  99.2 | RTSE T°<br>4.4  99.8 |
| | RTSE T°<br>4.2  102.2 | RTSE T°<br>4.2  102.9 | RTSE T°<br>4.2  103.5 | RTSE T°<br>4.2  104.2 | RTSE T°<br>4.2  104.8 | RTSE T°<br>4.2  105.4 |

Fig.1C

| MELT-INDEX | DENSITY | | | |
|---|---|---|---|---|
| | 957 | 958 | 959 | 960 |
| 11.0 | RTSE T°<br>4.4  107.1 | RTSE T°<br>4.4  107.6 | RTSE T°<br>4.4  108.2 | RTSE T°<br>4.4  108.7 |
| | RTSE T°<br>4.2  112.7 | RTSE T°<br>4.2  113.3 | RTSE T°<br>4.2  113.8 | RTSE T°<br>4.2  114.3 |
| 12.0 | RTSE T°<br>4.4  106.4 | RTSE T°<br>4.4  107.0 | RTSE T°<br>4.4  107.5 | RTSE T°<br>4.4  108.1 |
| | RTSE T°<br>4.2  112.1 | RTSE T°<br>4.2  112.6 | RTSE T°<br>4.2  113.2 | RTSE T°<br>4.2  113.7 |
| 13.0 | RTSE T°<br>4.4  105.9 | RTSE T°<br>4.4  106.4 | RTSE T°<br>4.4  107.0 | RTSE T°<br>4.4  107.5 |
| | RTSE T°<br>4.2  111.6 | RTSE T°<br>4.2  112.0 | RTSE T°<br>4.2  112.6 | RTSE T°<br>4.2  113.1 |
| 14.0 | RTSE T°<br>4.4  105.3 | RTSE T°<br>4.4  105.9 | RTSE T°<br>4.4  106.4 | RTSE T°<br>4.4  107.0 |
| | RTSE T°<br>4.2  110.9 | RTSE T°<br>4.2  111.5 | RTSE T°<br>4.2  112.1 | RTSE T°<br>4.2  112.6 |
| 16.0 | RTSE T°<br>4.4  104.4 | RTSE T°<br>4.4  104.9 | RTSE T°<br>4.4  105.5 | RTSE T°<br>4.4  106.0 |
| | RTSE T°<br>4.2  110.0 | RTSE T°<br>4.2  110.6 | RTSE T°<br>4.2  111.1 | RTSE T°<br>4.2  111.6 |
| 18.0 | RTSE T°<br>4.4  103.6 | RTSE T°<br>4.4  104.1 | RTSE T°<br>4.4  104.7 | RTSE T°<br>4.4  105.2 |
| | RTSE T°<br>4.2  109.2 | RTSE T°<br>4.2  109.7 | RTSE T°<br>4.2  110.3 | RTSE T°<br>4.2  110.8 |
| 20.0 | RTSE T°<br>4.4  102.8 | RTSE T°<br>4.4  103.4 | RTSE T°<br>4.4  104.0 | RTSE T°<br>4.4  104.5 |
| | RTSE T°<br>4.2  108.5 | RTSE T°<br>4.2  109.0 | RTSE T°<br>4.2  109.6 | RTSE T°<br>4.2  110.1 |
| 22.0 | RTSE T°<br>4.4  102.2 | RTSE T°<br>4.4  102.8 | RTSE T°<br>4.4  103.3 | RTSE T°<br>4.4  103.9 |
| | RTSE T°<br>4.2  107.8 | RTSE T°<br>4.2  108.4 | RTSE T°<br>4.2  109.0 | RTSE T°<br>4.2  109.5 |
| 24.0 | RTSE T°<br>4.4  101.7 | RTSE T°<br>4.4  102.2 | RTSE T°<br>4.4  102.8 | RTSE T°<br>4.4  103.3 |
| | RTSE T°<br>4.2  107.3 | RTSE T°<br>4.2  107.9 | RTSE T°<br>4.2  108.4 | RTSE T°<br>4.2  108.9 |
| 27.0 | RTSE T°<br>4.4  101.0 | RTSE T°<br>4.4  101.5 | RTSE T°<br>4.4  102.1 | RTSE T°<br>4.4  102.6 |
| | RTSE T°<br>4.2  106.6 | RTSE T°<br>4.2  107.2 | RTSE T°<br>4.2  107.7 | RTSE T°<br>4.2  108.2 |
| 30.0 | RTSE T°<br>4.4  100.4 | RTSE T°<br>4.4  100.9 | RTSE T°<br>4.4  101.5 | RTSE T°<br>4.4  102.0 |
| | RTSE T°<br>4.2  106.0 | RTSE T°<br>4.2  106.6 | RTSE T°<br>4.2  107.1 | RTSE T°<br>4.2  107.6 |

Fig.2A

| MELT-INDEX | DENSITY | | | | | |
|---|---|---|---|---|---|---|
| | 945 | 946 | 947 | 948 | 949 | 950 |
| 3.9 | RTSE 4.4 T° 106.0 | RTSE 4.4 T° 106.8 | RTSE 4.4 T° 107.6 | RTSE 4.4 T° 108.4 | RTSE 4.4 T° 109.2 | RTSE 4.4 T° 109.9 |
| | RTSE 4.2 T° 111.7 | RTSE 4.2 T° 112.5 | RTSE 4.2 T° 113.3 | RTSE 4.2 T° 114.0 | RTSE 4.2 T° 114.8 | RTSE 4.2 T° 115.5 |
| 4.3 | RTSE 4.4 T° 105.4 | RTSE 4.4 T° 106.2 | RTSE 4.4 T° 107.0 | RTSE 4.4 T° 107.8 | RTSE 4.4 T° 108.5 | RTSE 4.4 T° 109.2 |
| | RTSE 4.2 T° 111.0 | RTSE 4.2 T° 111.8 | RTSE 4.2 T° 112.6 | RTSE 4.2 T° 113.4 | RTSE 4.2 T° 114.1 | RTSE 4.2 T° 114.9 |
| 4.8 | RTSE 4.4 T° 104.6 | RTSE 4.4 T° 105.5 | RTSE 4.4 T° 106.2 | RTSE 4.4 T° 107.0 | RTSE 4.4 T° 107.8 | RTSE 4.4 T° 108.5 |
| | RTSE 4.2 T° 110.3 | RTSE 4.2 T° 111.1 | RTSE 4.2 T° 111.9 | RTSE 4.2 T° 112.6 | RTSE 4.2 T° 113.4 | RTSE 4.2 T° 114.1 |
| 5.3 | RTSE 4.4 T° 104.0 | RTSE 4.4 T° 104.8 | RTSE 4.4 T° 105.6 | RTSE 4.4 T° 106.3 | RTSE 4.4 T° 107.1 | RTSE 4.4 T° 107.8 |
| | RTSE 4.2 T° 109.6 | RTSE 4.2 T° 110.4 | RTSE 4.2 T° 111.2 | RTSE 4.2 T° 112.0 | RTSE 4.2 T° 112.7 | RTSE 4.2 T° 113.4 |
| 5.9 | RTSE 4.4 T° 103.2 | RTSE 4.4 T° 104.0 | RTSE 4.4 T° 104.8 | RTSE 4.4 T° 105.6 | RTSE 4.4 T° 106.3 | RTSE 4.4 T° 107.1 |
| | RTSE 4.2 T° 108.8 | RTSE 4.2 T° 109.6 | RTSE 4.2 T° 110.4 | RTSE 4.2 T° 111.2 | RTSE 4.2 T° 111.9 | RTSE 4.2 T° 112.7 |
| 6.5 | RTSE 4.4 T° 102.5 | RTSE 4.4 T° 103.3 | RTSE 4.4 T° 104.1 | RTSE 4.4 T° 104.9 | RTSE 4.4 T° 105.6 | RTSE 4.4 T° 106.4 |
| | RTSE 4.2 T° 108.1 | RTSE 4.2 T° 108.9 | RTSE 4.2 T° 109.7 | RTSE 4.2 T° 110.5 | RTSE 4.2 T° 111.3 | RTSE 4.2 T° 112.0 |
| 7.2 | RTSE 4.4 T° 101.8 | RTSE 4.4 T° 102.6 | RTSE 4.4 T° 103.4 | RTSE 4.4 T° 104.2 | RTSE 4.4 T° 104.9 | RTSE 4.4 T° 105.6 |
| | RTSE 4.2 T° 107.4 | RTSE 4.2 T° 108.2 | RTSE 4.2 T° 109.0 | RTSE 4.2 T° 109.8 | RTSE 4.2 T° 110.5 | RTSE 4.2 T° 111.3 |
| 8.0 | RTSE 4.4 T° 101.0 | RTSE 4.4 T° 101.8 | RTSE 4.4 T° 102.6 | RTSE 4.4 T° 103.4 | RTSE 4.4 T° 104.1 | RTSE 4.4 T° 104.9 |
| | RTSE 4.2 T° 106.6 | RTSE 4.2 T° 107.4 | RTSE 4.2 T° 108.2 | RTSE 4.2 T° 109.0 | RTSE 4.2 T° 109.8 | RTSE 4.2 T° 110.5 |
| 8.9 | RTSE 4.4 T° 100.2 | RTSE 4.4 T° 101.1 | RTSE 4.4 T° 101.8 | RTSE 4.4 T° 102.6 | RTSE 4.4 T° 103.4 | RTSE 4.4 T° 104.1 |
| | RTSE 4.2 T° 105.9 | RTSE 4.2 T° 106.7 | RTSE 4.2 T° 107.5 | RTSE 4.2 T° 108.2 | RTSE 4.2 T° 109.0 | RTSE 4.2 T° 109.7 |
| 9.9 | RTSE 4.4 T° 99.5 | RTSE 4.4 T° 100.3 | RTSE 4.4 T° 101.1 | RTSE 4.4 T° 101.8 | RTSE 4.4 T° 102.6 | RTSE 4.4 T° 103.3 |
| | RTSE 4.2 T° 105.1 | RTSE 4.2 T° 105.9 | RTSE 4.2 T° 106.7 | RTSE 4.2 T° 107.5 | RTSE 4.2 T° 108.2 | RTSE 4.2 T° 108.9 |
| 11.0 | RTSE 4.4 T° 98.7 | RTSE 4.4 T° 99.5 | RTSE 4.4 T° 100.3 | RTSE 4.4 T° 101.1 | RTSE 4.4 T° 101.8 | RTSE 4.4 T° 102.5 |
| | RTSE 4.2 T° 104.3 | RTSE 4.2 T° 105.1 | RTSE 4.2 T° 105.9 | RTSE 4.2 T° 106.7 | RTSE 4.2 T° 107.4 | RTSE 4.2 T° 108.2 |

Fig.2B

| MELT-INDEX | DENSITY 951 | 952 | 953 | 954 | 955 | 956 |
|---|---|---|---|---|---|---|
| 3.9 | RTSE 4.4  T° 110.6 | RTSE 4.4  T° 111.3 | RTSE 4.4  T° 112.0 | RTSE 4.4  T° 112.6 | RTSE 4.4  T° 113.2 | RTSE 4.4  T° 113.8 |
| 3.9 | RTSE 4.2  T° 116.2 | RTSE 4.2  T° 116.9 | RTSE 4.2  T° 117.6 | RTSE 4.2  T° 118.2 | RTSE 4.2  T° 118.8 | RTSE 4.2  T° 119.4 |
| 4.3 | RTSE 4.4  T° 109.9 | RTSE 4.4  T° 110.6 | RTSE 4.4  T° 111.3 | RTSE 4.4  T° 111.9 | RTSE 4.4  T° 112.6 | RTSE 4.4  T° 113.2 |
| 4.3 | RTSE 4.2  T° 115.6 | RTSE 4.2  T° 116.3 | RTSE 4.2  T° 116.9 | RTSE 4.2  T° 117.6 | RTSE 4.2  T° 118.2 | RTSE 4.2  T° 118.8 |
| 4.8 | RTSE 4.4  T° 109.2 | RTSE 4.4  T° 109.9 | RTSE 4.4  T° 110.6 | RTSE 4.4  T° 111.2 | RTSE 4.4  T° 111.8 | RTSE 4.4  T° 112.4 |
| 4.8 | RTSE 4.2  T° 114.8 | RTSE 4.2  T° 115.5 | RTSE 4.2  T° 116.2 | RTSE 4.2  T° 116.8 | RTSE 4.2  T° 117.4 | RTSE 4.2  T° 118.0 |
| 5.3 | RTSE 4.4  T° 108.5 | RTSE 4.4  T° 109.2 | RTSE 4.4  T° 109.9 | RTSE 4.4  T° 110.5 | RTSE 4.4  T° 111.1 | RTSE 4.4  T° 111.7 |
| 5.3 | RTSE 4.2  T° 114.1 | RTSE 4.2  T° 114.8 | RTSE 4.2  T° 115.5 | RTSE 4.2  T° 116.1 | RTSE 4.2  T° 116.8 | RTSE 4.2  T° 117.4 |
| 5.9 | RTSE 4.4  T° 107.8 | RTSE 4.4  T° 108.5 | RTSE 4.4  T° 109.1 | RTSE 4.4  T° 109.8 | RTSE 4.4  T° 110.4 | RTSE 4.4  T° 111.0 |
| 5.9 | RTSE 4.2  T° 113.4 | RTSE 4.2  T° 114.1 | RTSE 4.2  T° 114.7 | RTSE 4.2  T° 115.4 | RTSE 4.2  T° 116.0 | RTSE 4.2  T° 116.6 |
| 6.5 | RTSE 4.4  T° 107.1 | RTSE 4.4  T° 107.8 | RTSE 4.4  T° 108.4 | RTSE 4.4  T° 109.1 | RTSE 4.4  T° 109.7 | RTSE 4.4  T° 110.3 |
| 6.5 | RTSE 4.2  T° 112.7 | RTSE 4.2  T° 113.4 | RTSE 4.2  T° 114.0 | RTSE 4.2  T° 114.7 | RTSE 4.2  T° 115.3 | RTSE 4.2  T° 115.9 |
| 7.2 | RTSE 4.4  T° 106.3 | RTSE 4.4  T° 107.0 | RTSE 4.4  T° 107.7 | RTSE 4.4  T° 108.3 | RTSE 4.4  T° 109.0 | RTSE 4.4  T° 109.6 |
| 7.2 | RTSE 4.2  T° 112.0 | RTSE 4.2  T° 112.6 | RTSE 4.2  T° 113.3 | RTSE 4.2  T° 114.0 | RTSE 4.2  T° 114.6 | RTSE 4.2  T° 115.2 |
| 8.0 | RTSE 4.4  T° 105.6 | RTSE 4.4  T° 106.3 | RTSE 4.4  T° 106.9 | RTSE 4.4  T° 107.6 | RTSE 4.4  T° 108.2 | RTSE 4.4  T° 108.8 |
| 8.0 | RTSE 4.2  T° 111.2 | RTSE 4.2  T° 111.9 | RTSE 4.2  T° 112.5 | RTSE 4.2  T° 113.2 | RTSE 4.2  T° 113.8 | RTSE 4.2  T° 114.4 |
| 8.9 | RTSE 4.4  T° 104.8 | RTSE 4.4  T° 105.5 | RTSE 4.4  T° 106.2 | RTSE 4.4  T° 106.8 | RTSE 4.4  T° 107.4 | RTSE 4.4  T° 108.0 |
| 8.9 | RTSE 4.2  T° 110.4 | RTSE 4.2  T° 111.1 | RTSE 4.2  T° 111.8 | RTSE 4.2  T° 112.4 | RTSE 4.2  T° 113.0 | RTSE 4.2  T° 113.6 |
| 9.9 | RTSE 4.4  T° 104.0 | RTSE 4.4  T° 104.7 | RTSE 4.4  T° 105.4 | RTSE 4.4  T° 106.0 | RTSE 4.4  T° 106.6 | RTSE 4.4  T° 107.3 |
| 9.9 | RTSE 4.2  T° 109.6 | RTSE 4.2  T° 110.3 | RTSE 4.2  T° 111.0 | RTSE 4.2  T° 111.6 | RTSE 4.2  T° 112.3 | RTSE 4.2  T° 112.9 |
| 11.0 | RTSE 4.4  T° 103.3 | RTSE 4.4  T° 103.9 | RTSE 4.4  T° 104.6 | RTSE 4.4  T° 105.2 | RTSE 4.4  T° 105.9 | RTSE 4.4  T° 106.5 |
| 11.0 | RTSE 4.2  T° 108.9 | RTSE 4.2  T° 109.6 | RTSE 4.2  T° 110.2 | RTSE 4.2  T° 110.9 | RTSE 4.2  T° 111.5 | RTSE 4.2  T° 112.1 |

Fig.2C

| MELT-INDEX | DENSITY | | | |
|---|---|---|---|---|
| | 957 | 958 | 959 | 960 |
| 3.9 | RTSE 4.4  T° 114.4 | RTSE 4.4  T° 115.0 | RTSE 4.4  T° 115.5 | RTSE 4.4  T° 116.1 |
| | RTSE 4.2  T° 120.0 | RTSE 4.2  T° 120.6 | RTSE 4.2  T° 121.1 | RTSE 4.2  T° 121.7 |
| 4.3 | RTSE 4.4  T° 113.8 | RTSE 4.4  T° 114.3 | RTSE 4.4  T° 114.9 | RTSE 4.4  T° 115.4 |
| | RTSE 4.2  T° 119.4 | RTSE 4.2  T° 120.0 | RTSE 4.2  T° 120.5 | RTSE 4.2  T° 121.0 |
| 4.8 | RTSE 4.4  T° 113.0 | RTSE 4.4  T° 113.6 | RTSE 4.4  T° 114.1 | RTSE 4.4  T° 114.7 |
| | RTSE 4.2  T° 118.6 | RTSE 4.2  T° 119.2 | RTSE 4.2  T° 119.8 | RTSE 4.2  T° 120.3 |
| 5.3 | RTSE 4.4  T° 112.3 | RTSE 4.4  T° 112.9 | RTSE 4.4  T° 113.4 | RTSE 4.4  T° 114.0 |
| | RTSE 4.2  T° 118.0 | RTSE 4.2  T° 118.5 | RTSE 4.2  T° 119.1 | RTSE 4.2  T° 119.6 |
| 5.9 | RTSE 4.4  T° 111.6 | RTSE 4.4  T° 112.1 | RTSE 4.4  T° 112.7 | RTSE 4.4  T° 113.2 |
| | RTSE 4.2  T° 117.2 | RTSE 4.2  T° 117.8 | RTSE 4.2  T° 118.3 | RTSE 4.2  T° 118.8 |
| 6.5 | RTSE 4.4  T° 110.9 | RTSE 4.4  T° 111.5 | RTSE 4.4  T° 112.0 | RTSE 4.4  T° 112.5 |
| | RTSE 4.2  T° 116.5 | RTSE 4.2  T° 117.1 | RTSE 4.2  T° 117.6 | RTSE 4.2  T° 118.2 |
| 7.2 | RTSE 4.4  T° 110.2 | RTSE 4.4  T° 110.7 | RTSE 4.4  T° 111.3 | RTSE 4.4  T° 111.8 |
| | RTSE 4.2  T° 115.8 | RTSE 4.2  T° 116.3 | RTSE 4.2  T° 116.9 | RTSE 4.2  T° 117.4 |
| 8.0 | RTSE 4.4  T° 109.4 | RTSE 4.4  T° 110.0 | RTSE 4.4  T° 110.5 | RTSE 4.4  T° 111.0 |
| | RTSE 4.2  T° 115.0 | RTSE 4.2  T° 115.6 | RTSE 4.2  T° 116.1 | RTSE 4.2  T° 116.7 |
| 8.9 | RTSE 4.4  T° 108.6 | RTSE 4.4  T° 109.2 | RTSE 4.4  T° 109.7 | RTSE 4.4  T° 110.3 |
| | RTSE 4.2  T° 114.2 | RTSE 4.2  T° 114.8 | RTSE 4.2  T° 115.3 | RTSE 4.2  T° 115.9 |
| 9.9 | RTSE 4.4  T° 107.8 | RTSE 4.4  T° 108.4 | RTSE 4.4  T° 109.0 | RTSE 4.4  T° 109.5 |
| | RTSE 4.2  T° 113.5 | RTSE 4.2  T° 114.0 | RTSE 4.2  T° 114.6 | RTSE 4.2  T° 115.1 |
| 11.0 | RTSE 4.4  T° 107.1 | RTSE 4.4  T° 107.6 | RTSE 4.4  T° 108.2 | RTSE 4.4  T° 108.7 |
| | RTSE 4.2  T° 112.7 | RTSE 4.2  T° 113.3 | RTSE 4.2  T° 113.8 | RTSE 4.2  T° 114.3 |

Fig.3A

| MELT-INDEX | DENSITY | | | | | |
|---|---|---|---|---|---|---|
| | 945 | 946 | 947 | 948 | 949 | 950 |
| 1.4 | RTSE T° 4.4  111.9 | RTSE T° 4.4  112.7 | RTSE T° 4.4  113.5 | RTSE T° 4.4  114.3 | RTSE T° 4.4  115.0 | RTSE T° 4.4  115.7 |
| | RTSE T° 4.2  117.5 | RTSE T° 4.2  118.3 | RTSE T° 4.2  119.1 | RTSE T° 4.2  119.9 | RTSE T° 4.2  120.6 | RTSE T° 4.2  121.4 |
| 1.5 | RTSE T° 4.4  111.6 | RTSE T° 4.4  112.4 | RTSE T° 4.4  113.2 | RTSE T° 4.4  113.9 | RTSE T° 4.4  114.7 | RTSE T° 4.4  115.4 |
| | RTSE T° 4.2  117.2 | RTSE T° 4.2  118.0 | RTSE T° 4.2  118.8 | RTSE T° 4.2  119.6 | RTSE T° 4.2  120.3 | RTSE T° 4.2  121.0 |
| 1.7 | RTSE T° 4.4  110.9 | RTSE T° 4.4  111.7 | RTSE T° 4.4  112.5 | RTSE T° 4.4  113.3 | RTSE T° 4.4  114.1 | RTSE T° 4.4  114.8 |
| | RTSE T° 4.2  116.6 | RTSE T° 4.2  117.4 | RTSE T° 4.2  118.2 | RTSE T° 4.2  118.9 | RTSE T° 4.2  119.7 | RTSE T° 4.2  120.4 |
| 1.9 | RTSE T° 4.4  110.4 | RTSE T° 4.4  111.2 | RTSE T° 4.4  112.0 | RTSE T° 4.4  112.7 | RTSE T° 4.4  113.5 | RTSE T° 4.4  114.2 |
| | RTSE T° 4.2  116.0 | RTSE T° 4.2  116.8 | RTSE T° 4.2  117.6 | RTSE T° 4.2  118.3 | RTSE T° 4.2  119.1 | RTSE T° 4.2  119.8 |
| 2.1 | RTSE T° 4.4  109.8 | RTSE T° 4.4  110.6 | RTSE T° 4.4  111.4 | RTSE T° 4.4  112.2 | RTSE T° 4.4  112.9 | RTSE T° 4.4  113.7 |
| | RTSE T° 4.2  115.4 | RTSE T° 4.2  116.2 | RTSE T° 4.2  117.0 | RTSE T° 4.2  117.8 | RTSE T° 4.2  118.6 | RTSE T° 4.2  119.3 |
| 2.3 | RTSE T° 4.4  109.3 | RTSE T° 4.4  110.1 | RTSE T° 4.4  110.9 | RTSE T° 4.4  111.7 | RTSE T° 4.4  112.4 | RTSE T° 4.4  113.2 |
| | RTSE T° 4.2  114.9 | RTSE T° 4.2  115.7 | RTSE T° 4.2  116.5 | RTSE T° 4.2  117.3 | RTSE T° 4.2  118.0 | RTSE T° 4.2  118.8 |
| 2.6 | RTSE T° 4.4  108.6 | RTSE T° 4.4  109.4 | RTSE T° 4.4  110.2 | RTSE T° 4.4  111.0 | RTSE T° 4.4  111.7 | RTSE T° 4.4  112.4 |
| | RTSE T° 4.2  114.2 | RTSE T° 4.2  115.0 | RTSE T° 4.2  115.8 | RTSE T° 4.2  116.6 | RTSE T° 4.2  117.3 | RTSE T° 4.2  118.1 |
| 2.9 | RTSE T° 4.4  107.9 | RTSE T° 4.4  108.7 | RTSE T° 4.4  109.5 | RTSE T° 4.4  110.3 | RTSE T° 4.4  111.0 | RTSE T° 4.4  111.8 |
| | RTSE T° 4.2  113.5 | RTSE T° 4.2  114.4 | RTSE T° 4.2  115.1 | RTSE T° 4.2  115.9 | RTSE T° 4.2  116.7 | RTSE T° 4.2  117.4 |
| 3.2 | RTSE T° 4.4  107.3 | RTSE T° 4.4  108.1 | RTSE T° 4.4  108.9 | RTSE T° 4.4  109.7 | RTSE T° 4.4  110.4 | RTSE T° 4.4  111.2 |
| | RTSE T° 4.2  112.9 | RTSE T° 4.2  113.7 | RTSE T° 4.2  114.5 | RTSE T° 4.2  115.3 | RTSE T° 4.2  116.1 | RTSE T° 4.2  116.8 |
| 3.6 | RTSE T° 4.4  106.6 | RTSE T° 4.4  107.4 | RTSE T° 4.4  108.2 | RTSE T° 4.4  108.9 | RTSE T° 4.4  109.7 | RTSE T° 4.4  110.4 |
| | RTSE T° 4.2  112.2 | RTSE T° 4.2  113.0 | RTSE T° 4.2  113.8 | RTSE T° 4.2  114.6 | RTSE T° 4.2  115.3 | RTSE T° 4.2  116.7 |
| 4.0 | RTSE T° 4.4  105.9 | RTSE T° 4.4  106.7 | RTSE T° 4.4  107.5 | RTSE T° 4.4  108.2 | RTSE T° 4.4  109.0 | RTSE T° 4.4  109.7 |
| | RTSE T° 4.2  111.5 | RTSE T° 4.2  112.3 | RTSE T° 4.2  113.1 | RTSE T° 4.2  113.9 | RTSE T° 4.2  114.6 | RTSE T° 4.2  115.3 |

Fig. 3B

| MELT-INDEX | DENSITY | | | | | |
|---|---|---|---|---|---|---|
| | 951 | 952 | 953 | 954 | 955 | 956 |
| 1.4 | RTSE T°<br>4.4  116.5 | RTSE T°<br>4.4  117.1 | RTSE T°<br>4.4  117.8 | RTSE T°<br>4.4  118.5 | RTSE T°<br>4.4  119.1 | RTSE T°<br>4.4  119.7 |
| | RTSE T°<br>4.2  122.1 | RTSE T°<br>4.2  122.8 | RTSE T°<br>4.2  123.4 | RTSE T°<br>4.2  124.1 | RTSE T°<br>4.2  124.7 | RTSE T°<br>4.2  125.3 |
| 1.5 | RTSE T°<br>4.4  116.1 | RTSE T°<br>4.4  116.8 | RTSE T°<br>4.4  117.5 | RTSE T°<br>4.4  118.1 | RTSE T°<br>4.4  118.7 | RTSE T°<br>4.4  119.4 |
| | RTSE T°<br>4.2  121.7 | RTSE T°<br>4.2  122.4 | RTSE T°<br>4.2  123.1 | RTSE T°<br>4.2  123.7 | RTSE T°<br>4.2  124.4 | RTSE T°<br>4.2  125.0 |
| 1.7 | RTSE T°<br>4.4  115.5 | RTSE T°<br>4.4  116.2 | RTSE T°<br>4.4  116.9 | RTSE T°<br>4.4  117.5 | RTSE T°<br>4.4  118.1 | RTSE T°<br>4.4  118.7 |
| | RTSE T°<br>4.2  121.1 | RTSE T°<br>4.2  121.8 | RTSE T°<br>4.2  122.5 | RTSE T°<br>4.2  123.1 | RTSE T°<br>4.2  123.7 | RTSE T°<br>4.2  124.3 |
| 1.9 | RTSE T°<br>4.4  114.9 | RTSE T°<br>4.4  115.6 | RTSE T°<br>4.4  116.3 | RTSE T°<br>4.4  116.9 | RTSE T°<br>4.4  117.5 | RTSE T°<br>4.4  118.1 |
| | RTSE T°<br>4.2  120.5 | RTSE T°<br>4.2  121.2 | RTSE T°<br>4.2  121.9 | RTSE T°<br>4.2  122.5 | RTSE T°<br>4.2  123.2 | RTSE T°<br>4.2  123.8 |
| 2.1 | RTSE T°<br>4.4  114.4 | RTSE T°<br>4.4  115.1 | RTSE T°<br>4.4  115.7 | RTSE T°<br>4.4  116.4 | RTSE T°<br>4.4  117.0 | RTSE T°<br>4.4  117.6 |
| | RTSE T°<br>4.2  120.0 | RTSE T°<br>4.2  120.7 | RTSE T°<br>4.2  121.3 | RTSE T°<br>4.2  122.0 | RTSE T°<br>4.2  122.6 | RTSE T°<br>4.2  123.2 |
| 2.3 | RTSE T°<br>4.4  113.9 | RTSE T°<br>4.4  114.5 | RTSE T°<br>4.4  115.2 | RTSE T°<br>4.4  115.9 | RTSE T°<br>4.4  116.5 | RTSE T°<br>4.4  117.1 |
| | RTSE T°<br>4.2  119.5 | RTSE T°<br>4.2  120.2 | RTSE T°<br>4.2  120.8 | RTSE T°<br>4.2  121.5 | RTSE T°<br>4.2  122.1 | RTSE T°<br>4.2  122.7 |
| 2.6 | RTSE T°<br>4.4  113.1 | RTSE T°<br>4.4  113.8 | RTSE T°<br>4.4  114.5 | RTSE T°<br>4.4  115.1 | RTSE T°<br>4.4  115.8 | RTSE T°<br>4.4  116.4 |
| | RTSE T°<br>4.2  118.8 | RTSE T°<br>4.2  119.4 | RTSE T°<br>4.2  120.1 | RTSE T°<br>4.2  120.8 | RTSE T°<br>4.2  121.4 | RTSE T°<br>4.2  122.0 |
| 2.9 | RTSE T°<br>4.4  112.5 | RTSE T°<br>4.4  113.2 | RTSE T°<br>4.4  113.8 | RTSE T°<br>4.4  114.5 | RTSE T°<br>4.4  115.1 | RTSE T°<br>4.4  115.7 |
| | RTSE T°<br>4.2  118.1 | RTSE T°<br>4.2  118.8 | RTSE T°<br>4.2  119.5 | RTSE T°<br>4.2  120.1 | RTSE T°<br>4.2  120.7 | RTSE T°<br>4.2  121.3 |
| 3.2 | RTSE T°<br>4.4  111.9 | RTSE T°<br>4.4  112.6 | RTSE T°<br>4.4  113.2 | RTSE T°<br>4.4  113.9 | RTSE T°<br>4.4  114.5 | RTSE T°<br>4.4  115.1 |
| | RTSE T°<br>4.2  117.5 | RTSE T°<br>4.2  118.2 | RTSE T°<br>4.2  118.8 | RTSE T°<br>4.2  119.5 | RTSE T°<br>4.2  120.1 | RTSE T°<br>4.2  120.7 |
| 3.6 | RTSE T°<br>4.4  111.1 | RTSE T°<br>4.4  111.8 | RTSE T°<br>4.4  112.5 | RTSE T°<br>4.4  113.1 | RTSE T°<br>4.4  113.7 | RTSE T°<br>4.4  114.4 |
| | RTSE T°<br>4.2  116.7 | RTSE T°<br>4.2  117.4 | RTSE T°<br>4.2  118.1 | RTSE T°<br>4.2  118.7 | RTSE T°<br>4.2  119.4 | RTSE T°<br>4.2  120.0 |
| 4.0 | RTSE T°<br>4.4  110.4 | RTSE T°<br>4.4  111.1 | RTSE T°<br>4.4  111.8 | RTSE T°<br>4.4  112.4 | RTSE T°<br>4.4  113.1 | RTSE T°<br>4.4  113.7 |
| | RTSE T°<br>4.2  116.1 | RTSE T°<br>4.2  116.7 | RTSE T°<br>4.2  117.4 | RTSE T°<br>4.2  118.0 | RTSE T°<br>4.2  118.7 | RTSE T°<br>4.2  119.3 |

Fig.3C

| MELT-INDEX | DENSITY | | | |
|---|---|---|---|---|
| | 957 | 958 | 959 | 960 |
| 1.4 | RTSE T° 4.4 120.3 | RTSE T° 4.4 120.8 | RTSE T° 4.4 121.4 | RTSE T° 4.4 121.9 |
| | RTSE T° 4.2 125.9 | RTSE T° 4.2 126.5 | RTSE T° 4.2 127.0 | RTSE T° 4.2 127.5 |
| 1.5 | RTSE T° 4.4 119.9 | RTSE T° 4.4 120.5 | RTSE T° 4.4 121.1 | RTSE T° 4.4 121.6 |
| | RTSE T° 4.2 125.6 | RTSE T° 4.2 126.1 | RTSE T° 4.2 126.7 | RTSE T° 4.2 127.2 |
| 1.7 | RTSE T° 4.4 119.3 | RTSE T° 4.4 119.9 | RTSE T° 4.4 120.4 | RTSE T° 4.4 121.0 |
| | RTSE T° 4.2 124.9 | RTSE T° 4.2 125.5 | RTSE T° 4.2 126.0 | RTSE T° 4.2 126.6 |
| 1.9 | RTSE T° 4.4 118.7 | RTSE T° 4.4 119.3 | RTSE T° 4.4 119.8 | RTSE T° 4.4 120.4 |
| | RTSE T° 4.2 124.3 | RTSE T° 4.2 124.9 | RTSE T° 4.2 125.5 | RTSE T° 4.2 126.0 |
| 2.1 | RTSE T° 4.4 118.2 | RTSE T° 4.4 118.8 | RTSE T° 4.4 119.3 | RTSE T° 4.4 119.8 |
| | RTSE T° 4.2 123.8 | RTSE T° 4.2 124.4 | RTSE T° 4.2 124.9 | RTSE T° 4.2 125.5 |
| 2.3 | RTSE T° 4.4 117.7 | RTSE T° 4.4 118.2 | RTSE T° 4.4 118.8 | RTSE T° 4.4 119.3 |
| | RTSE T° 4.2 123.3 | RTSE T° 4.2 123.9 | RTSE T° 4.2 124.4 | RTSE T° 4.2 124.9 |
| 2.6 | RTSE T° 4.4 117.0 | RTSE T° 4.4 117.5 | RTSE T° 4.4 118.1 | RTSE T° 4.4 118.6 |
| | RTSE T° 4.2 122.6 | RTSE T° 4.2 123.1 | RTSE T° 4.2 123.7 | RTSE T° 4.2 124.2 |
| 2.9 | RTSE T° 4.4 116.3 | RTSE T° 4.4 116.9 | RTSE T° 4.4 117.4 | RTSE T° 4.4 117.9 |
| | RTSE T° 4.2 121.9 | RTSE T° 4.2 122.5 | RTSE T° 4.2 123.0 | RTSE T° 4.2 123.6 |
| 3.2 | RTSE T° 4.4 115.7 | RTSE T° 4.4 116.3 | RTSE T° 4.4 116.8 | RTSE T° 4.4 117.3 |
| | RTSE T° 4.2 121.3 | RTSE T° 4.2 121.9 | RTSE T° 4.2 122.4 | RTSE T° 4.2 123.0 |
| 3.6 | RTSE T° 4.4 114.9 | RTSE T° 4.4 115.5 | RTSE T° 4.4 116.1 | RTSE T° 4.4 116.6 |
| | RTSE T° 4.2 120.6 | RTSE T° 4.2 121.1 | RTSE T° 4.2 121.7 | RTSE T° 4.2 122.2 |
| 4.0 | RTSE T° 4.4 114.2 | RTSE T° 4.4 114.8 | RTSE T° 4.4 115.4 | RTSE T° 4.4 115.9 |
| | RTSE T° 4.2 119.9 | RTSE T° 4.2 120.4 | RTSE T° 4.2 121.0 | RTSE T° 4.2 121.5 |

Fig.4A

| MELT-INDEX | DENSITY | | | | | |
|---|---|---|---|---|---|---|
| | 945 | 946 | 947 | 948 | 949 | 950 |
| 0.5 | RTSE T° 4.4 115.7 | RTSE T° 4.4 116.5 | RTSE T° 4.4 117.3 | RTSE T° 4.4 118.0 | RTSE T° 4.4 118.8 | RTSE T° 4.4 119.5 |
| | RTSE T° 4.2 121.3 | RTSE T° 4.2 122.1 | RTSE T° 4.2 122.9 | RTSE T° 4.2 123.7 | RTSE T° 4.2 124.4 | RTSE T° 4.2 125.1 |
| 0.6 | RTSE T° 4.4 115.1 | RTSE T° 4.4 116.0 | RTSE T° 4.4 116.7 | RTSE T° 4.4 117.5 | RTSE T° 4.4 118.3 | RTSE T° 4.4 119.0 |
| | RTSE T° 4.2 120.8 | RTSE T° 4.2 121.6 | RTSE T° 4.2 122.4 | RTSE T° 4.2 123.1 | RTSE T° 4.2 123.9 | RTSE T° 4.2 124.6 |
| 0.7 | RTSE T° 4.4 114.7 | RTSE T° 4.4 115.5 | RTSE T° 4.4 116.3 | RTSE T° 4.4 117.0 | RTSE T° 4.4 117.8 | RTSE T° 4.4 118.5 |
| | RTSE T° 4.2 120.3 | RTSE T° 4.2 121.1 | RTSE T° 4.2 121.9 | RTSE T° 4.2 122.7 | RTSE T° 4.2 123.4 | RTSE T° 4.2 124.1 |
| 0.8 | RTSE T° 4.4 114.2 | RTSE T° 4.4 115.0 | RTSE T° 4.4 115.8 | RTSE T° 4.4 116.6 | RTSE T° 4.4 117.3 | RTSE T° 4.4 118.1 |
| | RTSE T° 4.2 119.8 | RTSE T° 4.2 120.6 | RTSE T° 4.2 121.4 | RTSE T° 4.2 122.2 | RTSE T° 4.2 123.0 | RTSE T° 4.2 123.7 |
| 0.9 | RTSE T° 4.4 113.8 | RTSE T° 4.4 114.6 | RTSE T° 4.4 115.4 | RTSE T° 4.4 116.2 | RTSE T° 4.4 116.9 | RTSE T° 4.4 117.6 |
| | RTSE T° 4.2 119.4 | RTSE T° 4.2 120.2 | RTSE T° 4.2 121.0 | RTSE T° 4.2 121.8 | RTSE T° 4.2 122.5 | RTSE T° 4.2 123.2 |
| 1.0 | RTSE T° 4.4 113.4 | RTSE T° 4.4 114.2 | RTSE T° 4.4 115.0 | RTSE T° 4.4 115.7 | RTSE T° 4.4 116.5 | RTSE T° 4.4 117.2 |
| | RTSE T° 4.2 119.0 | RTSE T° 4.2 119.8 | RTSE T° 4.2 120.6 | RTSE T° 4.2 121.4 | RTSE T° 4.2 122.1 | RTSE T° 4.2 122.8 |
| 1.1 | RTSE T° 4.4 113.0 | RTSE T° 4.4 113.8 | RTSE T° 4.4 114.6 | RTSE T° 4.4 115.3 | RTSE T° 4.4 116.1 | RTSE T° 4.4 116.8 |
| | RTSE T° 4.2 118.6 | RTSE T° 4.2 119.4 | RTSE T° 4.2 120.2 | RTSE T° 4.2 121.0 | RTSE T° 4.2 121.7 | RTSE T° 4.2 122.4 |
| 1.2 | RTSE T° 4.4 112.6 | RTSE T° 4.4 113.4 | RTSE T° 4.4 114.2 | RTSE T° 4.4 115.0 | RTSE T° 4.4 115.7 | RTSE T° 4.4 116.5 |
| | RTSE T° 4.2 118.2 | RTSE T° 4.2 119.0 | RTSE T° 4.2 119.8 | RTSE T° 4.2 120.6 | RTSE T° 4.2 121.3 | RTSE T° 4.2 122.1 |
| 1.3 | RTSE T° 4.4 112.2 | RTSE T° 4.4 113.0 | RTSE T° 4.4 113.8 | RTSE T° 4.4 114.6 | RTSE T° 4.4 115.4 | RTSE T° 4.4 116.1 |
| | RTSE T° 4.2 117.9 | RTSE T° 4.2 118.7 | RTSE T° 4.2 119.5 | RTSE T° 4.2 120.2 | RTSE T° 4.2 121.0 | RTSE T° 4.2 121.7 |
| 1.4 | RTSE T° 4.4 111.9 | RTSE T° 4.4 112.7 | RTSE T° 4.4 113.5 | RTSE T° 4.4 114.3 | RTSE T° 4.4 115.0 | RTSE T° 4.4 115.7 |
| | RTSE T° 4.2 117.5 | RTSE T° 4.2 118.3 | RTSE T° 4.2 119.1 | RTSE T° 4.2 119.9 | RTSE T° 4.2 120.6 | RTSE T° 4.2 121.4 |
| 1.5 | RTSE T° 4.4 111.6 | RTSE T° 4.4 112.4 | RTSE T° 4.4 113.2 | RTSE T° 4.4 113.9 | RTSE T° 4.4 114.7 | RTSE T° 4.4 115.4 |
| | RTSE T° 4.2 117.2 | RTSE T° 4.2 118.0 | RTSE T° 4.2 118.8 | RTSE T° 4.2 119.6 | RTSE T° 4.2 120.3 | RTSE T° 4.2 121.0 |

Fig.4B

| MELT-INDEX | DENSITY | | | | | |
|---|---|---|---|---|---|---|
| | 951 | 952 | 953 | 954 | 955 | 956 |
| 0.5 | RTSE T° 4.4 120.2 | RTSE T° 4.4 120.9 | RTSE T° 4.4 121.6 | RTSE T° 4.4 122.2 | RTSE T° 4.4 122.8 | RTSE T° 4.4 123.4 |
| | RTSE T° 4.2 125.8 | RTSE T° 4.2 126.5 | RTSE T° 4.2 127.2 | RTSE T° 4.2 127.8 | RTSE T° 4.2 128.5 | RTSE T° 4.2 129.1 |
| 0.6 | RTSE T° 4.4 119.7 | RTSE T° 4.4 120.4 | RTSE T° 4.4 121.1 | RTSE T° 4.4 121.7 | RTSE T° 4.4 122.3 | RTSE T° 4.4 122.9 |
| | RTSE T° 4.2 125.3 | RTSE T° 4.2 126.0 | RTSE T° 4.2 126.7 | RTSE T° 4.2 127.3 | RTSE T° 4.2 127.9 | RTSE T° 4.2 128.6 |
| 0.7 | RTSE T° 4.4 119.2 | RTSE T° 4.4 119.9 | RTSE T° 4.4 120.6 | RTSE T° 4.4 121.2 | RTSE T° 4.4 121.8 | RTSE T° 4.4 122.5 |
| | RTSE T° 4.2 124.8 | RTSE T° 4.2 125.5 | RTSE T° 4.2 126.2 | RTSE T° 4.2 126.8 | RTSE T° 4.2 127.5 | RTSE T° 4.2 128.1 |
| 0.8 | RTSE T° 4.4 118.8 | RTSE T° 4.4 119.5 | RTSE T° 4.4 120.1 | RTSE T° 4.4 120.8 | RTSE T° 4.4 121.4 | RTSE T° 4.4 122.0 |
| | RTSE T° 4.2 124.4 | RTSE T° 4.2 125.1 | RTSE T° 4.2 125.7 | RTSE T° 4.2 126.4 | RTSE T° 4.2 127.0 | RTSE T° 4.2 127.6 |
| 0.9 | RTSE T° 4.4 118.3 | RTSE T° 4.4 119.0 | RTSE T° 4.4 119.7 | RTSE T° 4.4 120.3 | RTSE T° 4.4 121.0 | RTSE T° 4.4 121.6 |
| | RTSE T° 4.2 124.0 | RTSE T° 4.2 124.6 | RTSE T° 4.2 125.3 | RTSE T° 4.2 126.0 | RTSE T° 4.2 126.6 | RTSE T° 4.2 127.2 |
| 1.0 | RTSE T° 4.4 117.9 | RTSE T° 4.4 118.6 | RTSE T° 4.4 119.3 | RTSE T° 4.4 119.9 | RTSE T° 4.4 120.5 | RTSE T° 4.4 21.2 |
| | RTSE T° 4.2 123.5 | RTSE T° 4.2 124.2 | RTSE T° 4.2 124.9 | RTSE T° 4.2 125.5 | RTSE T° 4.2 126.2 | RTSE T° 4.2 126.8 |
| 1.1 | RTSE T° 4.4 117.5 | RTSE T° 4.4 118.2 | RTSE T° 4.4 118.9 | RTSE T° 4.4 119.5 | RTSE T° 4.4 120.2 | RTSE T° 4.4 120.8 |
| | RTSE T° 4.2 123.2 | RTSE T° 4.2 123.8 | RTSE T° 4.2 124.5 | RTSE T° 4.2 125.1 | RTSE T° 4.2 125.8 | RTSE T° 4.2 126.4 |
| 1.2 | RTSE T° 4.4 117.2 | RTSE T° 4.4 117.8 | RTSE T° 4.4 118.5 | RTSE T° 4.4 119.2 | RTSE T° 4.4 119.8 | RTSE T° 4.4 120.4 |
| | RTSE T° 4.2 122.8 | RTSE T° 4.2 123.5 | RTSE T° 4.2 124.1 | RTSE T° 4.2 124.8 | RTSE T° 4.2 125.4 | RTSE T° 4.2 126.0 |
| 1.3 | RTSE T° 4.4 116.8 | RTSE T° 4.4 117.5 | RTSE T° 4.4 118.2 | RTSE T° 4.4 118.8 | RTSE T° 4.4 119.4 | RTSE T° 4.4 120.0 |
| | RTSE T° 4.2 122.4 | RTSE T° 4.2 123.1 | RTSE T° 4.2 123.8 | RTSE T° 4.2 124.4 | RTSE T° 4.2 125.0 | RTSE T° 4.2 125.6 |
| 1.4 | RTSE T° 4.4 116.5 | RTSE T° 4.4 117.1 | RTSE T° 4.4 117.8 | RTSE T° 4.4 118.5 | RTSE T° 4.4 119.1 | RTSE T° 4.4 199.7 |
| | RTSE T° 4.2 122.1 | RTSE T° 4.2 122.8 | RTSE T° 4.2 123.4 | RTSE T° 4.2 124.1 | RTSE T° 4.2 124.7 | RTSE T° 4.2 125.3 |
| 1.5 | RTSE T° 4.4 116.1 | RTSE T° 4.4 116.8 | RTSE T° 4.4 117.5 | RTSE T° 4.4 118.1 | RTSE T° 4.4 118.7 | RTSE T° 4.4 119.4 |
| | RTSE T° 4.2 121.7 | RTSE T° 4.2 122.4 | RTSE T° 4.2 123.1 | RTSE T° 4.2 123.7 | RTSE T° 4.2 124.4 | RTSE T° 4.2 125.0 |

Fig.4C

| MELT-INDEX | DENSITY | | | |
|---|---|---|---|---|
| | 957 | 958 | 959 | 960 |
| 0.5 | RTSE T°<br>4.4  124.0 | RTSE T°<br>4.4  124.6 | RTSE T°<br>4.4  125.1 | RTSE T°<br>4.4  125.7 |
| | RTSE T°<br>4.2  129.7 | RTSE T°<br>4.2  130.2 | RTSE T°<br>4.2  130.8 | RTSE T°<br>4.2  131.3 |
| 0.6 | RTSE T°<br>4.4  123.5 | RTSE T°<br>4.4  124.1 | RTSE T°<br>4.4  124.6 | RTSE T°<br>4.4  125.2 |
| | RTSE T°<br>4.2  129.1 | RTSE T°<br>4.2  129.7 | RTSE T°<br>4.2  130.3 | RTSE T°<br>4.2  130.8 |
| 0.7 | RTSE T°<br>4.4  123.0 | RTSE T°<br>4.4  123.6 | RTSE T°<br>4.4  124.2 | RTSE T°<br>4.4  124.7 |
| | RTSE T°<br>4.2  128.7 | RTSE T°<br>4.2  129.2 | RTSE T°<br>4.2  129.8 | RTSE T°<br>4.2  130.3 |
| 0.8 | RTSE T°<br>4.4  122.6 | RTSE T°<br>4.4  123.2 | RTSE T°<br>4.4  123.7 | RTSE T°<br>4.4  124.2 |
| | RTSE T°<br>4.2  128.2 | RTSE T°<br>4.2  128.8 | RTSE T°<br>4.2  129.3 | RTSE T°<br>4.2  129.8 |
| 0.9 | RTSE T°<br>4.4  122.2 | RTSE T°<br>4.4  122.7 | RTSE T°<br>4.4  123.3 | RTSE T°<br>4.4  123.8 |
| | RTSE T°<br>4.2  127.8 | RTSE T°<br>4.2  128.3 | RTSE T°<br>4.2  128.9 | RTSE T°<br>4.2  129.4 |
| 1.0 | RTSE T°<br>4.4  121.7 | RTSE T°<br>4.4  122.3 | RTSE T°<br>4.4  122.9 | RTSE T°<br>4.4  123.4 |
| | RTSE T°<br>4.2  127.4 | RTSE T°<br>4.2  127.9 | RTSE T°<br>4.2  128.5 | RTSE T°<br>4.2  129.0 |
| 1.1 | RTSE T°<br>4.4  121.3 | RTSE T°<br>4.4  121.9 | RTSE T°<br>4.4  122.5 | RTSE T°<br>4.4  123.0 |
| | RTSE T°<br>4.2  127.0 | RTSE T°<br>4.2  127.5 | RTSE T°<br>4.2  128.1 | RTSE T°<br>4.2  128.6 |
| 1.2 | RTSE T°<br>4.4  121.0 | RTSE T°<br>4.4  121.5 | RTSE T°<br>4.4  122.1 | RTSE T°<br>4.4  122.6 |
| | RTSE T°<br>4.2  126.6 | RTSE T°<br>4.2  127.2 | RTSE T°<br>4.2  127.7 | RTSE T°<br>4.2  128.2 |
| 1.3 | RTSE T°<br>4.4  120.6 | RTSE T°<br>4.4  121.2 | RTSE T°<br>4.4  121.7 | RTSE T°<br>4.4  122.3 |
| | RTSE T°<br>4.2  126.2 | RTSE T°<br>4.2  126.8 | RTSE T°<br>4.2  127.3 | RTSE T°<br>4.2  127.9 |
| 1.4 | RTSE T°<br>4.4  120.3 | RTSE T°<br>4.4  120.8 | RTSE T°<br>4.4  121.4 | RTSE T°<br>4.4  121.9 |
| | RTSE T°<br>4.2  125.9 | RTSE T°<br>4.2  126.5 | RTSE T°<br>4.2  127.0 | RTSE T°<br>4.2  127.5 |
| 1.5 | RTSE T°<br>4.4  119.9 | RTSE T°<br>4.4  120.5 | RTSE T°<br>4.4  121.1 | RTSE T°<br>4.4  121.6 |
| | RTSE T°<br>4.2  125.6 | RTSE T°<br>4.2  126.1 | RTSE T°<br>4.2  126.7 | RTSE T°<br>4.2  127.2 |

Fig.5A

| MELT-INDEX | DENSITY | | | | | |
|---|---|---|---|---|---|---|
| | 930 | 931 | 932 | 933 | 934 | 935 |
| 11.0 | RTSE T° 4.4  83.6 | RTSE T° 4.4  84.8 | RTSE T° 4.4  85.9 | RTSE T° 4.4  87.1 | RTSE T° 4.4  88.2 | RTSE T° 4.4  89.2 |
| | RTSE T° 4.2  89.2 | RTSE T° 4.2  90.4 | RTSE T° 4.2  91.6 | RTSE T° 4.2  92.7 | RTSE T° 4.2  93.8 | RTSE T° 4.2  94.9 |
| 12.0 | RTSE T° 4.4  83.0 | RTSE T° 4.4  84.2 | RTSE T° 4.4  85.3 | RTSE T° 4.4  86.4 | RTSE T° 4.4  87.5 | RTSE T° 4.4  88.6 |
| | RTSE T° 4.2  88.6 | RTSE T° 4.2  89.8 | RTSE T° 4.2  90.9 | RTSE T° 4.2  92.1 | RTSE T° 4.2  93.2 | RTSE T° 4.2  94.2 |
| 13.0 | RTSE T° 4.4  82.4 | RTSE T° 4.4  83.6 | RTSE T° 4.4  84.7 | RTSE T° 4.4  85.9 | RTSE T° 4.4  87.0 | RTSE T° 4.4  88.0 |
| | RTSE T° 4.2  88.0 | RTSE T° 4.2  89.2 | RTSE T° 4.2  90.3 | RTSE T° 4.2  91.5 | RTSE T° 4.2  92.6 | RTSE T° 4.2  93.7 |
| 14.0 | RTSE T° 4.4  81.9 | RTSE T° 4.4  83.0 | RTSE T° 4.4  84.2 | RTSE T° 4.4  85.3 | RTSE T° 4.4  86.4 | RTSE T° 4.4  87.5 |
| | RTSE T° 4.2  87.5 | RTSE T° 4.2  88.7 | RTSE T° 4.2  89.8 | RTSE T° 4.2  90.9 | RTSE T° 4.2  92.0 | RTSE T° 4.2  93.1 |
| 16.0 | RTSE T° 4.4  80.9 | RTSE T° 4.4  82.1 | RTSE T° 4.4  83.2 | RTSE T° 4.4  84.4 | RTSE T° 4.4  85.5 | RTSE T° 4.4  86.6 |
| | RTSE T° 4.2  86.5 | RTSE T° 4.2  87.7 | RTSE T° 4.2  88.9 | RTSE T° 4.2  90.0 | RTSE T° 4.2  91.1 | RTSE T° 4.2  92.2 |
| 18.0 | RTSE T° 4.4  80.1 | RTSE T° 4.4  81.3 | RTSE T° 4.4  82.4 | RTSE T° 4.4  83.6 | RTSE T° 4.4  84.7 | RTSE T° 4.4  85.7 |
| | RTSE T° 4.2  85.7 | RTSE T° 4.2  86.9 | RTSE T° 4.2  88.0 | RTSE T° 4.2  89.2 | RTSE T° 4.2  90.3 | RTSE T° 4.2  91.4 |
| 20.0 | RTSE T° 4.4  79.4 | RTSE T° 4.4  80.6 | RTSE T° 4.4  81.7 | RTSE T° 4.4  82.8 | RTSE T° 4.4  83.9 | RTSE T° 4.4  85.0 |
| | RTSE T° 4.2  85.0 | RTSE T° 4.2  86.2 | RTSE T° 4.2  87.3 | RTSE T° 4.2  88.5 | RTSE T° 4.2  89.6 | RTSE T° 4.2  90.6 |
| 22.0 | RTSE T° 4.4  78.8 | RTSE T° 4.4  79.9 | RTSE T° 4.4  81.1 | RTSE T° 4.4  82.2 | RTSE T° 4.4  83.3 | RTSE T° 4.4  84.4 |
| | RTSE T° 4.2  84.4 | RTSE T° 4.2  85.6 | RTSE T° 4.2  86.7 | RTSE T° 4.2  87.8 | RTSE T° 4.2  88.9 | RTSE T° 4.2  90.0 |
| 24.0 | RTSE T° 4.4  78.2 | RTSE T° 4.4  79.4 | RTSE T° 4.4  80.5 | RTSE T° 4.4  81.7 | RTSE T° 4.4  82.8 | RTSE T° 4.4  83.9 |
| | RTSE T° 4.2  83.8 | RTSE T° 4.2  85.0 | RTSE T° 4.2  86.2 | RTSE T° 4.2  87.3 | RTSE T° 4.2  88.4 | RTSE T° 4.2  89.5 |
| 27.0 | RTSE T° 4.4  77.5 | RTSE T° 4.4  78.7 | RTSE T° 4.4  79.8 | RTSE T° 4.4  81.0 | RTSE T° 4.4  82.1 | RTSE T° 4.4  83.1 |
| | RTSE T° 4.2  83.1 | RTSE T° 4.2  84.3 | RTSE T° 4.2  85.5 | RTSE T° 4.2  86.6 | RTSE T° 4.2  87.7 | RTSE T° 4.2  88.8 |
| 30.0 | RTSE T° 4.4  76.9 | RTSE T° 4.4  78.1 | RTSE T° 4.4  79.3 | RTSE T° 4.4  80.4 | RTSE T° 4.4  81.5 | RTSE T° 4.4  82.6 |
| | RTSE T° 4.2  82.5 | RTSE T° 4.2  83.7 | RTSE T° 4.2  84.9 | RTSE T° 4.2  86.0 | RTSE T° 4.2  87.1 | RTSE T° 4.2  88.2 |

Fig.5B

| MELT-INDEX | DENSITY 936 | 937 | 938 | 939 | 940 | 941 |
|---|---|---|---|---|---|---|
| 11.0 | RTSE 4.4  T° 90.3 | RTSE 4.4  T° 91.3 | RTSE 4.4  T° 92.3 | RTSE 4.4  T° 93.3 | RTSE 4.4  T° 94.3 | RTSE 4.4  T° 95.2 |
|  | RTSE 4.2  T° 95.9 | RTSE 4.2  T° 96.9 | RTSE 4.2  T° 97.9 | RTSE 4.2  T° 98.9 | RTSE 4.2  T° 99.9 | RTSE 4.2  T° 100.8 |
| 12.0 | RTSE 4.4  T° 89.7 | RTSE 4.4  T° 90.7 | RTSE 4.4  T° 91.7 | RTSE 4.4  T° 92.7 | RTSE 4.4  T° 93.6 | RTSE 4.4  T° 94.6 |
|  | RTSE 4.2  T° 95.3 | RTSE 4.2  T° 96.3 | RTSE 4.2  T° 97.3 | RTSE 4.2  T° 98.3 | RTSE 4.2  T° 99.2 | RTSE 4.2  T° 100.2 |
| 13.0 | RTSE 4.4  T° 89.1 | RTSE 4.4  T° 90.1 | RTSE 4.4  T° 91.1 | RTSE 4.4  T° 92.1 | RTSE 4.4  T° 93.0 | RTSE 4.4  T° 94.0 |
|  | RTSE 4.2  T° 94.7 | RTSE 4.2  T° 95.7 | RTSE 4.2  T° 96.7 | RTSE 4.2  T° 97.7 | RTSE 4.2  T° 98.7 | RTSE 4.2  T° 99.6 |
| 14.0 | RTSE 4.4  T° 88.6 | RTSE 4.4  T° 89.6 | RTSE 4.4  T° 90.6 | RTSE 4.4  T° 91.6 | RTSE 4.4  T° 92.5 | RTSE 4.4  T° 93.4 |
|  | RTSE 4.2  T° 94.2 | RTSE 4.2  T° 95.2 | RTSE 4.2  T° 96.2 | RTSE 4.2  T° 97.2 | RTSE 4.2  T° 98.1 | RTSE 4.2  T° 99.1 |
| 16.0 | RTSE 4.4  T° 87.6 | RTSE 4.4  T° 88.6 | RTSE 4.4  T° 89.6 | RTSE 4.4  T° 90.6 | RTSE 4.4  T° 91.6 | RTSE 4.4  T° 92.5 |
|  | RTSE 4.2  T° 93.2 | RTSE 4.2  T° 94.2 | RTSE 4.2  T° 95.3 | RTSE 4.2  T° 96.2 | RTSE 4.2  T° 97.2 | RTSE 4.2  T° 98.1 |
| 18.0 | RTSE 4.4  T° 86.8 | RTSE 4.4  T° 87.8 | RTSE 4.4  T° 88.8 | RTSE 4.4  T° 89.8 | RTSE 4.4  T° 90.7 | RTSE 4.4  T° 91.7 |
|  | RTSE 4.2  T° 92.4 | RTSE 4.2  T° 93.4 | RTSE 4.2  T° 94.4 | RTSE 4.2  T° 95.4 | RTSE 4.2  T° 96.4 | RTSE 4.2  T° 97.3 |
| 20.0 | RTSE 4.4  T° 86.1 | RTSE 4.4  T° 87.1 | RTSE 4.4  T° 88.1 | RTSE 4.4  T° 89.1 | RTSE 4.4  T° 90.0 | RTSE 4.4  T° 91.0 |
|  | RTSE 4.2  T° 91.7 | RTSE 4.2  T° 92.7 | RTSE 4.2  T° 93.7 | RTSE 4.2  T° 94.7 | RTSE 4.2  T° 95.7 | RTSE 4.2  T° 96.6 |
| 22.0 | RTSE 4.4  T° 85.5 | RTSE 4.4  T° 88.5 | RTSE 4.4  T° 87.5 | RTSE 4.4  T° 88.5 | RTSE 4.4  T° 89.4 | RTSE 4.4  T° 90.3 |
|  | RTSE 4.2  T° 91.1 | RTSE 4.2  T° 92.1 | RTSE 4.2  T° 93.1 | RTSE 4.2  T° 94.1 | RTSE 4.2  T° 95.0 | RTSE 4.2  T° 96.0 |
| 24.0 | RTSE 4.4  T° 84.9 | RTSE 4.4  T° 85.9 | RTSE 4.4  T° 86.9 | RTSE 4.4  T° 87.9 | RTSE 4.4  T° 88.9 | RTSE 4.4  T° 89.8 |
|  | RTSE 4.2  T° 90.5 | RTSE 4.2  T° 91.5 | RTSE 4.2  T° 92.6 | RTSE 4.2  T° 93.5 | RTSE 4.2  T° 94.5 | RTSE 4.2  T° 95.4 |
| 27.0 | RTSE 4.4  T° 84.2 | RTSE 4.4  T° 85.2 | RTSE 4.4  T° 86.2 | RTSE 4.4  T° 87.2 | RTSE 4.4  T° 88.2 | RTSE 4.4  T° 89.1 |
|  | RTSE 4.2  T° 89.8 | RTSE 4.2  T° 90.8 | RTSE 4.2  T° 91.8 | RTSE 4.2  T° 92.8 | RTSE 4.2  T° 93.8 | RTSE 4.2  T° 94.7 |
| 30.0 | RTSE 4.4  T° 83.6 | RTSE 4.4  T° 84.6 | RTSE 4.4  T° 85.6 | RTSE 4.4  T° 86.6 | RTSE 4.4  T° 87.6 | RTSE 4.4  T° 88.5 |
|  | RTSE 4.2  T° 89.2 | RTSE 4.2  T° 90.3 | RTSE 4.2  T° 91.3 | RTSE 4.2  T° 92.2 | RTSE 4.2  T° 93.2 | RTSE 4.2  T° 94.1 |

Fig.5C

| MELT-INDEX | DENSITY | | | |
|---|---|---|---|---|
| | 942 | 943 | 944 | 945 |
| 11.0 | RTSE T° 4.4  96.1 | RTSE T° 4.4  97.0 | RTSE T° 4.4  97.8 | RTSE T° 4.4  98.7 |
| | RTSE T° 4.2  101.7 | RTSE T° 4.2  102.6 | RTSE T° 4.2  103.5 | RTSE T° 4.2  104.3 |
| 12.0 | RTSE T° 4.4  95.5 | RTSE T° 4.4  96.4 | RTSE T° 4.4  97.2 | RTSE T° 4.4  98.1 |
| | RTSE T° 4.2  101.1 | RTSE T° 4.2  102.0 | RTSE T° 4.2  102.8 | RTSE T° 4.2  103.7 |
| 13.0 | RTSE T° 4.4  94.4 | RTSE T° 4.4  95.8 | RTSE T° 4.4  96.6 | RTSE T° 4.4  97.5 |
| | RTSE T° 4.2  100.5 | RTSE T° 4.2  101.4 | RTSE T° 4.2  102.3 | RTSE T° 4.2  103.1 |
| 14.0 | RTSE T° 4.4  94.4 | RTSE T° 4.4  95.2 | RTSE T° 4.4  96.1 | RTSE T° 4.4  96.9 |
| | RTSE T° 4.2  100.0 | RTSE T° 4.2  100.9 | RTSE T° 4.2  101.7 | RTSE T° 4.2  102.6 |
| 16.0 | RTSE T° 4.4  93.4 | RTSE T° 4.4  94.3 | RTSE T° 4.4  95.2 | RTSE T° 4.4  96.0 |
| | RTSE T° 4.2  99.0 | RTSE T° 4.2  99.9 | RTSE T° 4.2  100.8 | RTSE T° 4.2  101.6 |
| 18.0 | RTSE T° 4.4  92.6 | RTSE T° 4.4  93.5 | RTSE T° 4.4  94.3 | RTSE T° 4.4  95.2 |
| | RTSE T° 4.2  98.2 | RTSE T° 4.2  99.1 | RTSE T° 4.2  100.0 | RTSE T° 4.2  100.8 |
| 20.0 | RTSE T° 4.4  91.9 | RTSE T° 4.4  92.8 | RTSE T° 4.4  93.6 | RTSE T° 4.4  94.5 |
| | RTSE T° 4.2  97.5 | RTSE T° 4.2  98.4 | RTSE T° 4.2  99.2 | RTSE T° 4.2  100.1 |
| 22.0 | RTSE T° 4.4  91.3 | RTSE T° 4.4  92.1 | RTSE T° 4.4  93.0 | RTSE T° 4.4  93.8 |
| | RTSE T° 4.2  96.9 | RTSE T° 4.2  97.8 | RTSE T° 4.2  98.6 | RTSE T° 4.2  99.5 |
| 24.0 | RTSE T° 4.4  90.7 | RTSE T° 4.4  91.6 | RTSE T° 4.4  92.5 | RTSE T° 4.4  93.3 |
| | RTSE T° 4.2  96.3 | RTSE T° 4.2  97.2 | RTSE T° 4.2  98.1 | RTSE T° 4.2  98.9 |
| 27.0 | RTSE T° 4.4  90.0 | RTSE T° 4.4  90.9 | RTSE T° 4.4  91.7 | RTSE T° 4.4  92.6 |
| | RTSE T° 4.2  95.6 | RTSE T° 4.2  96.5 | RTSE T° 4.2  97.4 | RTSE T° 4.2  98.2 |
| 30.0 | RTSE T° 4.4  89.4 | RTSE T° 4.4  90.3 | RTSE T° 4.4  91.2 | RTSE T° 4.4  92.0 |
| | RTSE T° 4.2  95.0 | RTSE T° 4.2  95.9 | RTSE T° 4.2  96.8 | RTSE T° 4.2  97.6 |

Fig.6A

| MELT-INDEX | DENSITY | | | | | |
|---|---|---|---|---|---|---|
| | 930 | 931 | 932 | 933 | 934 | 935 |
| 3.9 | RTSE 4.4  T° 91.0 | RTSE 4.4  T° 92.1 | RTSE 4.4  T° 93.3 | RTSE 4.4  T° 94.4 | RTSE 4.4  T° 95.5 | RTSE 4.4  T° 96.6 |
| | RTSE 4.2  T° 96.6 | RTSE 4.2  T° 97.8 | RTSE 4.2  T° 98.9 | RTSE 4.2  T° 100.0 | RTSE 4.2  T° 101.1 | RTSE 4.2  T° 102.2 |
| 4.3 | RTSE 4.4  T° 90.3 | RTSE 4.4  T° 91.5 | RTSE 4.4  T° 92.6 | RTSE 4.4  T° 93.8 | RTSE 4.4  T° 94.9 | RTSE 4.4  T° 95.9 |
| | RTSE 4.2  T° 95.9 | RTSE 4.2  T° 97.1 | RTSE 4.2  T° 98.3 | RTSE 4.2  T° 99.4 | RTSE 4.2  T° 100.5 | RTSE 4.2  T° 101.6 |
| 4.8 | RTSE 4.4  T° 89.6 | RTSE 4.4  T° 90.7 | RTSE 4.4  T° 91.9 | RTSE 4.4  T° 93.0 | RTSE 4.4  T° 94.1 | RTSE 4.4  T° 95.2 |
| | RTSE 4.2  T° 95.2 | RTSE 4.2  T° 96.4 | RTSE 4.2  T° 97.5 | RTSE 4.2  T° 98.6 | RTSE 4.2  T° 99.7 | RTSE 4.2  T° 100.8 |
| 5.3 | RTSE 4.4  T° 88.9 | RTSE 4.4  T° 90.1 | RTSE 4.4  T° 91.2 | RTSE 4.4  T° 92.3 | RTSE 4.4  T° 93.4 | RTSE 4.4  T° 94.5 |
| | RTSE 4.2  T° 94.5 | RTSE 4.2  T° 95.7 | RTSE 4.2  T° 96.8 | RTSE 4.2  T° 98.0 | RTSE 4.2  T° 99.1 | RTSE 4.2  T° 100.1 |
| 5.9 | RTSE 4.4  T° 88.1 | RTSE 4.4  T° 89.3 | RTSE 4.4  T° 90.5 | RTSE 4.4  T° 91.6 | RTSE 4.4  T° 92.7 | RTSE 4.4  T° 93.8 |
| | RTSE 4.2  T° 93.8 | RTSE 4.2  T° 94.9 | RTSE 4.2  T° 96.1 | RTSE 4.2  T° 97.2 | RTSE 4.2  T° 98.3 | RTSE 4.2  T° 99.4 |
| 6.5 | RTSE 4.4  T° 87.4 | RTSE 4.4  T° 88.6 | RTSE 4.4  T° 89.8 | RTSE 4.4  T° 90.9 | RTSE 4.4  T° 92.0 | RTSE 4.4  T° 93.1 |
| | RTSE 4.2  T° 93.1 | RTSE 4.2  T° 94.2 | RTSE 4.2  T° 95.4 | RTSE 4.2  T° 96.5 | RTSE 4.2  T° 97.6 | RTSE 4.2  T° 98.7 |
| 7.2 | RTSE 4.4  T° 86.7 | RTSE 4.4  T° 87.9 | RTSE 4.4  T° 89.0 | RTSE 4.4  T° 90.2 | RTSE 4.4  T° 91.3 | RTSE 4.4  T° 92.3 |
| | RTSE 4.2  T° 92.3 | RTSE 4.2  T° 93.5 | RTSE 4.2  T° 94.7 | RTSE 4.2  T° 95.8 | RTSE 4.2  T° 96.9 | RTSE 4.2  T° 98.0 |
| 8.0 | RTSE 4.4  T° 85.9 | RTSE 4.4  T° 87.1 | RTSE 4.4  T° 88.3 | RTSE 4.4  T° 89.4 | RTSE 4.4  T° 90.5 | RTSE 4.4  T° 91.6 |
| | RTSE 4.2  T° 91.6 | RTSE 4.2  T° 92.7 | RTSE 4.2  T° 93.9 | RTSE 4.2  T° 95.0 | RTSE 4.2  T° 96.1 | RTSE 4.2  T° 97.2 |
| 8.9 | RTSE 4.4  T° 85.2 | RTSE 4.4  T° 86.3 | RTSE 4.4  T° 87.5 | RTSE 4.4  T° 88.6 | RTSE 4.4  T° 89.7 | RTSE 4.4  T° 90.8 |
| | RTSE 4.2  T° 90.8 | RTSE 4.2  T° 92.0 | RTSE 4.2  T° 93.1 | RTSE 4.2  T° 94.2 | RTSE 4.2  T° 95.3 | RTSE 4.2  T° 96.4 |
| 9.9 | RTSE 4.4  T° 84.4 | RTSE 4.4  T° 85.6 | RTSE 4.4  T° 86.7 | RTSE 4.4  T° 87.8 | RTSE 4.4  T° 88.9 | RTSE 4.4  T° 90.0 |
| | RTSE 4.2  T° 90.0 | RTSE 4.2  T° 91.2 | RTSE 4.2  T° 92.3 | RTSE 4.2  T° 93.5 | RTSE 4.2  T° 94.6 | RTSE 4.2  T° 95.6 |
| 11.0 | RTSE 4.4  T° 83.6 | RTSE 4.4  T° 84.8 | RTSE 4.4  T° 85.9 | RTSE 4.4  T° 87.1 | RTSE 4.4  T° 88.2 | RTSE 4.4  T° 89.2 |
| | RTSE 4.2  T° 89.2 | RTSE 4.2  T° 90.4 | RTSE 4.2  T° 91.6 | RTSE 4.2  T° 92.7 | RTSE 4.2  T° 93.8 | RTSE 4.2  T° 94.9 |

Fig.6B

| MELT-INDEX | DENSITY | | | | | |
|---|---|---|---|---|---|---|
| | 936 | 937 | 938 | 939 | 940 | 941 |
| 3.9 | RTSE T°<br>4.4  97.6 | RTSE T°<br>4.4  98.7 | RTSE T°<br>4.4  99.7 | RTSE T°<br>4.4  100.7 | RTSE T°<br>4.4  101.6 | RTSE T°<br>4.4  102.5 |
| | RTSE T°<br>4.2  103.3 | RTSE T°<br>4.2  104.3 | RTSE T°<br>4.2  105.3 | RTSE T°<br>4.2  106.3 | RTSE T°<br>4.2  107.2 | RTSE T°<br>4.2  108.2 |
| 4.3 | RTSE T°<br>4.4  97.0 | RTSE T°<br>4.4  98.0 | RTSE T°<br>4.4  99.0 | RTSE T°<br>4.4  100.0 | RTSE T°<br>4.4  101.0 | RTSE T°<br>4.4  101.9 |
| | RTSE T°<br>4.2  102.6 | RTSE T°<br>4.2  103.6 | RTSE T°<br>4.2  104.6 | RTSE T°<br>4.2  105.6 | RTSE T°<br>4.2  106.6 | RTSE T°<br>4.2  107.5 |
| 4.8 | RTSE T°<br>4.4  96.3 | RTSE T°<br>4.4  97.3 | RTSE T°<br>4.4  98.3 | RTSE T°<br>4.4  99.3 | RTSE T°<br>4.4  100.2 | RTSE T°<br>4.4  101.1 |
| | RTSE T°<br>4.2  101.9 | RTSE T°<br>4.2  102.9 | RTSE T°<br>4.2  103.9 | RTSE T°<br>4.2  104.9 | RTSE T°<br>4.2  105.8 | RTSE T°<br>4.2  106.8 |
| 5.3 | RTSE T°<br>4.4  95.6 | RTSE T°<br>4.4  96.6 | RTSE T°<br>4.4  97.6 | RTSE T°<br>4.4  98.6 | RTSE T°<br>4.4  99.5 | RTSE T°<br>4.4  100.5 |
| | RTSE T°<br>4.2  101.2 | RTSE T°<br>4.2  102.2 | RTSE T°<br>4.2  103.2 | RTSE T°<br>4.2  104.2 | RTSE T°<br>4.2  105.1 | RTSE T°<br>4.2  106.1 |
| 5.9 | RTSE T°<br>4.4  94.8 | RTSE T°<br>4.4  95.8 | RTSE T°<br>4.4  96.8 | RTSE T°<br>4.4  97.8 | RTSE T°<br>4.4  98.8 | RTSE T°<br>4.4  99.7 |
| | RTSE T°<br>4.2  100.4 | RTSE T°<br>4.2  101.5 | RTSE T°<br>4.2  102.5 | RTSE T°<br>4.2  103.4 | RTSE T°<br>4.2  104.4 | RTSE T°<br>4.2  105.3 |
| 6.5 | RTSE T°<br>4.4  94.1 | RTSE T°<br>4.4  95.2 | RTSE T°<br>4.4  96.2 | RTSE T°<br>4.4  97.1 | RTSE T°<br>4.4  98.1 | RTSE T°<br>4.4  99.0 |
| | RTSE T°<br>4.2  99.7 | RTSE T°<br>4.2  100.8 | RTSE T°<br>4.2  101.8 | RTSE T°<br>4.2  102.8 | RTSE T°<br>4.2  103.7 | RTSE T°<br>4.2  104.6 |
| 7.2 | RTSE T°<br>4.4  93.4 | RTSE T°<br>4.4  94.4 | RTSE T°<br>4.4  95.4 | RTSE T°<br>4.4  96.4 | RTSE T°<br>4.4  97.4 | RTSE T°<br>4.4  98.3 |
| | RTSE T°<br>4.2  99.0 | RTSE T°<br>4.2  100.0 | RTSE T°<br>4.2  101.0 | RTSE T°<br>4.2  102.0 | RTSE T°<br>4.2  103.0 | RTSE T°<br>4.2  103.9 |
| 8.0 | RTSE T°<br>4.4  92.6 | RTSE T°<br>4.4  93.7 | RTSE T°<br>4.4  94.7 | RTSE T°<br>4.4  95.6 | RTSE T°<br>4.4  96.6 | RTSE T°<br>4.4  97.5 |
| | RTSE T°<br>4.2  98.2 | RTSE T°<br>4.2  99.3 | RTSE T°<br>4.2  100.3 | RTSE T°<br>4.2  101.3 | RTSE T°<br>4.2  102.2 | RTSE T°<br>4.2  103.1 |
| 8.9 | RTSE T°<br>4.4  91.8 | RTSE T°<br>4.4  92.9 | RTSE T°<br>4.4  93.9 | RTSE T°<br>4.4  94.9 | RTSE T°<br>4.4  95.8 | RTSE T°<br>4.4  96.7 |
| | RTSE T°<br>4.2  97.5 | RTSE T°<br>4.2  98.5 | RTSE T°<br>4.2  99.5 | RTSE T°<br>4.2  100.5 | RTSE T°<br>4.2  101.4 | RTSE T°<br>4.2  102.4 |
| 9.9 | RTSE T°<br>4.4  91.1 | RTSE T°<br>4.4  92.1 | RTSE T°<br>4.4  93.1 | RTSE T°<br>4.4  94.1 | RTSE T°<br>4.4  95.0 | RTSE T°<br>4.4  96.0 |
| | RTSE T°<br>4.2  96.7 | RTSE T°<br>4.2  97.7 | RTSE T°<br>4.2  98.7 | RTSE T°<br>4.2  99.7 | RTSE T°<br>4.2  100.7 | RTSE T°<br>4.2  101.6 |
| 11.0 | RTSE T°<br>4.4  90.3 | RTSE T°<br>4.4  91.3 | RTSE T°<br>4.4  92.3 | RTSE T°<br>4.4  93.3 | RTSE T°<br>4.4  94.3 | RTSE T°<br>4.4  95.2 |
| | RTSE T°<br>4.2  95.9 | RTSE T°<br>4.2  96.9 | RTSE T°<br>4.2  97.9 | RTSE T°<br>4.2  98.9 | RTSE T°<br>4.2  99.9 | RTSE T°<br>4.2  100.8 |

Fig.6C

| MELT-INDEX | DENSITY | | | |
|---|---|---|---|---|
| | 942 | 943 | 944 | 945 |
| 3.9 | RTSE T° 4.4 103.4 | RTSE T° 4.4 104.3 | RTSE T° 4.4 105.2 | RTSE T° 4.4 106.0 |
| | RTSE T° 4.2 109.1 | RTSE T° 4.2 110.0 | RTSE T° 4.2 110.8 | RTSE T° 4.2 111.7 |
| 4.3 | RTSE T° 4.4 102.8 | RTSE T° 4.4 103.7 | RTSE T° 4.4 104.5 | RTSE T° 4.4 105.4 |
| | RTSE T° 4.2 108.4 | RTSE T° 4.2 109.3 | RTSE T° 4.2 110.2 | RTSE T° 4.2 111.0 |
| 4.8 | RTSE T° 4.4 102.1 | RTSE T° 4.4 102.9 | RTSE T° 4.4 103.8 | RTSE T° 4.4 104.6 |
| | RTSE T° 4.2 107.7 | RTSE T° 4.2 108.6 | RTSE T° 4.2 109.4 | RTSE T° 4.2 110.3 |
| 5.3 | RTSE T° 4.4 101.4 | RTSE T° 4.4 102.3 | RTSE T° 4.4 103.1 | RTSE T° 4.4 104.0 |
| | RTSE T° 4.2 107.0 | RTSE T° 4.2 107.9 | RTSE T° 4.2 108.7 | RTSE T° 4.2 109.6 |
| 5.9 | RTSE T° 4.4 100.6 | RTSE T° 4.4 101.5 | RTSE T° 4.4 102.4 | RTSE T° 4.4 103.2 |
| | RTSE T° 4.2 106.2 | RTSE T° 4.2 107.1 | RTSE T° 4.2 108.0 | RTSE T° 4.2 108.8 |
| 6.5 | RTSE T° 4.4 99.9 | RTSE T° 4.4 100.8 | RTSE T° 4.4 101.7 | RTSE T° 4.4 102.5 |
| | RTSE T° 4.2 105.5 | RTSE T° 4.2 106.4 | RTSE T° 4.2 107.3 | RTSE T° 4.2 108.1 |
| 7.2 | RTSE T° 4.4 99.2 | RTSE T° 4.4 100.1 | RTSE T° 4.4 100.9 | RTSE T° 4.4 101.8 |
| | RTSE T° 4.2 104.8 | RTSE T° 4.2 105.7 | RTSE T° 4.2 106.6 | RTSE T° 4.2 107.4 |
| 8.0 | RTSE T° 4.4 98.4 | RTSE T° 4.4 99.3 | RTSE T° 4.4 100.2 | RTSE T° 4.4 101.0 |
| | RTSE T° 4.2 104.0 | RTSE T° 4.2 104.9 | RTSE T° 4.2 105.8 | RTSE T° 4.2 106.6 |
| 8.9 | RTSE T° 4.4 97.7 | RTSE T° 4.4 98.5 | RTSE T° 4.4 99.4 | RTSE T° 4.4 100.2 |
| | RTSE T° 4.2 103.3 | RTSE T° 4.2 104.2 | RTSE T° 4.2 105.0 | RTSE T° 4.2 105.9 |
| 9.9 | RTSE T° 4.4 96.9 | RTSE T° 4.4 97.8 | RTSE T° 4.4 98.6 | RTSE T° 4.4 99.5 |
| | RTSE T° 4.2 102.5 | RTSE T° 4.2 103.4 | RTSE T° 4.2 104.2 | RTSE T° 4.2 105.1 |
| 11.0 | RTSE T° 4.4 96.1 | RTSE T° 4.4 97.0 | RTSE T° 4.4 97.8 | RTSE T° 4.4 98.7 |
| | RTSE T° 4.2 101.7 | RTSE T° 4.2 102.6 | RTSE T° 4.2 103.5 | RTSE T° 4.2 104.3 |

Fig.7A

| MELT-INDEX | DENSITY | | | | | |
|---|---|---|---|---|---|---|
| | 930 | 931 | 932 | 933 | 934 | 935 |
| 1.4 | RTSE T°<br>4.4  96.8 | RTSE T°<br>4.4  98.0 | RTSE T°<br>4.4  99.1 | RTSE T°<br>4.4  100.3 | RTSE T°<br>4.4  101.4 | RTSE T°<br>4.4  102.5 |
| | RTSE T°<br>4.2  102.4 | RTSE T°<br>4.2  103.6 | RTSE T°<br>4.2  104.8 | RTSE T°<br>4.2  105.9 | RTSE T°<br>4.2  107.0 | RTSE T°<br>4.2  108.1 |
| 1.5 | RTSE T°<br>4.4  96.5 | RTSE T°<br>4.4  97.7 | RTSE T°<br>4.4  98.8 | RTSE T°<br>4.4  99.9 | RTSE T°<br>4.4  101.0 | RTSE T°<br>4.4  102.1 |
| | RTSE T°<br>4.2  102.1 | RTSE T°<br>4.2  103.3 | RTSE T°<br>4.2  104.4 | RTSE T°<br>4.2  105.6 | RTSE T°<br>4.2  106.7 | RTSE T°<br>4.2  107.7 |
| 1.7 | RTSE T°<br>4.4  95.9 | RTSE T°<br>4.4  97.0 | RTSE T°<br>4.4  98.2 | RTSE T°<br>4.4  99.3 | RTSE T°<br>4.4  100.4 | RTSE T°<br>4.4  101.5 |
| | RTSE T°<br>4.2  101.5 | RTSE T°<br>4.2  102.7 | RTSE T°<br>4.2  103.8 | RTSE T°<br>4.2  104.9 | RTSE T°<br>4.2  106.0 | RTSE T°<br>4.2  107.1 |
| 1.9 | RTSE T°<br>4.4  95.3 | RTSE T°<br>4.4  96.5 | RTSE T°<br>4.4  97.6 | RTSE T°<br>4.4  98.7 | RTSE T°<br>4.4  99.8 | RTSE T°<br>4.4  100.9 |
| | RTSE T°<br>4.2  100.9 | RTSE T°<br>4.2  102.1 | RTSE T°<br>4.2  103.2 | RTSE T°<br>4.2  104.4 | RTSE T°<br>4.2  105.5 | RTSE T°<br>4.2  106.5 |
| 2.1 | RTSE T°<br>4.4  94.7 | RTSE T°<br>4.4  95.9 | RTSE T°<br>4.4  97.1 | RTSE T°<br>4.4  98.2 | RTSE T°<br>4.4  99.3 | RTSE T°<br>4.4  100.4 |
| | RTSE T°<br>4.2  100.4 | RTSE T°<br>4.2  101.5 | RTSE T°<br>4.2  102.7 | RTSE T°<br>4.2  103.8 | RTSE T°<br>4.2  104.9 | RTSE T°<br>4.2  106.0 |
| 2.3 | RTSE T°<br>4.4  94.2 | RTSE T°<br>4.4  95.4 | RTSE T°<br>4.4  96.6 | RTSE T°<br>4.4  97.7 | RTSE T°<br>4.4  98.8 | RTSE T°<br>4.4  99.9 |
| | RTSE T°<br>4.2  99.8 | RTSE T°<br>4.2  101.0 | RTSE T°<br>4.2  102.2 | RTSE T°<br>4.2  103.3 | RTSE T°<br>4.2  104.4 | RTSE T°<br>4.2  104.4 |
| 2.6 | RTSE T°<br>4.4  93.5 | RTSE T°<br>4.4  94.7 | RTSE T°<br>4.4  95.8 | RTSE T°<br>4.4  97.0 | RTSE T°<br>4.4  98.1 | RTSE T°<br>4.4  99.1 |
| | RTSE T°<br>4.2  99.1 | RTSE T°<br>4.2  100.3 | RTSE T°<br>4.2  101.5 | RTSE T°<br>4.2  102.6 | RTSE T°<br>4.2  103.7 | RTSE T°<br>4.2  104.8 |
| 2.9 | RTSE T°<br>4.4  92.9 | RTSE T°<br>4.4  94.0 | RTSE T°<br>4.4  95.2 | RTSE T°<br>4.4  96.3 | RTSE T°<br>4.4  97.4 | RTSE T°<br>4.4  98.5 |
| | RTSE T°<br>4.2  98.5 | RTSE T°<br>4.2  99.6 | RTSE T°<br>4.2  100.8 | RTSE T°<br>4.2  101.9 | RTSE T°<br>4.2  103.0 | RTSE T°<br>4.2  104.1 |
| 3.2 | RTSE T°<br>4.4  92.2 | RTSE T°<br>4.4  93.4 | RTSE T°<br>4.4  94.6 | RTSE T°<br>4.4  95.7 | RTSE T°<br>4.4  96.8 | RTSE T°<br>4.4  97.9 |
| | RTSE T°<br>4.2  97.9 | RTSE T°<br>4.2  99.0 | RTSE T°<br>4.2  100.2 | RTSE T°<br>4.2  101.3 | RTSE T°<br>4.2  102.4 | RTSE T°<br>4.2  103.5 |
| 3.6 | RTSE T°<br>4.4  91.5 | RTSE T°<br>4.4  92.7 | RTSE T°<br>4.4  93.8 | RTSE T°<br>4.4  94.9 | RTSE T°<br>4.4  96.0 | RTSE T°<br>4.4  97.1 |
| | RTSE T°<br>4.2  97.1 | RTSE T°<br>4.2  98.3 | RTSE T°<br>4.2  99.4 | RTSE T°<br>4.2  100.6 | RTSE T°<br>4.2  101.7 | RTSE T°<br>4.2  102.7 |
| 4.0 | RTSE T°<br>4.4  90.8 | RTSE T°<br>4.4  92.0 | RTSE T°<br>4.4  93.1 | RTSE T°<br>4.4  94.3 | RTSE T°<br>4.4  95.4 | RTSE T°<br>4.4  96.4 |
| | RTSE T°<br>4.2  96.4 | RTSE T°<br>4.2  97.6 | RTSE T°<br>4.2  98.7 | RTSE T°<br>4.2  99.9 | RTSE T°<br>4.2  101.0 | RTSE T°<br>4.2  102.0 |

Fig.7B

| MELT-INDEX | DENSITY | | | | | |
|---|---|---|---|---|---|---|
| | 936 | 937 | 938 | 939 | 940 | 941 |
| 1.4 | RTSE T°<br>4.4　103.5 | RTSE T°<br>4.4　104.5 | RTSE T°<br>4.4　105.5 | RTSE T°<br>4.4　106.5 | RTSE T°<br>4.4　107.5 | RTSE T°<br>4.4　108.4 |
| | RTSE T°<br>4.2　109.1 | RTSE T°<br>4.2　110.1 | RTSE T°<br>4.2　111.2 | RTSE T°<br>4.2　112.1 | RTSE T°<br>4.2　113.1 | RTSE T°<br>4.2　114.0 |
| 1.5 | RTSE T°<br>4.4　103.2 | RTSE T°<br>4.4　104.2 | RTSE T°<br>4.4　105.2 | RTSE T°<br>4.4　106.2 | RTSE T°<br>4.4　107.1 | RTSE T°<br>4.4　108.1 |
| | RTSE T°<br>4.2　108.8 | RTSE T°<br>4.2　109.8 | RTSE T°<br>4.2　110.8 | RTSE T°<br>4.2　111.8 | RTSE T°<br>4.2　112.8 | RTSE T°<br>4.2　113.7 |
| 1.7 | RTSE T°<br>4.4　102.5 | RTSE T°<br>4.4　103.6 | RTSE T°<br>4.4　104.6 | RTSE T°<br>4.4　105.6 | RTSE T°<br>4.4　106.5 | RTSE T°<br>4.4　107.4 |
| | RTSE T°<br>4.2　108.2 | RTSE T°<br>4.2　109.2 | RTSE T°<br>4.2　110.2 | RTSE T°<br>4.2　111.2 | RTSE T°<br>4.2　112.1 | RTSE T°<br>4.2　113.1 |
| 1.9 | RTSE T°<br>4.4　102.0 | RTSE T°<br>4.4　103.0 | RTSE T°<br>4.4　104.0 | RTSE T°<br>4.4　105.0 | RTSE T°<br>4.4　105.9 | RTSE T°<br>4.4　106.9 |
| | RTSE T°<br>4.2　107.6 | RTSE T°<br>4.2　108.6 | RTSE T°<br>4.2　109.6 | RTSE T°<br>4.2　110.6 | RTSE T°<br>4.2　111.5 | RTSE T°<br>4.2　112.5 |
| 2.1 | RTSE T°<br>4.4　101.4 | RTSE T°<br>4.4　102.4 | RTSE T°<br>4.4　103.4 | RTSE T°<br>4.4　104.4 | RTSE T°<br>4.4　105.4 | RTSE T°<br>4.4　106.3 |
| | RTSE T°<br>4.2　107.0 | RTSE T°<br>4.2　108.1 | RTSE T°<br>4.2　109.1 | RTSE T°<br>4.2　110.0 | RTSE T°<br>4.2　111.0 | RTSE T°<br>4.2　111.9 |
| 2.3 | RTSE T°<br>4.4　100.9 | RTSE T°<br>4.4　101.9 | RTSE T°<br>4.4　102.9 | RTSE T°<br>4.4　103.9 | RTSE T°<br>4.4　104.9 | RTSE T°<br>4.4　105.8 |
| | RTSE T°<br>4.2　106.5 | RTSE T°<br>4.2　107.6 | RTSE T°<br>4.2　108.6 | RTSE T°<br>4.2　109.5 | RTSE T°<br>4.2　110.5 | RTSE T°<br>4.2　111.4 |
| 2.6 | RTSE T°<br>4.4　100.2 | RTSE T°<br>4.4　101.2 | RTSE T°<br>4.4　102.2 | RTSE T°<br>4.4　103.2 | RTSE T°<br>4.4　104.2 | RTSE T°<br>4.4　105.1 |
| | RTSE. T°<br>4.2　105.8 | RTSE T°<br>4.2　106.8 | RTSE T°<br>4.2　107.8 | RTSE T°<br>4.2　108.8 | RTSE T°<br>4.2　109.8 | RTSE T°<br>4.2　110.7 |
| 2.9 | RTSE T°<br>4.4　99.5 | RTSE T°<br>4.4　100.6 | RTSE T°<br>4.4　101.6 | RTSE T°<br>4.4　102.5 | RTSE T°<br>4.4　103.5 | RTSE T°<br>4.4　104.4 |
| | RTSE T°<br>4.2　105.2 | RTSE T°<br>4.2　106.2 | RTSE T°<br>4.2　107.2 | RTSE T°<br>4.2　108.2 | RTSE T°<br>4.2　109.1 | RTSE T°<br>4.2　110.0 |
| 3.2 | RTSE T°<br>4.4　98.9 | RTSE T°<br>4.4　99.9 | RTSE T°<br>4.4　101.0 | RTSE T°<br>4.4　101.9 | RTSE T°<br>4.4　102.9 | RTSE T°<br>4.4　103.8 |
| | RTSE T°<br>4.2　104.5 | RTSE T°<br>4.2　105.6 | RTSE T°<br>4.2　106.6 | RTSE T°<br>4.2　107.5 | RTSE T°<br>4.2　108.5 | RTSE T°<br>4.2　109.4 |
| 3.6 | RTSE T°<br>4.4　98.2 | RTSE T°<br>4.4　99.2 | RTSE T°<br>4.4　100.2 | RTSE T°<br>4.4　101.2 | RTSE T°<br>4.4　102.1 | RTSE T°<br>4.4　103.1 |
| | RTSE T°<br>4.2　103.8 | RTSE T°<br>4.2　104.8 | RTSE T°<br>4.2　105.8 | RTSE T°<br>4.2　106.8 | RTSE T°<br>4.2　107.8 | RTSE T°<br>4.2　108.7 |
| 4.0 | RTSE T°<br>4.4　97.5 | RTSE T°<br>4.4　98.5 | RTSE T°<br>4.4　99.5 | RTSE T°<br>4.4　100.5 | RTSE T°<br>4.4　101.4 | RTSE T°<br>4.4　102.4 |
| | RTSE T°<br>4.2　103.1 | RTSE T°<br>4.2　104.1 | RTSE T°<br>4.2　105.1 | RTSE T°<br>4.2　106.1 | RTSE T°<br>4.2　107.1 | RTSE T°<br>4.2　108.0 |

Fig.7C

| MELT-INDEX | DENSITY | | | |
|---|---|---|---|---|
| | 942 | 943 | 944 | 945 |
| 1.4 | RTSE 4.4  T° 109.3 | RTSE 4.4  T° 110.2 | RTSE 4.4  T° 111.1 | RTSE 4.4  T° 111.9 |
| | RTSE 4.2  T° 114.9 | RTSE 4.2  T° 115.8 | RTSE 4.2  T° 116.7 | RTSE 4.2  T° 117.5 |
| 1.5 | RTSE 4.4  T° 109.0 | RTSE 4.4  T° 109.9 | RTSE 4.4  T° 110.7 | RTSE 4.4  T° 111.6 |
| | RTSE 4.2  T° 114.6 | RTSE 4.2  T° 115.5 | RTSE 4.2  T° 116.3 | RTSE 4.2  T° 117.2 |
| 1.7 | RTSE 4.4  T° 108.3 | RTSE 4.4  T° 109.2 | RTSE 4.4  T° 110.1 | RTSE 4.4  T° 110.9 |
| | RTSE 4.2  T° 114.0 | RTSE 4.2  T° 114.9 | RTSE 4.2  T° 115.7 | RTSE 4.2  T° 116.6 |
| 1.9 | RTSE 4.4  T° 107.8 | RTSE 4.4  T° 108.7 | RTSE 4.4  T° 109.5 | RTSE 4.4  T° 110.4 |
| | RTSE 4.2  T° 113.4 | RTSE 4.2  T° 114.3 | RTSE 4.2  T° 115.1 | RTSE 4.2  T° 116.0 |
| 2.1 | RTSE 4.4  T° 107.2 | RTSE 4.4  T° 108.1 | RTSE 4.4  T° 109.0 | RTSE 4.4  T° 109.8 |
| | RTSE 4.2  T° 112.8 | RTSE 4.2  T° 113.7 | RTSE 4.2  T° 114.6 | RTSE 4.2  T° 115.4 |
| 2.3 | RTSE 4.4  T° 106.7 | RTSE 4.4  T° 107.6 | RTSE 4.4  T° 108.5 | RTSE 4.4  T° 109.3 |
| | RTSE 4.2  T° 112.3 | RTSE 4.2  T° 113.2 | RTSE 4.2  T° 114.1 | RTSE 4.2  T° 114.9 |
| 2.6 | RTSE 4.4  T° 106.0 | RTSE 4.4  T° 106.9 | RTSE 4.4  T° 107.7 | RTSE 4.4  T° 108.6 |
| | RTSE 4.2  T° 111.6 | RTSE 4.2  T° 112.5 | RTSE 4.2  T° 113.4 | RTSE 4.2  T° 114.2 |
| 2.9 | RTSE 4.4  T° 105.3 | RTSE 4.4  T° 106.2 | RTSE 4.4  T° 107.1 | RTSE 4.4  T° 107.9 |
| | RTSE 4.2  T° 111.0 | RTSE 4.2  T° 111.8 | RTSE 4.2  T° 112.7 | RTSE 4.2  T° 113.5 |
| 3.2 | RTSE 4.4  T° 104.7 | RTSE 4.4  T° 105.6 | RTSE 4.4  T° 106.5 | RTSE 4.4  T° 107.3 |
| | RTSE 4.2  T° 110.3 | RTSE 4.2  T° 111.2 | RTSE 4.2  T° 112.1 | RTSE 4.2  T° 112.9 |
| 3.6 | RTSE 4.4  T° 104.0 | RTSE 4.4  T° 104.9 | RTSE 4.4  T° 105.7 | RTSE 4.4  T° 106.6 |
| | RTSE 4.2  T° 109.6 | RTSE 4.2  T° 110.5 | RTSE 4.2  T° 111.3 | RTSE 4.2  T° 112.2 |
| 4.0 | RTSE 4.4  T° 103.3 | RTSE 4.4  T° 104.2 | RTSE 4.4  T° 105.0 | RTSE 4.4  T° 105.9 |
| | RTSE 4.2  T° 108.9 | RTSE 4.2  T° 109.8 | RTSE 4.2  T° 110.6 | RTSE 4.2  T° 111.5 |

Fig.8A

| MELT-INDEX | DENSITY | | | | | |
|---|---|---|---|---|---|---|
| | 930 | 931 | 932 | 933 | 934 | 935 |
| 0.5 | RTSE T° 4.4  100.6 | RTSE T° 4.4  101.8 | RTSE T° 4.4  102.9 | RTSE T° 4.4  104.0 | RTSE T° 4.4  105.1 | RTSE T° 4.4  106.2 |
| | RTSE T° 4.2  106.2 | RTSE T° 4.2  107.4 | RTSE T° 4.2  108.5 | RTSE T° 4.2  109.7 | RTSE T° 4.2  110.8 | RTSE T° 4.2  111.8 |
| 0.6 | RTSE T° 4.4  100.1 | RTSE T° 4.4  101.2 | RTSE T° 4.4  102.4 | RTSE T° 4.4  103.5 | RTSE T° 4.4  104.6 | RTSE T° 4.4  105.7 |
| | RTSE T° 4.2  105.7 | RTSE T° 4.2  106.9 | RTSE T° 4.2  108.0 | RTSE T° 4.2  109.1 | RTSE T° 4.2  110.2 | RTSE T° 4.2  111.3 |
| 0.7 | RTSE T° 4.4  99.6 | RTSE T° 4.4  100.8 | RTSE T° 4.4  101.9 | RTSE T° 4.4  103.0 | RTSE T° 4.4  104.1 | RTSE T° 4.4  105.2 |
| | RTSE T° 4.2  105.2 | RTSE T° 4.2  106.4 | RTSE T° 4.2  107.5 | RTSE T° 4.2  108.7 | RTSE T° 4.2  109.8 | RTSE T° 4.2  110.8 |
| 0.8 | RTSE T° 4.4  99.1 | RTSE T° 4.4  100.3 | RTSE T° 4.4  101.5 | RTSE T° 4.4  102.6 | RTSE T° 4.4  103.7 | RTSE T° 4.4  104.8 |
| | RTSE T° 4.2  104.8 | RTSE T° 4.2  105.9 | RTSE T° 4.2  107.1 | RTSE T° 4.2  108.2 | RTSE T° 4.2  109.3 | RTSE T° 4.2  110.4 |
| 0.9 | RTSE T° 4.4  98.7 | RTSE T° 4.4  99.9 | RTSE T° 4.4  101.0 | RTSE T° 4.4  102.2 | RTSE T° 4.4  103.3 | RTSE T° 4.4  104.3 |
| | RTSE T° 4.2  104.3 | RTSE T° 4.2  105.5 | RTSE T° 4.2  106.6 | RTSE T° 4.2  107.8 | RTSE T° 4.2  108.9 | RTSE T° 4.2  110.0 |
| 1.0 | RTSE T° 4.4  98.3 | RTSE T° 4.4  99.5 | RTSE T° 4.4  100.6 | RTSE T° 4.4  101.7 | RTSE T° 4.4  102.8 | RTSE T° 4.4  103.9 |
| | RTSE T° 4.2  103.9 | RTSE T° 4.2  105.1 | RTSE T° 4.2  106.2 | RTSE T° 4.2  107.4 | RTSE T° 4.2  108.5 | RTSE T° 4.2  109.5 |
| 1.1 | RTSE T° 4.4  97.9 | RTSE T° 4.4  99.1 | RTSE T° 4.4  100.2 | RTSE T° 4.4  101.4 | RTSE T° 4.4  102.5 | RTSE T° 4.4  103.5 |
| | RTSE T° 4.2  103.5 | RTSE T° 4.2  104.7 | RTSE T° 4.2  105.8 | RTSE T° 4.2  107.0 | RTSE T° 4.2  108.1 | RTSE T° 4.2  109.1 |
| 1.2 | RTSE T° 4.4  97.5 | RTSE T° 4.4  98.7 | RTSE T° 4.4  99.9 | RTSE T° 4.4  101.0 | RTSE T° 4.4  102.1 | RTSE T° 4.4  103.2 |
| | RTSE T° 4.2  103.1 | RTSE T° 4.2  104.3 | RTSE T° 4.2  105.5 | RTSE T° 4.2  106.6 | RTSE T° 4.2  107.7 | RTSE T° 4.2  108.8 |
| 1.3 | RTSE T° 4.4  97.2 | RTSE T° 4.4  98.3 | RTSE T° 4.4  99.5 | RTSE T° 4.4  100.6 | RTSE T° 4.4  101.7 | RTSE T° 4.4  102.8 |
| | RTSE T° 4.2  102.8 | RTSE T° 4.2  104.0 | RTSE T° 4.2  105.1 | RTSE T° 4.2  106.2 | RTSE T° 4.2  107.3 | RTSE T° 4.2  108.4 |
| 1.4 | RTSE T° 4.4  96.8 | RTSE T° 4.4  98.0 | RTSE T° 4.4  99.1 | RTSE T° 4.4  100.3 | RTSE T° 4.4  101.4 | RTSE T° 4.4  102.5 |
| | RTSE T° 4.2  102.4 | RTSE T° 4.2  103.6 | RTSE T° 4.2  104.8 | RTSE T° 4.2  105.9 | RTSE T° 4.2  107.0 | RTSE T° 4.2  108.1 |
| 1.5 | RTSE T° 4.4  96.5 | RTSE T° 4.4  97.7 | RTSE T° 4.4  98.8 | RTSE T° 4.4  99.9 | RTSE T° 4.4  101.0 | RTSE T° 4.4  102.1 |
| | RTSE T° 4.2  102.1 | RTSE T° 4.2  103.3 | RTSE T° 4.2  104.4 | RTSE T° 4.2  105.6 | RTSE T° 4.2  106.7 | RTSE T° 4.2  107.7 |

Fig.8B

| MELT-INDEX | DENSITY | | | | | |
|---|---|---|---|---|---|---|
| | 936 | 937 | 938 | 939 | 940 | 941 |
| 0.5 | RTSE T° 4.4  107.3 | RTSE T° 4.4  108.3 | RTSE T° 4.4  109.3 | RTSE T° 4.4  110.3 | RTSE T° 4.4  111.2 | RTSE T° 4.4  112.2 |
| | RTSE T° 4.2  112.9 | RTSE T° 4.2  113.9 | RTSE T° 4.2  114.9 | RTSE T° 4.2  115.9 | RTSE T° 4.2  116.8 | RTSE T° 4.2  117.8 |
| 0.6 | RTSE T° 4.4  106.8 | RTSE T° 4.4  107.8 | RTSE T° 4.4  108.8 | RTSE T° 4.4  109.8 | RTSE T° 4.4  110.7 | RTSE T° 4.4  111.6 |
| | RTSE T° 4.2  112.4 | RTSE T° 4.2  113.4 | RTSE T° 4.2  114.4 | RTSE T° 4.2  115.4 | RTSE T° 4.2  116.3 | RTSE T° 4.2  117.3 |
| 0.7 | RTSE T° 4.4  106.3 | RTSE T° 4.4  107.3 | RTSE T° 4.4  108.3 | RTSE T° 4.4  109.3 | RTSE T° 4.4  110.2 | RTSE T° 4.4  111.2 |
| | RTSE T° 4.2  111.9 | RTSE T° 4.2  112.9 | RTSE T° 4.2  113.9 | RTSE T° 4.2  114.9 | RTSE T° 4.2  115.9 | RTSE T° 4.2  116.8 |
| 0.8 | RTSE T° 4.4  105.8 | RTSE T° 4.4  106.8 | RTSE T° 4.4  107.8 | RTSE T° 4.4  108.8 | RTSE T° 4.4  109.8 | RTSE T° 4.4  110.7 |
| | RTSE T° 4.2  111.4 | RTSE T° 4.2  112.5 | RTSE T° 4.2  113.5 | RTSE T° 4.2  114.4 | RTSE T° 4.2  115.4 | RTSE T° 4.2  116.3 |
| 0.9 | RTSE T° 4.4  105.4 | RTSE T° 4.4  106.4 | RTSE T° 4.4  107.4 | RTSE T° 4.4  108.4 | RTSE T° 4.4  109.3 | RTSE T° 4.4  110.3 |
| | RTSE T° 4.2  111.0 | RTSE T° 4.2  112.0 | RTSE T° 4.2  113.0 | RTSE T° 4.2  114.0 | RTSE T° 4.2  1115.0 | RTSE T° 4.2  115.9 |
| 1.0 | RTSE T° 4.4  105.0 | RTSE T° 4.4  106.0 | RTSE T° 4.4  107.0 | RTSE T° 4.4  108.0 | RTSE T° 4.4  108.9 | RTSE T° 4.4  109.9 |
| | RTSE T° 4.2  110.6 | RTSE T° 4.2  111.6 | RTSE T° 4.2  112.6 | RTSE T° 4.2  113.6 | RTSE T° 4.2  114.6 | RTSE T° 4.2  115.5 |
| 1.1 | RTSE T° 4.4  104.6 | RTSE T° 4.4  105.6 | RTSE T° 4.4  106.6 | RTSE T° 4.4  107.6 | RTSE T° 4.4  108.5 | RTSE T° 4.4  109.5 |
| | RTSE T° 4.2  110.2 | RTSE T° 4.2  111.2 | RTSE T° 4.2  112.2 | RTSE T° 4.2  113.2 | RTSE T° 4.2  114.2 | RTSE T° 4.2  115.1 |
| 1.2 | RTSE T° 4.4  104.2 | RTSE T° 4.4  105.2 | RTSE T° 4.4  106.2 | RTSE T° 4.4  107.2 | RTSE T° 4.4  108.2 | RTSE T° 4.4  109.1 |
| | RTSE T° 4.2  109.8 | RTSE T° 4.2  110.9 | RTSE T° 4.2  111.9 | RTSE T° 4.2  112.8 | RTSE T° 4.2  113.8 | RTSE T° 4.2  114.7 |
| 1.3 | RTSE T° 4.4  103.8 | RTSE T° 4.4  104.9 | RTSE T° 4.4  105.9 | RTSE T° 4.4  106.9 | RTSE T° 4.4  107.8 | RTSE T° 4.4  108.7 |
| | RTSE T° 4.2  109.5 | RTSE T° 4.2  110.5 | RTSE T° 4.2  111.5 | RTSE T° 4.2  112.5 | RTSE T° 4.2  113.4 | RTSE T° 4.2  114.4 |
| 1.4 | RTSE T° 4.4  103.5 | RTSE T° 4.4  104.5 | RTSE T° 4.4  105.5 | RTSE T° 4.4  116.5 | RTSE T° 4.4  107.5 | RTSE T° 4.4  108.4 |
| | RTSE T° 4.2  109.1 | RTSE T° 4.2  110.1 | RTSE T° 4.2  111.2 | RTSE T° 4.2  112.1 | RTSE T° 4.2  113.1 | RTSE T° 4.2  114.0 |
| 1.5 | RTSE T° 4.4  103.2 | RTSE T° 4.4  104.2 | RTSE T° 4.4  105.2 | RTSE T° 4.4  106.2 | RTSE T° 4.4  107.1 | RTSE T° 4.4  108.1 |
| | RTSE T° 4.2  108.8 | RTSE T° 4.2  109.8 | RTSE T° 4.2  110.8 | RTSE T° 4.2  111.8 | RTSE T° 4.2  112.8 | RTSE T° 4.2  113.7 |

Fig.8C

| MELT-INDEX | DENSITY | | | |
|---|---|---|---|---|
| | 942 | 943 | 944 | 945 |
| 0.5 | RTSE T° 4.4  113.1 | RTSE T° 4.4  114.0 | RTSE T° 4.4  114.8 | RTSE T° 4.4  115.7 |
| | RTSE T° 4.2  118.7 | RTSE T° 4.2  119.6 | RTSE T° 4.2  120.4 | RTSE T° 4.2  121.3 |
| 0.6 | RTSE T° 4.4  112.6 | RTSE T° 4.4  113.4 | RTSE T° 4.4  114.3 | RTSE T° 4.4  115.1 |
| | RTSE T° 4.2  118.2 | RTSE T° 4.2  119.1 | RTSE T° 4.2  119.9 | RTSE T° 4.2  120.8 |
| 0.7 | RTSE T° 4.4  112.1 | RTSE T° 4.4  113.0 | RTSE T° 4.4  113.8 | RTSE T° 4.4  114.7 |
| | RTSE T° 4.2  117.7 | RTSE T° 4.2  118.6 | RTSE T° 4.2  119.4 | RTSE T° 4.2  120.3 |
| 0.8 | RTSE T° 4.4  111.6 | RTSE T° 4.4  112.5 | RTSE T° 4.4  113.4 | RTSE T° 4.4  114.2 |
| | RTSE T° 4.2  117.2 | RTSE T° 4.2  118.1 | RTSE T° 4.2  119.0 | RTSE T° 4.2  119.8 |
| 0.9 | RTSE T° 4.4  111.2 | RTSE T° 4.4  112.1 | RTSE T° 4.4  112.9 | RTSE T° 4.4  113.8 |
| | RTSE T° 4.2  116.8 | RTSE T° 4.2  117.7 | RTSE T° 4.2  118.6 | RTSE T° 4.2  119.4 |
| 1.0 | RTSE T° 4.4  110.8 | RTSE T° 4.4  111.7 | RTSE T° 4.4  112.5 | RTSE T° 4.4  113.4 |
| | RTSE T° 4.2  116.4 | RTSE T° 4.2  117.3 | RTSE T° 4.2  118.1 | RTSE T° 4.2  119.0 |
| 1.1 | RTSE T° 4.4  110.4 | RTSE T° 4.4  111.3 | RTSE T° 4.4  112.1 | RTSE T° 4.4  113.0 |
| | RTSE T° 4.2  116.0 | RTSE T° 4.2  116.9 | RTSE T° 4.2  117.7 | RTSE T° 4.2  118.6 |
| 1.2 | RTSE T° 4.4  110.0 | RTSE T° 4.4  110.9 | RTSE T° 4.4  111.8 | RTSE T° 4.4  112.6 |
| | RTSE T° 4.2  115.6 | RTSE T° 4.2  116.5 | RTSE T° 4.2  117.4 | RTSE T° 4.2  118.2 |
| 1.3 | RTSE T° 4.4  109.6 | RTSE T° 4.4  110.5 | RTSE T° 4.4  111.4 | RTSE T° 4.4  112.2 |
| | RTSE T° 4.2  115.3 | RTSE T° 4.2  116.2 | RTSE T° 4.2  117.0 | RTSE T° 4.2  117.9 |
| 1.4 | RTSE T° 4.4  109.3 | RTSE T° 4.4  110.2 | RTSE T° 4.4  111.1 | RTSE T° 4.4  111.9 |
| | RTSE T° 4.2  114.9 | RTSE T° 4.2  115.8 | RTSE T° 4.2  116.7 | RTSE T° 4.2  117.5 |
| 1.5 | RTSE T° 4.4  109.0 | RTSE T° 4.4  109.9 | RTSE T° 4.4  110.7 | RTSE T° 4.4  111.6 |
| | RTSE T° 4.2  114.6 | RTSE T° 4.2  115.5 | RTSE T° 4.2  116.3 | RTSE T° 4.2  117.2 |

Fig.9A

| MELT-INDEX | DENSITY | | | | | |
|---|---|---|---|---|---|---|
| | 915 | 916 | 917 | 918 | 919 | 920 |
| 11.0 | RTSE T° 4.4  63.4 | RTSE T° 4.4  64.8 | RTSE T° 4.4  66.3 | RTSE T° 4.4  67.7 | RTSE T° 4.4  69.2 | RTSE T° 4.4  70.6 |
| | RTSE T° 4.2  69.0 | RTSE T° 4.2  70.5 | RTSE T° 4.2  71.9 | RTSE T° 4.2  73.4 | RTSE T° 4.2  74.8 | RTSE T° 4.2  76.2 |
| 12.0 | RTSE T° 4.4  62.7 | RTSE T° 4.4  64.2 | RTSE T° 4.4  65.7 | RTSE T° 4.4  67.1 | RTSE T° 4.4  68.5 | RTSE T° 4.4  70.0 |
| | RTSE T° 4.2  68.3 | RTSE T° 4.2  69.8 | RTSE T° 4.2  71.3 | RTSE T° 4.2  72.7 | RTSE T° 4.2  74.2 | RTSE T° 4.2  75.6 |
| 13.0 | RTSE T° 4.4  62.1 | RTSE T° 4.4  63.6 | RTSE T° 4.4  65.1 | RTSE T° 4.4  66.5 | RTSE T° 4.4  68.0 | RTSE T° 4.4  69.4 |
| | RTSE T° 4.2  67.8 | RTSE T° 4.2  69.2 | RTSE T° 4.2  70.7 | RTSE T° 4.2  72.1 | RTSE T° 4.2  73.6 | RTSE T° 4.2  75.0 |
| 14.0 | RTSE T° 4.4  61.6 | RTSE T° 4.4  63.1 | RTSE T° 4.4  64.5 | RTSE T° 4.4  66.0 | RTSE T° 4.4  67.4 | RTSE T° 4.4  68.8 |
| | RTSE T° 4.2  67.2 | RTSE T° 4.2  68.7 | RTSE T° 4.2  70.2 | RTSE T° 4.2  71.6 | RTSE T° 4.2  73.0 | RTSE T° 4.2  74.5 |
| 16.0 | RTSE T° 4.4  60.7 | RTSE T° 4.4  62.1 | RTSE T° 4.4  63.6 | RTSE T° 4.4  65.0 | RTSE T° 4.4  66.5 | RTSE T° 4.4  67.9 |
| | RTSE T° 4.2  66.3 | RTSE T° 4.2  67.8 | RTSE T° 4.2  69.2 | RTSE T° 4.2  70.7 | RTSE T° 4.2  72.1 | RTSE T° 4.2  73.5 |
| 18.0 | RTSE T° 4.4  59.8 | RTSE T° 4.4  61.3 | RTSE T° 4.4  62.8 | RTSE T° 4.4  64.2 | RTSE T° 4.4  65.7 | RTSE T° 4.4  67.1 |
| | RTSE T° 4.2  65.5 | RTSE T° 4.2  66.9 | RTSE T° 4.2  68.4 | RTSE T° 4.2  69.8 | RTSE T° 4.2  71.3 | RTSE T° 4.2  72.7 |
| 20.0 | RTSE T° 4.4  59.1 | RTSE T° 4.4  60.6 | RTSE T° 4.4  62.1 | RTSE T° 4.4  63.5 | RTSE T° 4.4  64.9 | RTSE T° 4.4  66.4 |
| | RTSE T° 4.2  64.8 | RTSE T° 4.2  66.2 | RTSE T° 4.2  67.7 | RTSE T° 4.2  69.1 | RTSE T° 4.2  70.6 | RTSE T° 4.2  72.0 |
| 22.0 | RTSE T° 4.4  58.5 | RTSE T° 4.4  60.0 | RTSE T° 4.4  61.4 | RTSE T° 4.4  62.9 | RTSE T° 4.4  64.3 | RTSE T° 4.4  65.7 |
| | RTSE T° 4.2  64.1 | RTSE T° 4.2  65.6 | RTSE T° 4.2  67.1 | RTSE T° 4.2  68.5 | RTSE T° 4.2  69.9 | RTSE T° 4.2  71.4 |
| 24.0 | RTSE T° 4.4  58.0 | RTSE T° 4.4  59.4 | RTSE T° 4.4  60.9 | RTSE T° 4.4  62.3 | RTSE T° 4.4  63.8 | RTSE T° 4.4  65.2 |
| | RTSE T° 4.2  63.6 | RTSE T° 4.2  65.1 | RTSE T° 4.2  66.5 | RTSE T° 4.2  68.0 | RTSE T° 4.2  69.4 | RTSE T° 4.2  70.8 |
| 27.0 | RTSE T° 4.4  57.3 | RTSE T° 4.4  58.7 | RTSE T° 4.4  60.2 | RTSE T° 4.4  61.6 | RTSE T° 4.4  63.1 | RTSE T° 4.4  64.5 |
| | RTSE T° 4.2  62.9 | RTSE T° 4.2  64.4 | RTSE T° 4.2  65.8 | RTSE T° 4.2  67.3 | RTSE T° 4.2  68.7 | RTSE T° 4.2  70.1 |
| 30.0 | RTSE T° 4.4  56.7 | RTSE T° 4.4  58.1 | RTSE T° 4.4  59.6 | RTSE T° 4.4  61.1 | RTSE T° 4.4  62.5 | RTSE T° 4.4  63.9 |
| | RTSE T° 4.2  62.3 | RTSE T° 4.2  63.8 | RTSE T° 4.2  65.2 | RTSE T° 4.2  66.7 | RTSE T° 4.2  68.1 | RTSE T° 4.2  69.5 |

Fig.9B

| MELT-INDEX | DENSITY | | | | | |
|---|---|---|---|---|---|---|
| | 921 | 922 | 923 | 924 | 925 | 926 |
| 11.0 | RTSE 4.4  T° 72.0 | RTSE 4.4  T° 73.4 | RTSE 4.4  T° 74.7 | RTSE 4.4  T° 76.1 | RTSE 4.4  T° 77.4 | RTSE 4.4  T° 78.7 |
| | RTSE 4.2  T° 77.6 | RTSE 4.2  T° 79.0 | RTSE 4.2  T° 80.3 | RTSE 4.2  T° 81.7 | RTSE 4.2  T° 83.0 | RTSE 4.2  T° 84.3 |
| 12.0 | RTSE 4.4  T° 71.4 | RTSE 4.4  T° 72.7 | RTSE 4.4  T° 74.1 | RTSE 4.4  T° 75.4 | RTSE 4.4  T° 76.8 | RTSE 4.4  T° 78.0 |
| | RTSE 4.2  T° 77.0 | RTSE 4.2  T° 78.4 | RTSE 4.2  T° 79.7 | RTSE 4.2  T° 81.1 | RTSE 4.2  T° 82.4 | RTSE 4.2  T° 83.7 |
| 13.0 | RTSE 4.4  T° 70.8 | RTSE 4.4  T° 72.2 | RTSE 4.4  T° 73.5 | RTSE 4.4  T° 74.9 | RTSE 4.4  T° 76.2 | RTSE 4.4  T° 77.5 |
| | RTSE 4.2  T° 76.4 | RTSE 4.2  T° 77.8 | RTSE 4.2  T° 79.1 | RTSE 4.2  T° 80.5 | RTSE 4.2  T° 81.8 | RTSE 4.2  T° 83.1 |
| 14.0 | RTSE 4.4  T° 70.2 | RTSE 4.4  T° 71.6 | RTSE 4.4  T° 73.0 | RTSE 4.4  T° 74.3 | RTSE 4.4  T° 75.6 | RTSE 4.4  T° 76.9 |
| | RTSE 4.2  T° 75.9 | RTSE 4.2  T° 77.2 | RTSE 4.2  T° 78.6 | RTSE 4.2  T° 79.9 | RTSE 4.2  T° 81.3 | RTSE 4.2  T° 82.5 |
| 16.0 | RTSE 4.4  T° 69.3 | RTSE 4.4  T° 70.7 | RTSE 4.4  T° 72.0 | RTSE 4.4  T° 73.4 | RTSE 4.4  T° 74.7 | RTSE 4.4  T° 76.0 |
| | RTSE 4.2  T° 74.9 | RTSE 4.2  T° 76.3 | RTSE 4.2  T° 77.7 | RTSE 4.2  T° 79.0 | RTSE 4.2  T° 80.3 | RTSE 4.2  T° 81.6 |
| 18.0 | RTSE 4.4  T° 68.5 | RTSE 4.4  T° 69.9 | RTSE 4.4  T° 71.2 | RTSE 4.4  T° 72.6 | RTSE 4.4  T° 73.9 | RTSE 4.4  T° 75.2 |
| | RTSE 4.2  T° 74.1 | RTSE 4.2  T° 75.5 | RTSE 4.2  T° 76.8 | RTSE 4.2  T° 78.2 | RTSE 4.2  T° 79.5 | RTSE 4.2  T° 80.8 |
| 20.0 | RTSE 4.4  T° 67.8 | RTSE 4.4  T° 69.1 | RTSE 4.4  T° 70.5 | RTSE 4.4  T° 71.8 | RTSE 4.4  T° 73.2 | RTSE 4.4  T° 74.5 |
| | RTSE 4.2  T° 73.4 | RTSE 4.2  T° 74.8 | RTSE 4.2  T° 76.1 | RTSE 4.2  T° 77.5 | RTSE 4.2  T° 78.8 | RTSE 4.2  T° 80.1 |
| 22.0 | RTSE 4.4  T° 67.1 | RTSE 4.4  T° 68.5 | RTSE 4.4  T° 69.9 | RTSE 4.4  T° 71.2 | RTSE 4.4  T° 72.5 | RTSE 4.4  T° 73.8 |
| | RTSE 4.2  T° 72.8 | RTSE 4.2  T° 74.1 | RTSE 4.2  T° 75.5 | RTSE 4.2  T° 76.8 | RTSE 4.2  T° 78.2 | RTSE 4.2  T° 79.4 |
| 24.0 | RTSE 4.4  T° 66.6 | RTSE 4.4  T° 68.0 | RTSE 4.4  T° 69.3 | RTSE 4.4  T° 70.7 | RTSE 4.4  T° 72.0 | RTSE 4.4  T° 73.3 |
| | RTSE 4.2  T° 72.2 | RTSE 4.2  T° 73.6 | RTSE 4.2  T° 75.0 | RTSE 4.2  T° 76.3 | RTSE 4.2  T° 77.6 | RTSE 4.2  T° 78.9 |
| 27.0 | RTSE 4.4  T° 65.9 | RTSE 4.4  T° 67.3 | RTSE 4.4  T° 68.6 | RTSE 4.4  T° 70.0 | RTSE 4.4  T° 71.3 | RTSE 4.4  T° 72.6 |
| | RTSE 4.2  T° 71.5 | RTSE 4.2  T° 72.9 | RTSE 4.2  T° 74.2 | RTSE 4.2  T° 75.6 | RTSE 4.2  T° 76.9 | RTSE 4.2  T° 78.2 |
| 30.0 | RTSE 4.4  T° 65.3 | RTSE 4.4  T° 66.7 | RTSE 4.4  T° 68.0 | RTSE 4.4  T° 69.4 | RTSE 4.4  T° 70.7 | RTSE 4.4  T° 72.0 |
| | RTSE 4.2  T° 70.9 | RTSE 4.2  T° 72.3 | RTSE 4.2  T° 73.7 | RTSE 4.2  T° 75.0 | RTSE 4.2  T° 76.3 | RTSE 4.2  T° 77.6 |

Fig.9C

| MELT-INDEX | DENSITY | | | |
|---|---|---|---|---|
| | 927 | 928 | 929 | 930 |
| 11.0 | RTSE 4.4 T° 80.0 | RTSE 4.4 T° 81.2 | RTSE 4.4 T° 82.4 | RTSE 4.4 T° 83.6 |
| | RTSE 4.2 T° 85.6 | RTSE 4.2 T° 86.8 | RTSE 4.2 T° 88.0 | RTSE 4.2 T° 89.2 |
| 12.0 | RTSE 4.4 T° 79.3 | RTSE 4.4 T° 80.6 | RTSE 4.4 T° 81.8 | RTSE 4.4 T° 83.0 |
| | RTSE 4.2 T° 84.9 | RTSE 4.2 T° 86.2 | RTSE 4.2 T° 87.4 | RTSE 4.2 T° 88.6 |
| 13.0 | RTSE 4.4 T° 78.7 | RTSE 4.4 T° 80.0 | RTSE 4.4 T° 81.2 | RTSE 4.4 T° 82.4 |
| | RTSE 4.2 T° 84.4 | RTSE 4.2 T° 85.6 | RTSE 4.2 T° 86.8 | RTSE 4.2 T° 88.0 |
| 14.0 | RTSE 4.4 T° 78.2 | RTSE 4.4 T° 79.4 | RTSE 4.4 T° 80.7 | RTSE 4.4 T° 81.9 |
| | RTSE 4.2 T° 83.8 | RTSE 4.2 T° 85.1 | RTSE 4.2 T° 86.3 | RTSE 4.2 T° 87.5 |
| 16.0 | RTSE 4.4 T° 77.3 | RTSE 4.4 T° 78.5 | RTSE 4.4 T° 79.7 | RTSE 4.4 T° 80.9 |
| | RTSE 4.2 T° 82.9 | RTSE 4.2 T° 84.1 | RTSE 4.2 T° 85.3 | RTSE 4.2 T° 86.5 |
| 18.0 | RTSE 4.4 T° 76.4 | RTSE 4.4 T° 77.7 | RTSE 4.4 T° 78.9 | RTSE 4.4 T° 80.1 |
| | RTSE 4.2 T° 82.1 | RTSE 4.2 T° 83.3 | RTSE 4.2 T° 84.5 | RTSE 4.2 T° 85.7 |
| 20.0 | RTSE 4.4 T° 75.7 | RTSE 4.4 T° 77.0 | RTSE 4.4 T° 78.2 | RTSE 4.4 T° 79.4 |
| | RTSE 4.2 T° 81.3 | RTSE 4.2 T° 82.6 | RTSE 4.2 T° 83.8 | RTSE 4.2 T° 85.0 |
| 22.0 | RTSE 4.4 T° 75.1 | RTSE 4.4 T° 76.3 | RTSE 4.4 T° 77.6 | RTSE 4.4 T° 78.8 |
| | RTSE 4.2 T° 80.7 | RTSE 4.2 T° 82.0 | RTSE 4.2 T° 83.2 | RTSE 4.2 T° 84.4 |
| 24.0 | RTSE 4.4 T° 74.6 | RTSE 4.4 T° 75.8 | RTSE 4.4 T° 77.0 | RTSE 4.4 T° 78.2 |
| | RTSE 4.2 T° 80.2 | RTSE 4.2 T° 81.4 | RTSE 4.2 T° 82.6 | RTSE 4.2 T° 83.8 |
| 27.0 | RTSE 4.4 T° 73.8 | RTSE 4.4 T° 75.1 | RTSE 4.4 T° 76.3 | RTSE 4.4 T° 77.5 |
| | RTSE 4.2 T° 79.5 | RTSE 4.2 T° 80.7 | RTSE 4.2 T° 81.9 | RTSE 4.2 T° 83.1 |
| 30.0 | RTSE 4.4 T° 73.3 | RTSE 4.4 T° 74.5 | RTSE 4.4 T° 75.7 | RTSE 4.4 T° 76.9 |
| | RTSE 4.2 T° 78.9 | RTSE 4.2 T° 80.1 | RTSE 4.2 T° 81.4 | RTSE 4.2 T° 82.5 |

Fig.10A

| MELT-INDEX | DENSITY | | | | | |
|---|---|---|---|---|---|---|
| | 915 | 916 | 917 | 918 | 919 | 920 |
| 3.9 | RTSE 4.4  T° 70.7 | RTSE 4.4  T° 72.2 | RTSE 4.4  T° 73.6 | RTSE 4.4  T° 75.1 | RTSE 4.4  T° 76.5 | RTSE 4.4  T° 77.9 |
| | RTSE 4.2  T° 76.3 | RTSE 4.2  T° 77.8 | RTSE 4.2  T° 79.3 | RTSE 4.2  T° 80.7 | RTSE 4.2  T° 82.1 | RTSE 4.2  T° 83.6 |
| 4.3 | RTSE 4.4  T° 70.1 | RTSE 4.4  T° 71.5 | RTSE 4.4  T° 73.0 | RTSE 4.4  T° 74.4 | RTSE 4.4  T° 75.9 | RTSE 4.4  T° 77.3 |
| | RTSE 4.2  T° 75.7 | RTSE 4.2  T° 77.1 | RTSE 4.2  T° 78.6 | RTSE 4.2  T° 80.1 | RTSE 4.2  T° 81.5 | RTSE 4.2  T° 82.9 |
| 4.8 | RTSE 4.4  T° 69.3 | RTSE 4.4  T° 70.8 | RTSE 4.4  T° 72.2 | RTSE 4.4  T° 73.7 | RTSE 4.4  T° 75.1 | RTSE 4.4  T° 76.5 |
| | RTSE 4.2  T° 74.9 | RTSE 4.2  T° 76.4 | RTSE 4.2  T° 77.9 | RTSE 4.2  T° 79.3 | RTSE 4.2  T° 80.7 | RTSE 4.2  T° 82.2 |
| 5.3 | RTSE 4.4  T° 68.6 | RTSE 4.4  T° 70.1 | RTSE 4.4  T° 71.6 | RTSE 4.4  T° 73.0 | RTSE 4.4  T° 74.4 | RTSE 4.4  T° 75.9 |
| | RTSE 4.2  T° 74.2 | RTSE 4.2  T° 75.7 | RTSE 4.2  T° 77.2 | RTSE 4.2  T° 78.6 | RTSE 4.2  T° 80.1 | RTSE 4.2  T° 81.5 |
| 5.9 | RTSE 4.4  T° 67.9 | RTSE 4.4  T° 69.3 | RTSE 4.4  T° 70.8 | RTSE 4.4  T° 72.3 | RTSE 4.4  T° 73.7 | RTSE 4.4  T° 75.1 |
| | RTSE 4.2  T° 73.5 | RTSE 4.2  T° 75.0 | RTSE 4.2  T° 76.4 | RTSE 4.2  T° 77.9 | RTSE 4.2  T° 79.3 | RTSE 4.2  T° 80.7 |
| 6.5 | RTSE 4.4  T° 67.2 | RTSE 4.4  T° 68.7 | RTSE 4.4  T° 70.1 | RTSE 4.4  T° 71.6 | RTSE 4.4  T° 73.0 | RTSE 4.4  T° 74.4 |
| | RTSE 4.2  T° 72.8 | RTSE 4.2  T° 74.3 | RTSE 4.2  T° 75.7 | RTSE 4.2  T° 77.2 | RTSE 4.2  T° 78.6 | RTSE 4.2  T° 80.0 |
| 7.2 | RTSE 4.4  T° 66.5 | RTSE 4.4  T° 67.9 | RTSE 4.4  T° 69.4 | RTSE 4.4  T° 70.8 | RTSE 4.4  T° 72.3 | RTSE 4.4  T° 73.7 |
| | RTSE 4.2  T° 72.1 | RTSE 4.2  T° 73.5 | RTSE 4.2  T° 75.0 | RTSE 4.2  T° 76.4 | RTSE 4.2  T° 77.9 | RTSE 4.2  T° 79.3 |
| 8.0 | RTSE 4.4  T° 65.7 | RTSE 4.4  T° 67.2 | RTSE 4.4  T° 68.6 | RTSE 4.4  T° 70.1 | RTSE 4.4  T° 71.5 | RTSE 4.4  T° 72.9 |
| | RTSE 4.2  T° 71.3 | RTSE 4.2  T° 72.8 | RTSE 4.2  T° 74.2 | RTSE 4.2  T° 75.7 | RTSE 4.2  T° 77.1 | RTSE 4.2  T° 78.5 |
| 8.9 | RTSE 4.4  T° 64.9 | RTSE 4.4  T° 66.4 | RTSE 4.4  T° 67.8 | RTSE 4.4  T° 69.3 | RTSE 4.4  T° 70.7 | RTSE 4.4  T° 72.1 |
| | RTSE 4.2  T° 70.5 | RTSE 4.2  T° 72.0 | RTSE 4.2  T° 73.5 | RTSE 4.2  T° 74.9 | RTSE 4.2  T° 76.3 | RTSE 4.2  T° 77.8 |
| 9.9 | RTSE 4.4  T° 64.1 | RTSE 4.4  T° 65.6 | RTSE 4.4  T° 67.1 | RTSE 4.4  T° 68.5 | RTSE 4.4  T° 69.9 | RTSE 4.4  T° 71.4 |
| | RTSE 4.2  T° 69.8 | RTSE 4.2  T° 71.2 | RTSE 4.2  T° 72.7 | RTSE 4.2  T° 74.1 | RTSE 4.2  T° 75.6 | RTSE 4.2  T° 77.0 |
| 11.0 | RTSE 4.4  T° 63.4 | RTSE 4.4  T° 64.8 | RTSE 4.4  T° 66.3 | RTSE 4.4  T° 67.7 | RTSE 4.4  T° 69.2 | RTSE 4.4  T° 70.6 |
| | RTSE 4.2  T° 69.0 | RTSE 4.2  T° 70.5 | RTSE 4.2  T° 71.9 | RTSE 4.2  T° 73.4 | RTSE 4.2  T° 74.8 | RTSE 4.2  T° 76.2 |

Fig.10B

| MELT-INDEX | DENSITY | | | | | |
|---|---|---|---|---|---|---|
| | 921 | 922 | 923 | 924 | 925 | 926 |
| 3.9 | RTSE T° 4.4  79.3 | RTSE T° 4.4  80.7 | RTSE T° 4.4  82.1 | RTSE T° 4.4  83.4 | RTSE T° 4.4  84.7 | RTSE T° 4.4  86.0 |
| | RTSE T° 4.2  85.0 | RTSE T° 4.2  86.3 | RTSE T° 4.2  87.7 | RTSE T° 4.2  89.0 | RTSE T° 4.2  90.4 | RTSE T° 4.2  91.6 |
| 4.3 | RTSE T° 4.4  78.7 | RTSE T° 4.4  80.1 | RTSE T° 4.4  81.4 | RTSE T° 4.4  82.8 | RTSE T° 4.4  84.1 | RTSE T° 4.4  85.4 |
| | RTSE T° 4.2  84.3 | RTSE T° 4.2  85.7 | RTSE T° 4.2  87.0 | RTSE T° 4.2  88.4 | RTSE T° 4.2  89.7 | RTSE T° 4.2  91.0 |
| 4.8 | RTSE T° 4.4  77.9 | RTSE T° 4.4  79.3 | RTSE T° 4.4  80.7 | RTSE T° 4.4  82.0 | RTSE T° 4.4  83.3 | RTSE T° 4.4  84.6 |
| | RTSE T° 4.2  83.6 | RTSE T° 4.2  84.9 | RTSE T° 4.2  86.3 | RTSE T° 4.2  87.6 | RTSE T° 4.2  89.0 | RTSE T° 4.2  90.2 |
| 5.3 | RTSE T° 4.4  77.3 | RTSE T° 4.4  78.6 | RTSE T° 4.4  80.0 | RTSE T° 4.4  81.3 | RTSE T° 4.4  82.7 | RTSE T° 4.4  83.9 |
| | RTSE T° 4.2  82.9 | RTSE T° 4.2  84.3 | RTSE T° 4.2  85.6 | RTSE T° 4.2  87.0 | RTSE T° 4.2  88.3 | RTSE T° 4.2  89.6 |
| 5.9 | RTSE T° 4.4  76.5 | RTSE T° 4.4  77.9 | RTSE T° 4.4  79.2 | RTSE T° 4.4  80.6 | RTSE T° 4.4  81.9 | RTSE T° 4.4  83.2 |
| | RTSE T° 4.2  82.1 | RTSE T° 4.2  83.5 | RTSE T° 4.2  84.9 | RTSE T° 4.2  88.2 | RTSE T° 4.2  87.5 | RTSE T° 4.2  88.6 |
| 6.5 | RTSE T° 4.4  75.8 | RTSE T° 4.4  77.2 | RTSE T° 4.4  78.6 | RTSE T° 4.4  79.9 | RTSE T° 4.4  81.2 | RTSE T° 4.4  82.5 |
| | RTSE T° 4.2  81.4 | RTSE T° 4.2  82.8 | RTSE T° 4.2  84.2 | RTSE T° 4.2  85.5 | RTSE T° 4.2  86.8 | RTSE T° 4.2  88.1 |
| 7.2 | RTSE T° 4.4  75.1 | RTSE T° 4.4  76.5 | RTSE T° 4.4  77.8 | RTSE T° 4.4  79.2 | RTSE T° 4.4  80.5 | RTSE T° 4.4  81.8 |
| | RTSE T° 4.2  80.7 | RTSE T° 4.2  82.1 | RTSE T° 4.2  83.4 | RTSE T° 4.2  84.8 | RTSE T° 4.2  86.1 | RTSE T° 4.2  87.4 |
| 8.0 | RTSE T° 4.4  74.3 | RTSE T° 4.4  75.7 | RTSE T° 4.4  77.1 | RTSE T° 4.4  78.4 | RTSE T° 4.4  79.7 | RTSE T° 4.4  81.0 |
| | RTSE T° 4.2  79.9 | RTSE T° 4.2  81.3 | RTSE T° 4.2  82.7 | RTSE T° 4.2  84.0 | RTSE T° 4.2  85.3 | RTSE T° 4.2  86.8 |
| 8.9 | RTSE T° 4.4  73.5 | RTSE T° 4.4  74.9 | RTSE T° 4.4  76.3 | RTSE T° 4.4  77.6 | RTSE T° 4.4  78.9 | RTSE T° 4.4  80.2 |
| | RTSE T° 4.2  79.2 | RTSE T° 4.2  80.5 | RTSE T° 4.2  81.9 | RTSE T° 4.2  83.2 | RTSE T° 4.2  84.6 | RTSE T° 4.2  85.8 |
| 9.9 | RTSE T° 4.4  72.8 | RTSE T° 4.4  74.1 | RTSE T° 4.4  75.5 | RTSE T° 4.4  76.8 | RTSE T° 4.4  78.2 | RTSE T° 4.4  79.4 |
| | RTSE T° 4.2  78.4 | RTSE T° 4.2  79.8 | RTSE T° 4.2  81.1 | RTSE T° 4.2  82.5 | RTSE T° 4.2  83.8 | RTSE T° 4.2  85.1 |
| 11.0 | RTSE T° 4.4  72.0 | RTSE T° 4.4  73.4 | RTSE T° 4.4  74.7 | RTSE T° 4.4  76.1 | RTSE T° 4.4  77.4 | RTSE T° 4.4  78.7 |
| | RTSE T° 4.2  77.6 | RTSE T° 4.2  79.0 | RTSE T° 4.2  80.3 | RTSE T° 4.2  81.7 | RTSE T° 4.2  83.0 | RTSE T° 4.2  84.3 |

Fig.10C

| MELT-INDEX | DENSITY | | | |
|---|---|---|---|---|
| | 927 | 928 | 929 | 930 |
| 3.9 | RTSE T° 4.4  87.3 | RTSE T° 4.4  88.5 | RTSE T° 4.4  89.8 | RTSE T° 4.4  91.0 |
| | RTSE T° 4.2  92.9 | RTSE T° 4.2  94.2 | RTSE T° 4.2  95.4 | RTSE T° 4.2  96.6 |
| 4.3 | RTSE T° 4.4  86.6 | RTSE T° 4.4  87.9 | RTSE T° 4.4  89.1 | RTSE T° 4.4  90.3 |
| | RTSE T° 4.2  92.3 | RTSE T° 4.2  93.5 | RTSE T° 4.2  94.7 | RTSE T° 4.2  95.9 |
| 4.8 | RTSE T° 4.4  85.9 | RTSE T° 4.4  87.1 | RTSE T° 4.4  88.4 | RTSE T° 4.4  89.6 |
| | RTSE T° 4.2  91.5 | RTSE T° 4.2  92.8 | RTSE T° 4.2  94.0 | RTSE T° 4.2  95.2 |
| 5.3 | RTSE T° 4.4  85.2 | RTSE T° 4.4  86.5 | RTSE T° 4.4  87.7 | RTSE T° 4.4  88.9 |
| | RTSE T° 4.2  90.8 | RTSE T° 4.2  92.1 | RTSE T° 4.2  93.3 | RTSE T° 4.2  94.5 |
| 5.9 | RTSE T° 4.4  84.5 | RTSE T° 4.4  85.7 | RTSE T° 4.4  86.9 | RTSE T° 4.4  88.1 |
| | RTSE T° 4.2  90.1 | RTSE T° 4.2  91.3 | RTSE T° 4.2  92.6 | RTSE T° 4.2  93.8 |
| 6.5 | RTSE T° 4.4  83.8 | RTSE T° 4.4  85.0 | RTSE T° 4.4  86.2 | RTSE T° 4.4  87.4 |
| | RTSE T° 4.2  89.4 | RTSE T° 4.2  90.6 | RTSE T° 4.2  91.9 | RTSE T° 4.2  93.1 |
| 7.2 | RTSE T° 4.4  83.0 | RTSE T° 4.4  84.3 | RTSE T° 4.4  85.5 | RTSE T° 4.4  86.7 |
| | RTSE T° 4.2  88.7 | RTSE T° 4.2  89.9 | RTSE T° 4.2  91.1 | RTSE T° 4.2  92.3 |
| 8.0 | RTSE T° 4.4  82.3 | RTSE T° 4.4  83.5 | RTSE T° 4.4  84.7 | RTSE T° 4.4  85.9 |
| | RTSE T° 4.2  87.9 | RTSE T° 4.2  89.1 | RTSE T° 4.2  90.4 | RTSE T° 4.2  91.6 |
| 8.9 | RTSE T° 4.4  81.5 | RTSE T° 4.4  82.7 | RTSE T° 4.4  84.0 | RTSE T° 4.4  85.2 |
| | RTSE T° 4.2  87.1 | RTSE T° 4.2  88.4 | RTSE T° 4.2  89.6 | RTSE T° 4.2  90.8 |
| 9.9 | RTSE T° 4.4  80.7 | RTSE T° 4.4  82.0 | RTSE T° 4.4  83.2 | RTSE T° 4.4  84.4 |
| | RTSE T° 4.2  86.3 | RTSE T° 4.2  87.6 | RTSE T° 4.2  88.8 | RTSE T° 4.2  90.0 |
| 11.0 | RTSE T° 4.4  80.0 | RTSE T° 4.4  81.2 | RTSE T° 4.4  82.4 | RTSE T° 4.4  83.6 |
| | RTSE T° 4.2  85.6 | RTSE T° 4.2  86.8 | RTSE T° 4.2  88.0 | RTSE T° 4.2  89.2 |

Fig.11A

| MELT-INDEX | DENSITY | | | | | |
|---|---|---|---|---|---|---|
| | 915 | 916 | 917 | 918 | 919 | 920 |
| 1.4 | RTSE 4.4  T° 76.6 | RTSE 4.4  T° 78.0 | RTSE 4.4  T° 79.5 | RTSE 4.4  T° 80.9 | RTSE 4.4  T° 82.4 | RTSE 4.4  T° 83.8 |
| | RTSE 4.2  T° 82.2 | RTSE 4.2  T° 83.7 | RTSE 4.2  T° 85.1 | RTSE 4.2  T° 86.6 | RTSE 4.2  T° 88.0 | RTSE 4.2  T° 89.4 |
| 1.5 | RTSE 4.4  T° 76.2 | RTSE 4.4  T° 77.7 | RTSE 4.4  T° 79.2 | RTSE 4.4  T° 80.6 | RTSE 4.4  T° 82.0 | RTSE 4.4  T° 83.5 |
| | RTSE 4.2  T° 81.9 | RTSE 4.2  T° 83.3 | RTSE 4.2  T° 84.8 | RTSE 4.2  T° 86.2 | RTSE 4.2  T° 87.7 | RTSE 4.2  T° 89.1 |
| 1.7 | RTSE 4.4  T° 75.6 | RTSE 4.4  T° 77.1 | RTSE 4.4  T° 78.5 | RTSE 4.4  T° 80.0 | RTSE 4.4  T° 81.4 | RTSE 4.4  T° 82.8 |
| | RTSE 4.2  T° 81.2 | RTSE 4.2  T° 82.7 | RTSE 4.2  T° 84.2 | RTSE 4.2  T° 85.6 | RTSE 4.2  T° 87.0 | RTSE 4.2  T° 88.5 |
| 1.9 | RTSE 4.4  T° 75.0 | RTSE 4.4  T° 76.5 | RTSE 4.4  T° 78.0 | RTSE 4.4  T° 79.4 | RTSE 4.4  T° 80.8 | RTSE 4.4  T° 82.3 |
| | RTSE 4.2  T° 80.6 | RTSE 4.2  T° 82.1 | RTSE 4.2  T° 83.6 | RTSE 4.2  T° 85.0 | RTSE 4.2  T° 86.5 | RTSE 4.2  T° 87.9 |
| 2.1 | RTSE 4.4  T° 74.5 | RTSE 4.4  T° 76.0 | RTSE 4.4  T° 77.4 | RTSE 4.4  T° 78.9 | RTSE 4.4  T° 80.3 | RTSE 4.4  T° 81.7 |
| | RTSE 4.2  T° 80.1 | RTSE 4.2  T° 81.6 | RTSE 4.2  T° 83.0 | RTSE 4.2  T° 84.5 | RTSE 4.2  T° 85.9 | RTSE 4.2  T° 87.3 |
| 2.3 | RTSE 4.4  T° 74.0 | RTSE 4.4  T° 75.4 | RTSE 4.4  T° 76.9 | RTSE 4.4  T° 78.3 | RTSE 4.4  T° 79.8 | RTSE 4.4  T° 81.2 |
| | RTSE 4.2  T° 79.6 | RTSE 4.2  T° 81.1 | RTSE 4.2  T° 82.5 | RTSE 4.2  T° 84.0 | RTSE 4.2  T° 85.4 | RTSE 4.2  T° 86.8 |
| 2.6 | RTSE 4.4  T° 73.3 | RTSE 4.4  T° 74.7 | RTSE 4.4  T° 76.2 | RTSE 4.4  T° 77.6 | RTSE 4.4  T° 79.1 | RTSE 4.4  T° 80.5 |
| | RTSE 4.2  T° 78.9 | RTSE 4.2  T° 80.3 | RTSE 4.2  T° 81.8 | RTSE 4.2  T° 83.3 | RTSE 4.2  T° 84.7 | RTSE 4.2  T° 86.1 |
| 2.9 | RTSE 4.4  T° 72.6 | RTSE 4.4  T° 74.1 | RTSE 4.4  T° 75.5 | RTSE 4.4  T° 77.0 | RTSE 4.4  T° 78.4 | RTSE 4.4  T° 79.8 |
| | RTSE 4.2  T° 78.2 | RTSE 4.2  T° 79.7 | RTSE 4.2  T° 81.1 | RTSE 4.2  T° 82.6 | RTSE 4.2  T° 84.0 | RTSE 4.2  T° 85.4 |
| 3.2 | RTSE 4.4  T° 72.0 | RTSE 4.4  T° 73.5 | RTSE 4.4  T° 74.9 | RTSE 4.4  T° 76.4 | RTSE 4.4  T° 77.8 | RTSE 4.4  T° 79.2 |
| | RTSE 4.2  T° 77.6 | RTSE 4.2  T° 79.1 | RTSE 4.2  T° 80.5 | RTSE 4.2  T° 82.0 | RTSE 4.2  T° 83.4 | RTSE 4.2  T° 84.8 |
| 3.6 | RTSE 4.4  T° 71.2 | RTSE 4.4  T° 72.7 | RTSE 4.4  T° 74.2 | RTSE 4.4  T° 75.6 | RTSE 4.4  T° 77.0 | RTSE 4.4  T° 78.5 |
| | RTSE 4.2  T° 76.9 | RTSE 4.2  T° 78.3 | RTSE 4.2  T° 79.8 | RTSE 4.2  T° 81.2 | RTSE 4.2  T° 82.7 | RTSE 4.2  T° 84.1 |
| 4.0 | RTSE 4.4  T° 70.5 | RTSE 4.4  T° 72.0 | RTSE 4.4  T° 73.5 | RTSE 4.4  T° 74.9 | RTSE 4.4  T° 76.4 | RTSE 4.4  T° 77.8 |
| | RTSE 4.2  T° 76.2 | RTSE 4.2  T° 77.6 | RTSE 4.2  T° 79.1 | RTSE 4.2  T° 80.5 | RTSE 4.2  T° 82.0 | RTSE 4.2  T° 83.4 |

Fig.11B

| MELT-INDEX | DENSITY | | | | | |
|---|---|---|---|---|---|---|
| | 921 | 922 | 923 | 924 | 925 | 926 |
| 1.4 | RTSE 4.4  T° 85.2 | RTSE 4.4  T° 86.6 | RTSE 4.4  T° 87.9 | RTSE 4.4  T° 89.3 | RTSE 4.4  T° 90.6 | RTSE 4.4  T° 91.9 |
| | RTSE 4.2  T° 90.8 | RTSE 4.2  T° 92.2 | RTSE 4.2  T° 93.6 | RTSE 4.2  T° 94.9 | RTSE 4.2  T° 96.2 | RTSE 4.2  T° 97.5 |
| 1.5 | RTSE 4.4  T° 84.9 | RTSE 4.4  T° 86.2 | RTSE 4.4  T° 87.6 | RTSE 4.4  T° 88.9 | RTSE 4.4  T° 90.3 | RTSE 4.4  T° 91.6 |
| | RTSE 4.2  T° 90.5 | RTSE 4.2  T° 91.9 | RTSE 4.2  T° 93.2 | RTSE 4.2  T° 94.6 | RTSE 4.2  T° 95.9 | RTSE 4.2  T° 97.2 |
| 1.7 | RTSE 4.4  T° 84.2 | RTSE 4.4  T° 85.6 | RTSE 4.4  T° 87.0 | RTSE 4.4  T° 88.3 | RTSE 4.4  T° 89.6 | RTSE 4.4  T° 90.9 |
| | RTSE 4.2  T° 89.9 | RTSE 4.2  T° 91.2 | RTSE 4.2  T° 92.6 | RTSE 4.2  T° 93.9 | RTSE 4.2  T° 95.3 | RTSE 4.2  T° 96.5 |
| 1.9 | RTSE 4.4  T° 83.7 | RTSE 4.4  T° 85.0 | RTSE 4.4  T° 86.4 | RTSE 4.4  T° 87.7 | RTSE 4.4  T° 89.1 | RTSE 4.4  T° 90.3 |
| | RTSE 4.2  T° 89.3 | RTSE 4.2  T° 90.7 | RTSE 4.2  T° 92.0 | RTSE 4.2  T° 93.4 | RTSE 4.2  T° 94.7 | RTSE 4.2  T° 96.0 |
| 2.1 | RTSE 4.4  T° 83.1 | RTSE 4.4  T° 84.5 | RTSE 4.4  T° 85.8 | RTSE 4.4  T° 87.2 | RTSE 4.4  T° 88.5 | RTSE 4.4  T° 89.8 |
| | RTSE 4.2  T° 88.7 | RTSE 4.2  T° 90.1 | RTSE 4.2  T° 91.5 | RTSE 4.2  T° 92.8 | RTSE 4.2  T° 94.1 | RTSE 4.2  T° 95.4 |
| 2.3 | RTSE 4.4  T° 82.6 | RTSE 4.4  T° 84.0 | RTSE 4.4  T° 85.3 | RTSE 4.4  T° 86.7 | RTSE 4.4  T° 88.0 | RTSE 4.4  T° 89.3 |
| | RTSE 4.2  T° 88.2 | RTSE 4.2  T° 89.6 | RTSE 4.2  T° 91.0 | RTSE 4.2  T° 92.3 | RTSE 4.2  T° 93.6 | RTSE 4.2  T° 94.9 |
| 2.6 | RTSE 4.4  T° 81.9 | RTSE 4.4  T° 83.3 | RTSE 4.4  T° 84.6 | RTSE 4.4  T° 86.0 | RTSE 4.4  T° 87.3 | RTSE 4.4  T° 88.6 |
| | RTSE 4.2  T° 87.5 | RTSE 4.2  T° 88.9 | RTSE 4.2  T° 90.2 | RTSE 4.2  T° 91.6 | RTSE 4.2  T° 92.9 | RTSE 4.2  T° 94.2 |
| 2.9 | RTSE 4.4  T° 81.2 | RTSE 4.4  T° 82.6 | RTSE 4.4  T° 84.0 | RTSE 4.4  T° 85.3 | RTSE 4.4  T° 86.6 | RTSE 4.4  T° 87.9 |
| | RTSE 4.2  T° 86.8 | RTSE 4.2  T° 88.2 | RTSE 4.2  T° 89.6 | RTSE 4.2  T° 90.9 | RTSE 4.2  T° 92.2 | RTSE 4.2  T° 93.5 |
| 3.2 | RTSE 4.4  T° 80.6 | RTSE 4.4  T° 82.0 | RTSE 4.4  T° 83.4 | RTSE 4.4  T° 84.7 | RTSE 4.4  T° 86.0 | RTSE 4.4  T° 87.3 |
| | RTSE 4.2  T° 86.2 | RTSE 4.2  T° 87.6 | RTSE 4.2  T° 89.0 | RTSE 4.2  T° 90.3 | RTSE 4.2  T° 91.6 | RTSE 4.2  T° 92.9 |
| 3.6 | RTSE 4.4  T° 79.9 | RTSE 4.4  T° 81.2 | RTSE 4.4  T° 82.6 | RTSE 4.4  T° 83.9 | RTSE 4.4  T° 85.3 | RTSE 4.4  T° 86.5 |
| | RTSE 4.2  T° 85.5 | RTSE 4.2  T° 86.9 | RTSE 4.2  T° 88.2 | RTSE 4.2  T° 89.6 | RTSE 4.2  T° 90.9 | RTSE 4.2  T° 92.2 |
| 4.0 | RTSE 4.4  T° 79.2 | RTSE 4.4  T° 80.6 | RTSE 4.4  T° 81.9 | RTSE 4.4  T° 83.2 | RTSE 4.4  T° 84.6 | RTSE 4.4  T° 85.9 |
| | RTSE 4.2  T° 84.8 | RTSE 4.2  T° 86.2 | RTSE 4.2  T° 87.5 | RTSE 4.2  T° 88.9 | RTSE 4.2  T° 90.2 | RTSE 4.2  T° 91.5 |

Fig.11C

| MELT-INDEX | DENSITY | | | |
|---|---|---|---|---|
| | 927 | 928 | 929 | 930 |
| 1.4 | RTSE T°<br>4.4  93.2 | RTSE T°<br>4.4  94.4 | RTSE T°<br>4.4  95.6 | RTSE T°<br>4.4  96.8 |
| | RTSE T°<br>4.2  98.8 | RTSE T°<br>4.2  100.0 | RTSE T°<br>4.2  101.2 | RTSE T°<br>4.2  102.4 |
| 1.5 | RTSE T°<br>4.4  92.8 | RTSE T°<br>4.4  94.1 | RTSE T°<br>4.4  95.3 | RTSE T°<br>4.4  96.5 |
| | RTSE T°<br>4.2  98.4 | RTSE T°<br>4.2  99.7 | RTSE T°<br>4.2  100.9 | RTSE T°<br>4.2  102.1 |
| 1.7 | RTSE T°<br>4.4  92.2 | RTSE T°<br>4.4  93.4 | RTSE T°<br>4.4  94.7 | RTSE T°<br>4.4  95.9 |
| | RTSE T°<br>4.2  97.8 | RTSE T°<br>4.2  99.1 | RTSE T°<br>4.2  100.3 | RTSE T°<br>4.2  101.5 |
| 1.9 | RTSE T°<br>4.4  91.6 | RTSE T°<br>4.4  92.9 | RTSE T°<br>4.4  94.1 | RTSE T°<br>4.4  95.3 |
| | RTSE T°<br>4.2  97.2 | RTSE T°<br>4.2  98.5 | RTSE T°<br>4.2  99.7 | RTSE T°<br>4.2  100.9 |
| 2.1 | RTSE T°<br>4.4  91.1 | RTSE T°<br>4.4  92.3 | RTSE T°<br>4.4  93.5 | RTSE T°<br>4.4  94.7 |
| | RTSE T°<br>4.2  96.7 | RTSE T°<br>4.2  97.9 | RTSE T°<br>4.2  99.2 | RTSE T°<br>4.2  100.4 |
| 2.3 | RTSE T°<br>4.4  90.6 | RTSE T°<br>4.4  91.8 | RTSE T°<br>4.4  93.0 | RTSE T°<br>4.4  94.2 |
| | RTSE T°<br>4.2  96.2 | RTSE T°<br>4.2  97.4 | RTSE T°<br>4.2  98.6 | RTSE T°<br>4.2  99.8 |
| 2.6 | RTSE T°<br>4.4  89.8 | RTSE T°<br>4.4  91.1 | RTSE T°<br>4.4  92.3 | RTSE T°<br>4.4  93.5 |
| | RTSE T°<br>4.2  95.5 | RTSE T°<br>4.2  96.7 | RTSE T°<br>4.2  97.9 | RTSE T°<br>4.2  99.1 |
| 2.9 | RTSE T°<br>4.4  89.2 | RTSE T°<br>4.4  90.4 | RTSE T°<br>4.4  91.7 | RTSE T°<br>4.4  92.9 |
| | RTSE T°<br>4.2  94.8 | RTSE T°<br>4.2  96.0 | RTSE T°<br>4.2  97.3 | RTSE T°<br>4.2  98.5 |
| 3.2 | RTSE T°<br>4.4  88.6 | RTSE T°<br>4.4  89.8 | RTSE T°<br>4.4  91.0 | RTSE T°<br>4.4  92.2 |
| | RTSE T°<br>4.2  94.2 | RTSE T°<br>4.2  95.4 | RTSE T°<br>4.2  96.7 | RTSE T°<br>4.2  97.9 |
| 3.6 | RTSE T°<br>4.4  87.8 | RTSE T°<br>4.4  89.1 | RTSE T°<br>4.4  91.3 | RTSE T°<br>4.4  91.5 |
| | RTSE T°<br>4.2  93.4 | RTSE T°<br>4.2  94.7 | RTSE T°<br>4.2  95.9 | RTSE T°<br>4.2  97.1 |
| 4.0 | RTSE T°<br>4.4  87.1 | RTSE T°<br>4.4  88.4 | RTSE T°<br>4.4  89.6 | RTSE T°<br>4.4  90.8 |
| | RTSE T°<br>4.2  92.7 | RTSE T°<br>4.2  94.0 | RTSE T°<br>4.2  95.2 | RTSE T°<br>4.2  96.4 |

Fig.12A

| MELT-INDEX | DENSITY | | | | | |
|---|---|---|---|---|---|---|
| | 915 | 916 | 917 | 918 | 919 | 920 |
| 0.5 | RTSE 4.4  T° 80.3 | RTSE 4.4  T° 81.8 | RTSE 4.4  T° 83.3 | RTSE 4.4  T° 84.7 | RTSE 4.4  T° 86.1 | RTSE 4.4  T° 87.6 |
| | RTSE 4.2  T° 85.9 | RTSE 4.2  T° 87.4 | RTSE 4.2  T° 88.9 | RTSE 4.2  T° 90.3 | RTSE 4.2  T° 91.8 | RTSE 4.2  T° 93.2 |
| 0.6 | RTSE 4.4  T° 79.8 | RTSE 4.4  T° 81.3 | RTSE 4.4  T° 82.7 | RTSE 4.4  T° 84.2 | RTSE 4.4  T° 85.6 | RTSE 4.4  T° 87.0 |
| | RTSE 4.2  T° 85.4 | RTSE 4.2  T° 86.9 | RTSE 4.2  T° 88.4 | RTSE 4.2  T° 89.8 | RTSE 4.2  T° 91.2 | RTSE 4.2  T° 92.7 |
| 0.7 | RTSE 4.4  T° 79.3 | RTSE 4.4  T° 80.8 | RTSE 4.4  T° 82.3 | RTSE 4.4  T° 83.7 | RTSE 4.4  T° 85.1 | RTSE 4.4  T° 86.6 |
| | RTSE 4.2  T° 85.0 | RTSE 4.2  T° 86.4 | RTSE 4.2  T° 87.9 | RTSE 4.2  T° 89.3 | RTSE 4.2  T° 90.8 | RTSE 4.2  T° 92.2 |
| 0.8 | RTSE 4.4  T° 78.9 | RTSE 4.4  T° 80.3 | RTSE 4.4  T° 81.8 | RTSE 4.4  T° 83.3 | RTSE 4.4  T° 84.7 | RTSE 4.4  T° 86.1 |
| | RTSE 4.2  T° 84.5 | RTSE 4.2  T° 86.0 | RTSE 4.2  T° 87.4 | RTSE 4.2  T° 88.9 | RTSE 4.2  T° 90.3 | RTSE 4.2  T° 91.7 |
| 0.9 | RTSE 4.4  T° 78.4 | RTSE 4.4  T° 79.9 | RTSE 4.4  T° 81.4 | RTSE 4.4  T° 82.8 | RTSE 4.4  T° 84.3 | RTSE 4.4  T° 85.7 |
| | RTSE 4.2  T° 84.1 | RTSE 4.2  T° 85.5 | RTSE 4.2  T° 87.0 | RTSE 4.2  T° 88.4 | RTSE 4.2  T° 89.9 | RTSE 4.2  T° 91.3 |
| 1.0 | RTSE 4.4  T° 78.0 | RTSE 4.4  T° 79.5 | RTSE 4.4  T° 81.0 | RTSE 4.4  T° 82.4 | RTSE 4.4  T° 83.8 | RTSE 4.4  T° 85.3 |
| | RTSE 4.2  T° 83.7 | RTSE 4.2  T° 85.1 | RTSE 4.2  T° 86.6 | RTSE 4.2  T° 88.0 | RTSE 4.2  T° 89.5 | RTSE 4.2  T° 90.9 |
| 1.1 | RTSE 4.4  T° 77.6 | RTSE 4.4  T° 79.1 | RTSE 4.4  T° 80.6 | RTSE 4.4  T° 82.0 | RTSE 4.4  T° 83.5 | RTSE 4.4  T° 84.9 |
| | RTSE 4.2  T° 83.3 | RTSE 4.2  T° 84.7 | RTSE 4.2  T° 86.2 | RTSE 4.2  T° 87.6 | RTSE 4.2  T° 89.1 | RTSE 4.2  T° 90.5 |
| 1.2 | RTSE 4.4  T° 77.3 | RTSE 4.4  T° 78.7 | RTSE 4.4  T° 80.2 | RTSE 4.4  T° 81.6 | RTSE 4.4  T° 83.1 | RTSE 4.4  T° 84.5 |
| | RTSE 4.2  T° 82.9 | RTSE 4.2  T° 84.4 | RTSE 4.2  T° 85.8 | RTSE 4.2  T° 87.3 | RTSE 4.2  T° 88.7 | RTSE 4.2  T° 90.1 |
| 1.3 | RTSE 4.4  T° 76.9 | RTSE 4.4  T° 78.4 | RTSE 4.4  T° 79.8 | RTSE 4.4  T° 81.3 | RTSE 4.4  T° 82.7 | RTSE 4.4  T° 84.1 |
| | RTSE 4.2  T° 82.5 | RTSE 4.2  T° 84.0 | RTSE 4.2  T° 85.5 | RTSE 4.2  T° 86.9 | RTSE 4.2  T° 88.3 | RTSE 4.2  T° 89.8 |
| 1.4 | RTSE 4.4  T° 76.6 | RTSE 4.4  T° 78.0 | RTSE 4.4  T° 79.5 | RTSE 4.4  T° 80.9 | RTSE 4.4  T° 82.4 | RTSE 4.4  T° 83.8 |
| | RTSE 4.2  T° 82.2 | RTSE 4.2  T° 83.7 | RTSE 4.2  T° 85.1 | RTSE 4.2  T° 86.6 | RTSE 4.2  T° 88.0 | RTSE 4.2  T° 89.4 |
| 1.5 | RTSE 4.4  T° 76.2 | RTSE 4.4  T° 77.7 | RTSE 4.4  T° 79.2 | RTSE 4.4  T° 80.6 | RTSE 4.4  T° 82.0 | RTSE 4.4  T° 83.5 |
| | RTSE 4.2  T° 81.9 | RTSE 4.2  T° 83.3 | RTSE 4.2  T° 84.8 | RTSE 4.2  T° 86.2 | RTSE 4.2  T° 87.7 | RTSE 4.2  T° 89.1 |

Fig.12B

| MELT-INDEX | DENSITY | | | | | |
|---|---|---|---|---|---|---|
| | 921 | 922 | 923 | 924 | 925 | 926 |
| 0.5 | RTSE T° 4.4  89.0 | RTSE T° 4.4  90.3 | RTSE T° 4.4  91.7 | RTSE T° 4.4  93.0 | RTSE T° 4.4  94.4 | RTSE T° 4.4  95.6 |
| | RTSE T° 4.2  94.6 | RTSE T° 4.2  96.0 | RTSE T° 4.2  97.3 | RTSE T° 4.2  98.7 | RTSE T° 4.2  100.0 | RTSE T° 4.2  101.3 |
| 0.6 | RTSE T° 4.4  88.4 | RTSE T° 4.4  89.8 | RTSE T° 4.4  91.2 | RTSE T° 4.4  92.5 | RTSE T° 4.4  93.8 | RTSE T° 4.4  95.1 |
| | RTSE T° 4.2  94.1 | RTSE T° 4.2  95.4 | RTSE T° 4.2  96.8 | RTSE T° 4.2  98.1 | RTSE T° 4.2  99.5 | RTSE T° 4.2  100.8 |
| 0.7 | RTSE T° 4.4  88.0 | RTSE T° 4.4  89.3 | RTSE T° 4.4  90.7 | RTSE T° 4.4  92.0 | RTSE T° 4.4  93.4 | RTSE T° 4.4  94.7 |
| | RTSE T° 4.2  93.6 | RTSE T° 4.2  95.0 | RTSE T° 4.2  96.3 | RTSE T° 4.2  97.7 | RTSE T° 4.2  99.0 | RTSE T° 4.2  100.3 |
| 0.8 | RTSE T° 4.4  87.5 | RTSE T° 4.4  88.9 | RTSE T° 4.4  90.2 | RTSE T° 4.4  91.6 | RTSE T° 4.4  92.9 | RTSE T° 4.4  94.2 |
| | RTSE T° 4.2  93.1 | RTSE T° 4.2  94.5 | RTSE T° 4.2  95.9 | RTSE T° 4.2  97.2 | RTSE T° 4.2  98.5 | RTSE T° 4.2  99.8 |
| 0.9 | RTSE T° 4.4  87.1 | RTSE T° 4.4  88.5 | RTSE T° 4.4  89.8 | RTSE T° 4.4  91.2 | RTSE T° 4.4  92.5 | RTSE T° 4.4  93.8 |
| | RTSE T° 4.2  92.7 | RTSE T° 4.2  94.1 | RTSE T° 4.2  95.4 | RTSE T° 4.2  96.8 | RTSE T° 4.2  98.1 | RTSE T° 4.2  99.4 |
| 1.0 | RTSE T° 4.4  86.7 | RTSE T° 4.4  88.0 | RTSE T° 4.4  89.4 | RTSE T° 4.4  90.7 | RTSE T° 4.4  92.1 | RTSE T° 4.4  93.4 |
| | RTSE T° 4.2  92.3 | RTSE T° 4.2  93.7 | RTSE T° 4.2  95.0 | RTSE T° 4.2  96.4 | RTSE T° 4.2  97.7 | RTSE T° 4.2  99.0 |
| 1.1 | RTSE T° 4.4  86.3 | RTSE T° 4.4  87.7 | RTSE T° 4.4  89.0 | RTSE T° 4.4  90.3 | RTSE T° 4.4  91.7 | RTSE T° 4.4  93.0 |
| | RTSE T° 4.2  91.9 | RTSE T° 4.2  93.3 | RTSE T° 4.2  94.6 | RTSE T° 4.2  96.0 | RTSE T° 4.2  97.3 | RTSE T° 4.2  98.6 |
| 1.2 | RTSE T° 4.4  85.9 | RTSE T° 4.4  87.3 | RTSE T° 4.4  88.6 | RTSE T° 4.4  90.0 | RTSE T° 4.4  91.3 | RTSE T° 4.4  92.6 |
| | RTSE T° 4.2  91.5 | RTSE T° 4.2  92.9 | RTSE T° 4.2  94.3 | RTSE T° 4.2  95.6 | RTSE T° 4.2  96.9 | RTSE T° 4.2  98.2 |
| 1.3 | RTSE T° 4.4  85.5 | RTSE T° 4.4  85.9 | RTSE T° 4.4  88.3 | RTSE T° 4.4  89.6 | RTSE T° 4.4  90.9 | RTSE T° 4.4  92.2 |
| | RTSE T° 4.2  91.2 | RTSE T° 4.2  92.5 | RTSE T° 4.2  93.9 | RTSE T° 4.2  95.2 | RTSE T° 4.2  96.6 | RTSE T° 4.2  97.8 |
| 1.4 | RTSE T° 4.4  85.2 | RTSE T° 4.4  86.6 | RTSE T° 4.4  87.9 | RTSE T° 4.4  89.3 | RTSE T° 4.4  90.6 | RTSE T° 4.4  91.9 |
| | RTSE T° 4.2  90.8 | RTSE T° 4.2  92.2 | RTSE T° 4.2  93.6 | RTSE T° 4.2  94.9 | RTSE T° 4.2  96.2 | RTSE T° 4.2  97.5 |
| 1.5 | RTSE T° 4.4  84.9 | RTSE T° 4.4  86.2 | RTSE T° 4.4  87.6 | RTSE T° 4.4  88.9 | RTSE T° 4.4  90.3 | RTSE T° 4.4  91.6 |
| | RTSE T° 4.2  90.5 | RTSE T° 4.2  91.9 | RTSE T° 4.2  93.2 | RTSE T° 4.2  94.6 | RTSE T° 4.2  95.9 | RTSE T° 4.2  97.2 |

Fig.12C

| MELT-INDEX | DENSITY | | | |
|---|---|---|---|---|
| | 927 | 928 | 929 | 930 |
| 0.5 | RTSE T°<br>4.4  96.9 | RTSE T°<br>4.4  98.2 | RTSE T°<br>4.4  99.4 | RTSE T°<br>4.4  100.6 |
| | RTSE T°<br>4.2  102.5 | RTSE T°<br>4.2  103.8 | RTSE T°<br>4.2  105.0 | RTSE T°<br>4.2  106.2 |
| 0.6 | RTSE T°<br>4.4  96.4 | RTSE T°<br>4.4  97.7 | RTSE T°<br>4.4  98.9 | RTSE T°<br>4.4  100.1 |
| | RTSE T°<br>4.2  102.0 | RTSE T°<br>4.2  103.3 | RTSE T°<br>4.2  104.5 | RTSE T°<br>4.2  105.7 |
| 0.7 | RTSE T°<br>4.4  95.9 | RTSE T°<br>4.4  97.2 | RTSE T°<br>4.4  98.4 | RTSE T°<br>4.4  99.6 |
| | RTSE T°<br>4.2  101.5 | RTSE T°<br>4.2  102.8 | RTSE T°<br>4.2  104.0 | RTSE T°<br>4.2  105.2 |
| 0.8 | RTSE T°<br>4.4  95.5 | RTSE T°<br>4.4  96.7 | RTSE T°<br>4.4  97.9 | RTSE T°<br>4.4  99.1 |
| | RTSE T°<br>4.2  101.1 | RTSE T°<br>4.2  102.3 | RTSE T°<br>4.2  103.6 | RTSE T°<br>4.2  104.8 |
| 0.9 | RTSE T°<br>4.4  95.0 | RTSE T°<br>4.4  96.3 | RTSE T°<br>4.4  97.5 | RTSE T°<br>4.4  98.7 |
| | RTSE T°<br>4.2  100.7 | RTSE T°<br>4.2  101.9 | RTSE T°<br>4.2  103.1 | RTSE T°<br>4.2  104.3 |
| 1.0 | RTSE T°<br>4.4  94.6 | RTSE T°<br>4.4  95.9 | RTSE T°<br>4.4  97.1 | RTSE T°<br>4.4  98.3 |
| | RTSE T°<br>4.2  100.2 | RTSE T°<br>4.2  101.5 | RTSE T°<br>4.2  102.7 | RTSE T°<br>4.2  103.9 |
| 1.1 | RTSE T°<br>4.4  94.2 | RTSE T°<br>4.4  95.5 | RTSE T°<br>4.4  96.7 | RTSE T°<br>4.4  97.9 |
| | RTSE T°<br>4.2  99.8 | RTSE T°<br>4.2  101.1 | RTSE T°<br>4.2  102.3 | RTSE T°<br>4.2  103.5 |
| 1.2 | RTSE T°<br>4.4  93.9 | RTSE T°<br>4.4  95.1 | RTSE T°<br>4.4  96.3 | RTSE T°<br>4.4  97.5 |
| | RTSE T°<br>4.2  99.5 | RTSE T°<br>4.2  100.7 | RTSE T°<br>4.2  101.9 | RTSE T°<br>4.2  103.1 |
| 1.3 | RTSE T°<br>4.4  93.5 | RTSE T°<br>4.4  94.7 | RTSE T°<br>4.4  96.0 | RTSE T°<br>4.4  97.2 |
| | RTSE T°<br>4.2  99.1 | RTSE T°<br>4.2  100.4 | RTSE T°<br>4.2  101.6 | RTSE T°<br>4.2  102.8 |
| 1.4 | RTSE T°<br>4.4  93.2 | RTSE T°<br>4.4  94.4 | RTSE T°<br>4.4  95.6 | RTSE T°<br>4.4  96.8 |
| | RTSE T°<br>4.2  98.8 | RTSE T°<br>4.2  100.0 | RTSE T°<br>4.2  101.2 | RTSE T°<br>4.2  102.4 |
| 1.5 | RTSE T°<br>4.4  92.8 | RTSE T°<br>4.4  94.1 | RTSE T°<br>4.4  95.3 | RTSE T°<br>4.4  96.5 |
| | RTSE T°<br>4.2  98.4 | RTSE T°<br>4.2  99.7 | RTSE T°<br>4.2  100.9 | RTSE T°<br>4.2  102.1 |

PROCESS FOR THE (CO-)POLYMERIZATION OF ETHYLENE IN THE GAS PHASE

This application is the U.S. National Phase of International Application PCT/GB04/002970, filed 8 Jul. 2004, which designated the U.S. PCT/GB04/002970 claims priority to European Application No. 03358009.3 filed 11 Jul. 2003. The entire content of these applications are incorporated herein by reference.

The present invention relates to a process for improving the start up of polymerization or copolymerization of ethylene in a gas phase reactor, preferably a fluidised bed gas phase reactor.

Processes for the (co)-polymerisation of olefins in the gas phase are well known in the art. Such processes can be conducted for example by introducing the gaseous monomer and comonomer into a stirred and/or gas fluidised bed comprising polyolefin and a catalyst for the polymerisation.

In the gas fluidised bed polymerisation of olefins, the polymerisation is conducted in a fluidised bed reactor wherein a bed of polymer particles is maintained in a fluidised state by means of an ascending gas stream comprising the gaseous reaction monomer. The start-up of such a polymerisation generally employs a bed of polymer particles similar to the polymer, which it is desired to manufacture. During the course of polymerisation, fresh polymer is generated by the catalytic polymerisation of the monomer, and polymer product is withdrawn to maintain the bed at more or less constant volume. An industrially favoured process employs a fluidisation grid to distribute the fluidising gas to the bed, and to act as a support for the bed when the supply of gas is cut off. The polymer produced is generally withdrawn from the reactor via a discharge conduit arranged in the lower portion of the reactor, near the fluidisation grid. The fluidised bed consists in a bed of growing polymer particles. This bed is maintained in a fluidised condition by the continuous upward flow from the base of the reactor of a fluidising gas.

The polymerisation of olefins is an exothermic reaction and it is therefore necessary to provide means to cool the bed to remove the heat of polymerisation. In the absence of such cooling the bed would increase in temperature and, for example, the catalyst becomes inactive or the bed commences to fuse. In the fluidised bed polymerisation of olefins, the preferred method for removing the heat of polymerisation is by supplying to the polymerisation reactor a gas, the fluidising gas, which is at a temperature lower than the desired polymerisation temperature, passing the gas through the fluidised bed to conduct away the heat of polymerisation, removing the gas from the reactor and cooling it by passage through an external heat exchanger, and recycling it to the bed. The temperature of the recycle gas can be adjusted in the heat exchanger to maintain the fluidised bed at the desired polymerisation temperature. In this method of polymerising alpha olefins, the recycle gas generally comprises the monomer and comonomer olefins, optionally together with, for example, an inert diluent gas such as nitrogen or a gaseous chain transfer agent such as hydrogen. Thus, the recycle gas serves to supply the monomer to the bed, to fluidise the bed, and to maintain the bed at the desired temperature. Monomers consumed by the polymerisation reaction are normally replaced by adding make up gas or liquid to the polymerisation zone or reaction loop.

For large-scale operations (reactor producing more than 100 KT of polymer a year), it is usually decide in advance which polymer grades should be produced during a production campaign. Said choice usually depends on the market conditions. A campaign is defined as the production period between two shutdowns. The different polymers to be produced during the said campaign are defined as the grade slate. It has now been found an improved start-up operation wherein the polymerization or copolymerisation reaction starts immediately after the alpha-olefins have been brought into contact with the catalyst system and a charge powder, without the risk of formation of agglomerates or fine particles, the polyolefins produced during this period of start up having constant properties, having immediately the desired quality, and allowing to continue to produce the entire grade slate of the campaign without the risk of formation of agglomerates or fine particles.

The object of the present invention is therefore a process for the polymerisation or copolymerisation in the gas phase of ethylene by bringing the said ethylene into contact, under polymerization or copolymerisation conditions in a reactor in which the start-up bed is fluidised and/or agitated with mechanical stirring, with a catalyst system, which process comprises a pre start-up operation characterized in that, prior to the introduction of the catalytic system in the reactor, it comprises the following steps 1. determining the density d and melt index MI of all the polyethylene powders (grade slate) to be produced during the campaign from start-up to shut down,
2. heating the reactor by controlling the temperature inside the reactor such that
   a. the temperature is maintained at a value equal or higher than the highest temperature corresponding to a RTSE value of 4.4 for all the polyethylene powders to be produced.

It is also an object of the present invention to provide with a continuous gas fluidized bed process for the polymerization of ethylene monomer and one or more optional alpha-olefins, in a fluidized bed reactor by continuously recycling a gaseous stream comprising at least some of the ethylene through the fluidized bed, comprising the steps of 1. having some or all of the recycling gas acting as the fluidizing gas through the bed in order to maintain the bed in the fluidized state,
2. heating the fluidizing gas with an external heating system,
3. determining the density d and melt index MI of all the polyethylene powders (grade slate) to be produced during the campaign from start-up to shut-down,
4. identifying in the RTSE tables the temperatures corresponding to a RTSE value of 4.4 for each grade,
5. having and/or building into the reactor the appropriate reactive olefin gas and/or liquid environment, and
6. a final step of introducing into the reactor the active polymerization catalyst specie which instantaneously starts the olefin polymerization process, characterized in that, before the final step of introducing the catalyst into the reactor, the heating step is conducted by controlling the temperature inside the reactor such that b. the temperature is maintained at a value equal or higher than the highest temperature identified in above step 4.

According to a preferred embodiment of the present invention, the heating step of the start-up bed by controlling the temperature inside the reactor is also such that the temperature is maintained at a value equal or lower than the lowest temperature which is identified by following the following procedure:

identifying in the RTSE tables the temperatures corresponding to a RTSE value of 4.2 for each grade to be produced during the campaign, choosing the lowest temperatures amongst the so-identified temperatures.

The densities can be measured according to ASTM-D-792 and defined as in ASTM-D-1248-84. The melt index can be measured according to ASTM-D-1238, condition A (2.16 kg).

FIGS. 1 to 12 represent the RTSE tables covering the polyethylene grades to be produced according to the present invention.

The RTSE value is indicated in the attached tables (FIGS. 1 to 12) which cover polyethylene grades having a density from 915 to 960 and a melt index from 0.5 to 30. To each density/melt index couple corresponds a 4.2 and 4.4 RTSE value and a corresponding temperature as indicated in the tables. For density or melt index values that are falling at the border of operating envelopes (window), the corresponding operating temperature envelope can easily be calculated by making linear interpolations.

For example, in FIG. 7, for a 940/4.0 density/melt index couple, the temperature at an RTSE of 4.4 is 100.2° C. and the temperature at an RTSE of 4.2 is 105.8; thus, when it is decided to produce a 940/4.0 d/MI polyethylene grade, the pre-start-up heating step according to the present invention should be performed at a temperature which is at least equal to 100.2° C. (RTSE=4.40) and, preferably, lower than (or equal to) 105.8° C. (RTSE=4.2).

For a 940/5.05 d/MI polyethylene grade, the calculation gives

| | T° C. | |
|---|---|---|
| | RTSE = 4.4 | RTSE = 4.2 |
| 940/4.8 | 100.2 | 105.8 |
| 940/5.3 | 99.5 | 105.1 |
| → 940/5.05 | (100.2 + 99.5)/2 | (105.8 + 105.1)/2 | i.e., a pre-start-up heating step according to the present invention which should be performed at a temperature which is at least equal to 99.85° C. (RTSE=4.4) and, preferably, lower than (or equal to) 105.45° C. (RTSE=4.2).

In order to provide the most efficient pre-start-up treatment, it is important that this treatment should last at least five minutes and preferably over 15 minutes before catalyst injection.

The Applicants have unexpectedly found that this temperature control leads to smooth and improved in all aspects polymerization start-ups and during all the grade slate production, i.e. during the whole campaign.

The essential feature of the present invention lies in said strict control of the reactor inside temperature during pre-start-up.

As can been seen from the attached figures, the said reactor temperatures are unusually high for gas phase operations. In the prior art start-up operations, the temperature inside the reactor remains usually very low before the catalyst is first injected. The particular feature according to the present invention lies in the heating of the reactor before start-up in order to reach the appropriate temperature inside the reactor before catalyst injection and start-up.

Said heating can be done by any appropriate mean, e.g. by using a heat exchanger in the reaction loop. However, it is obvious for the man knowledgeable in the art that the usual cooling water system (that is based on an open loop) will not allow to reach the heating temperatures required according to the present invention.

Therefore, according to the present invention, we preferably use a closed loop pressurised water cooling system (using steam) in order to provide reactor operating temperatures before start-up in excess of 100° C.

According to a preferred embodiment, the present invention is especially valuable for the polymer grade which requires a heating temperature of at least 95° C., preferably at least 100° C. For example, according to the present invention, this means that at least one of the grades to be produced during the campaign has (in the attached tables) for a RTSE value of 4.4 a temperature which is at least of 95° C., preferably at least 100° C.

Said pre start-up operation (heating step) is advantageously performed before the introduction of the start-up bed (charge powder) into the reactor. The heating step can also ideally continue during the start-up bed introduction and in the presence of the bed until final introduction of the catalyst. In this case, it is preferred to ensure that the operating temperature remains at least 0.5° C. below the sintering temperature of the start-up bed. When the sintering temperature of the start-up bed lies more than 0.5° C. below the heating temperature it is preferred at the time of the start-up bed introduction to reduce the heating temperature in order to comply with this "at least 0.5° C. below sintering temperature of the start-up bed" requirement.

The charge powder used for the start up of polymerisation or copolymerisation consists of solid particles of an inorganic product, such as silica, alumina, talc or magnesia, or else an organic product such as a polymer or copolymer. In particular the charge powder may be a polyolefin powder preferably of the same nature as that of the polyolefin powder to be produced, so that as soon as the reaction starts up, polyolefin of the desired quality is obtained immediately. Such a charge powder may in particular originate from a previous polymerisation or copolymerisation reaction. In this way one may use as charge powder a powder of a polyethylene, a polypropylene, a copolymer of ethylene with less than 20% by weight of one or more other alpha-olefins comprising, for example, from 3 to 12 carbon: atoms, an elastomeric copolymer of ethylene with from 30 to 70% by weight of propylene, a copolymer of ethylene with less than 20% by weight of ethylene or one or more other alpha-olefins comprising from 4 to 12 carbon atoms, or a copolymer of propylene with from 10 to 40% by weight of 1-butene or a mixture of 1-butene and ethylene. Advantageously the charge powder consists of particles having a mean diameter by mass comprised between 200 and 5000 microns, and preferably comprised between 500 and 3000 microns. The size of the charge powder particles is chosen partly as a function of the size of the polyolefin particles to be produced, and partly as a function of the type of polymerisation reactor and conditions of use of this reactor, such as for example the speed of fluidisation which may for example be comprised between 2 to 10 times the minimum speed of fluidisation of the polyolefin particles to be produced.

According to the present invention, the completion of the mandatory heating step is done before the introduction of the active polymerization catalyst specie inside the reactor. It will be apparent for the man skilled in the art that the present invention process can also advantageously be used after a shutdown of the previous polymerization process. Consequently, there might be residual polymerization occurring when proceeding with the heating step according to the present invention. It is thus preferred to continue to control the temperature according to the process claimed until the introduction of the catalyst specie into the reactor and the start-up polymerisation.

According to a preferred embodiment of the present invention, the pre-start up procedure also includes a cleaning process (pre start-up operation) characterized in that, prior to the introduction of the catalytic system in the reactor, the reactor is subjected to a cleaning treatment comprising the steps of introducing into the reactor an alkane having from 4 to 8 carbon atoms, circulating said alkane across the reactor under pressure and elevated temperature, depressurizing and purging the reactor.

The Applicants have unexpectedly found that this additional alkane treatment lead to smooth and improved in all aspects polymerization start-ups, as showed in the examples. While not wishing to be bound to this explanation, the Applicants believe that it is the absorption capacity of the alkane which positively impacts on the polymer residues and impurities present on the reactor wall, in the piping and exchangers, so that during the depressurizing/purging steps a high desorption of these residues and impurities occur by mechanical and/or dissolution and/or azeotropic type mechanisms.

The cleaning treatment consists in introducing into the reactor an alkane having from 4 to 8 carbon atoms, circulating said alkane across the reactor under pressure, depressurizing and purging the reactor;

The introduction of the alkane in a fluidised bed and/or with mechanical stirring, is preferably performed in the presence of an inert gas. In particular the treatment may be performed in the presence of nitrogen. It is also preferably performed under airtight conditions in order to avoid any oxygen ingress. It is also preferably performed in the absence of reacting gas like the olefins.

For the purpose of the present description and appended claims, "under pressure" treatment means that the pressure inside the reactor is at least above the atmospheric pressure. The alkane cleaning treatment is preferably carried out under a pressure comprised between 5 and 30 bars. For the purpose of the present description and appended claims, a treatment at an "elevated temperature" means that the treatment is performed at a reactor temperature of at least 40° C., preferably performed at a temperature comprised between 50 and 120° C. and more preferably at a temperature comprised between 70 and 110° C. Preferably, when a charge powder is present, the treatment temperature should be below the temperature at which the particles of charge powder begin to soften and form agglomerates.

The alkane is for example, butane, pentane, hexane, heptane or octane. Pentane is preferably used.

The quantity of alkane used according to the invention depends on the state of purity of both the reactor loop and the charge powder. Preferably, the quantity of alkane used for the treatment is such that the alkane partial pressure is comprised between 25 and 95% of the saturated vapor pressure of the said alkane under the treatment conditions (temperature and pressure). More preferably, the quantity of alkane used for the treatment is such that the alkane partial pressure is comprised between 45 and 75% of the saturated vapor pressure of the said alkane under the treatment conditions (temperature and pressure).

In order to provide the most efficient cleaning treatment, it is important that this treatment should last at least five minutes and preferably over 15 minutes.

As already indicated, the cleaning process includes after the alkane circulation under pressure a depressurizing step. Then, the consecutive purge operation(s) is/are performed according to techniques in themselves known, such as successive operations of pressurising and degassing the reactor by means of gases or a mixture of gases as referred to above. They may be carried out under a pressure at least equal to atmospheric pressure, preferably under a pressure comprised between 0.1 and 5 MPa, at a temperature equal to or greater than 0 DEG C., but less than the temperature at which the charge powder particles begin to soften and form agglomerates, and preferably at a temperature comprised between 40 DEG and 120 DEG C.

Any appropriate additional cleaning treatment may also be performed. For example, the reactor may additionally be treated with an organoaluminium compound of the formula AlRn X3-n in which R is an alkyl group comprising from 2 to 12 carbon atoms, X is a hydrogen or halogen atom, or an alcoholate group, and n is a whole number or fraction comprised between 1 and 3. Said organoaluminium additional treatment, if used, is preferably performed after the alkane treatment.

The organoaluminium compound, when used, may be chosen from amongst the trialkylaluminium compounds or hydrides, chlorides or alcoholates of alkylaluminium. Generally it is preferred to use a trialkylaluminium such as triethylaluminium, trisobutylaluminium, tri-n-hexyl-aluminium or tri-n-octyl aluminium. In certain cases, especially with a view to simplifying the process of the invention, the organoaluminium compound may advantageously be of the same nature as that used as co-catalyst associated with the catalyst in the catalyst system.

Another additional treatment could be a dehydration treatment, which essentially consists in purge operations. If used, said additional dehydration treatment is advantageously performed before the alkane cleaning treatment of the present invention.

According to a preferred embodiment of the present invention, the cleaning treatments (purges, organoaluminium compounds and alkanes) are performed before composing the reacting gas phase. Then, contacting the olefins with the charge powder in the presence of the catalytic system may be performed in a manner in itself known, by means of a polymerisation or copolymerisation reactor with a fluidized bed and/or with mechanical stirring. The reactor is fed with a reaction gas mixture consisting of 1 or more (alpha)-olefins and optionally hydrogen and/or one or more inert gases (including additional optional alkanes), under the appropriate conditions of the polymerisation or copolymerisation reaction in the gas phase.

Surprisingly, it has been observed that when one wishes to attain in an advantageous manner, in a relatively short time, a stable production of polyolefin of the desired quality, it is possible thanks to the process of the invention to perform the initial stage of the polymerisation or copolymerisation in the presence of the catalytic system in a relatively large quantities, without forming agglomerates or fine particles.

The process according to the present invention is particularly suitable for the manufacture of copolymers of ethylene. Preferred alpha-olefins used in combination with ethylene in the process of the present invention are those having from 4 to 8 carbon atoms. The preferred alpha-olefins are but-1-ene, pent-1-ene, hex-1-ene, 4-methylpent-1-ene, oct-1-ene and butadiene, the most preferred comonomer being the hex-1-ene.

When liquid condenses out of the recycle gaseous stream, it can be a condensable monomer, e.g. but-1-ene, hex-1-ene, 4-methylpent-1-ene or octene used as a comonomer, and/or an optional inert condensable liquid, e.g. inert hydrocarbon(s), such as $C_4$-$C_8$ alkane(s) or cycloalkane(s), particularly butane, pentane or hexane.

The process is particularly suitable for polymerising olefins at an absolute pressure of between 0.5 and 6 MPa and at a temperature of between 55 and 135° C., preferably 80° C. and 120° C.

The polymerisation is preferably carried out continuously in a vertical fluidised bed reactor according to techniques known in themselves and in equipment such as that described in European patent application EP-0 855 411, French Patent No. 2,207,145 or French Patent No. 2,335,526. The process of the invention is particularly well suited to industrial-scale reactors of very large size.

The polymerisation reaction may be carried out in the presence of a catalyst system of the Ziegler-Natta type, consisting of a solid catalyst essentially comprising a compound of a transition metal and of a cocatalyst comprising an organic compound of a metal (i.e. an organometallic compound, for example an alkylaluminium compound). High-activity catalyst systems have already been known for a number of years and are capable of producing large quantities of polymer in a relatively short time, and thus make it possible to avoid a step of removing catalyst residues from the polymer. These high-activity catalyst systems generally comprise a solid catalyst consisting essentially of atoms of transition metal, of magnesium and of halogen. The process is also suitable for use with Ziegler catalysts supported on silica. The process is also especially suitable for use with metallocene catalysts in view of the particular affinity and reactivity experienced with comonomers and hydrogen. The process can also be advantageously applied with a late transition metal catalyst, i.e. a metal from Groups VIIIb or Ib (Groups 8-11) of the Periodic Table. In particular the metals Fe, Co, Ni, Ru, Rh, Pd, Os, Ir, and Pt are preferred, especially Fe, Co and Ni. The late transition metal complex may comprise bidentate or tridentate ligands, preferably coordinated to the metal through nitrogen atoms. As examples are those complexes disclosed in WO96/23010. Suitable iron and/or cobalt complexes catalysts can also be found in WO98/27124 or in WO99/12981.

It is also possible to use a high-activity catalyst consisting essentially of a chromium oxide activated by a heat treatment and associated with a granular support based on a refractory oxide.

The catalyst may suitably be employed in the form of a prepolymer powder prepared beforehand during a prepolymerisation stage with the aid of a catalyst as described above. The prepolymerisation may be carried out by any suitable process, for example, polymerisation in a liquid hydrocarbon diluent or in the gas phase using a batch process, a semi-continuous process or a continuous process.

According to a preferred embodiment of the present invention, the catalyst is a Ziegler-Natta catalyst (i.e., non-metallocene) containing magnesium and titanium; the magnesium is preferably acting as the support; the catalyst is thus preferably non supported on silica. Preferably, the catalyst is subjected to a prepolymerisation stage. A most preferred catalyst corresponds to the catalysts disclosed in WO9324542.

According to a preferred embodiment of the present invention, the polyethylene grade slate to be produced have a density comprised between 915 and 960 kg/m3 and a melt index comprised between 0.5 and 30.

The invention claimed is:

1. Process for the polymerisation or copolymerisation in the gas phase of ethylene by bringing the said ethylene into contact, under polymerization or copolymerisation conditions in a reactor in which the start-up bed is fluidised and/or agitated with mechanical stirring, with a catalyst system, which process comprises a pre start-up operation wherein, prior to the introduction of the catalytic system in the reactor, said process comprises the following steps
   1. determining the density d and melt index MI of all the polyethylene powders (grade slate) to be produced during the campaign from start-up to shut down,
   2. heating the reactor by controlling the temperature inside the reactor such that the temperature is maintained at a value equal to or higher than the highest temperature corresponding to a RTSE value of 4.4 for all the polyethylene powders to be produced during the campaign,
   wherein all the polymer grades to be produced during the campaign require a heating temperature of at least 95° C.

2. Continuous gas fluidized bed process for the polymerization of ethylene monomer and one or more optional alpha-olefins, in a fluidized bed reactor by continuously recycling a gaseous stream comprising at least some of the ethylene through the fluidized bed, said process comprising the steps of
   1. having some or all of the recycling gas acting as the fluidizing gas through the bed in order to maintain the bed in the fluidized state,
   2. heating the fluidizing gas with an external heating system,
   3. determining the density d and melt index MI of all the polyethylene powders (grade slate) to be produced during the campaign from start-up to shut-down,
   4. identifying in the RTSE tables the temperatures corresponding to a RTSE value of 4.4 for each grade,
   5. having and/or building into the reactor the appropriate reactive olefin gas and/or liquid environment, and
   6. a final step of introducing into the reactor the active polymerization catalyst specie which instantaneously starts the olefin polymerization process, wherein, before the final step of introducing the catalyst into the reactor, the heating step is conducted by controlling the temperature inside the reactor such that the temperature is maintained at a value equal to or higher than the highest temperature identified in above step 4.

3. Process according to claim 1 wherein the heating step by controlling the temperature inside the reactor is also such that the temperature is maintained at a value equal to or lower than the lowest temperature which is identified by respectively
   a. identifying in the RTSE tables the temperatures corresponding to a RTSE value of 4.2 for each grade to be produced during the campaign,
   b. choosing the said lowest temperatures amongst the so-identified temperatures.

4. Process according to claim 2 wherein the heating step by controlling the temperature inside the reactor is also such that the temperature is maintained at a value equal to or lower than the lowest temperature which is identified by respectively
   a. identifying in the RTSE tables the temperatures corresponding to a RTSE value of 4.2 for each grade to be produced during the campaign,
   b. choosing the said lowest temperatures amongst the so-identified temperatures.

5. Process according to claim 1 wherein all the polymer grades to be produced during the campaign require a heating temperature of at least 100° C.

6. Process according to claim 2 wherein all the polymer grades to be produced during the campaign require a heating temperature of at least 95° C.

7. Process according to claim 2 wherein all the polymer grades to be produced during the campaign require a heating temperature of at least 100° C.

* * * * *